(12) United States Patent
Ooike et al.

(10) Patent No.: US 8,829,142 B2
(45) Date of Patent: Sep. 9, 2014

(54) CURABLE COMPOSITION AND PROCESS FOR PRODUCTION OF ORGANOSILICON COMPOUND

(75) Inventors: Sayaka Ooike, Nagoya (JP); Akinori Kitamura, Nagoya (JP); Hiroshi Suzuki, Tokyo (JP)

(73) Assignee: Toagosei Co., Ltd., Tokyo (JP)

( * ) Notice: Subject to any disclaimer, the term of this patent is extended or adjusted under 35 U.S.C. 154(b) by 139 days.

(21) Appl. No.: 12/989,331

(22) PCT Filed: Apr. 14, 2009

(86) PCT No.: PCT/JP2009/057523
§ 371 (c)(1),
(2), (4) Date: Dec. 7, 2010

(87) PCT Pub. No.: WO2009/131038
PCT Pub. Date: Oct. 29, 2009

(65) Prior Publication Data
US 2011/0071255 A1    Mar. 24, 2011

(30) Foreign Application Priority Data

Apr. 22, 2008   (JP) .................. 2008-111859
Apr. 22, 2008   (JP) .................. 2008-111860

(51) Int. Cl.
| | | |
|---|---|---|
| C08G 77/08 | (2006.01) |
| C08G 77/14 | (2006.01) |
| C09D 183/04 | (2006.01) |
| C08G 77/18 | (2006.01) |
| C08G 77/20 | (2006.01) |

(52) U.S. Cl.
CPC ............ *C08G 77/14* (2013.01); *C09D 183/04* (2013.01); *C08G 77/18* (2013.01); *C08G 77/20* (2013.01)
USPC ................. 528/32; 528/39; 528/21

(58) Field of Classification Search
USPC ............................. 528/21, 32, 39
See application file for complete search history.

(56) References Cited

U.S. PATENT DOCUMENTS

| | | | | |
|---|---|---|---|---|
| 5,397,648 | A * | 3/1995 | Babu et al. ......... 428/523 |
| 5,902,847 | A * | 5/1999 | Yanagi et al. ......... 524/300 |
| 6,258,969 | B1 | 7/2001 | Sawai et al. |
| 7,264,669 | B1 * | 9/2007 | Tomasino et al. ....... 106/287.11 |
| 2004/0106761 | A1 | 6/2004 | Zha et al. |
| 2005/0277755 | A1 | 12/2005 | Hamada et al. |
| 2006/0199101 | A1 | 9/2006 | Inno |
| 2006/0281828 | A1* | 12/2006 | Nakayama et al. ......... 522/71 |
| 2007/0055034 | A1 | 3/2007 | Tajima et al. |
| 2010/0280210 | A1 | 11/2010 | Kitamura et al. |

FOREIGN PATENT DOCUMENTS

| | | |
|---|---|---|
| JP | 61-185573 | 8/1986 |
| JP | 1 117890 | 5/1989 |
| JP | 06 32903 | 2/1994 |
| JP | 9 165451 | 6/1997 |
| JP | 11 29640 | 2/1999 |
| JP | 2001 39989 | 2/2001 |
| JP | 2001 172389 | * 6/2001 |
| JP | 2003 41148 | 2/2003 |
| JP | 2003 183337 | 7/2003 |
| JP | 2004 076534 | 9/2004 |
| JP | 2004 269465 | 9/2004 |
| JP | 2005 352110 | 12/2005 |
| JP | 2006 508216 | 3/2006 |
| JP | 2006 274082 | 10/2006 |
| JP | 2008 150404 | 7/2008 |

OTHER PUBLICATIONS

English language abstract; machine generated translation for JP 2001 172389, Jun. 2001.*
International Search Report issued Jul. 21, 2009 in PCT/JP09/057523 filed Apr. 14, 2009.
U.S. Appl. No. 12/812,808, filed Nov. 8, 2010, Inventor Ooike, et al.
Office Action issued Mar. 7, 2012 in Chinese Patent Application No. 200980111353.6 with English Translation.
Extended European Search Report issued Apr. 11, 2012 in Patent Application No. 09734329.7.
European Office Action in Application No. 09 734 329.7, dated Feb. 4, 2013.
European Search Report in Application No. 12 192 942.6, dated Feb. 1, 2013.
U.S. Appl. No. 13/996,828, filed Jun. 21, 2013, Inventor Kitamura, et al.
Combined Office Action and Search Report issued on Oct. 22, 2013, in Taiwanese Patent Application No. 098113020 (with English Translation).

(Continued)

*Primary Examiner* — Margaret Moore
(74) *Attorney, Agent, or Firm* — Oblon, Spivak, McClelland, Maier & Neustadt, L.L.P.

(57) ABSTRACT

The present curable composition comprises an organosilicon compound produced by hydrolysis copolycondensation of (A) a silicon compound $R^0Si(R^1)_nX^1_{3-n}$ [wherein $R^0$ represents a (meth)acryloyl group; and $X^1$ represents a hydrolyzable group] and (B) a silicon compound $SiY^1_4$ [wherein $Y^1$ represents a siloxane-bond forming group] under an alkaline condition at a ratio of compound (A) to compound (B) of 1:(0.3 to 1.8) by mol. The present process for producing an organosilicon compound comprises a reaction process of conducting alcohol exchange reaction of a silicon compound. $SiY^2_4$ [wherein $Y^2$ represents a siloxane-bond forming group] in 1-propanol to produce a composition; and a condensation process of adding a silicon compound $R^0Si(R^1)_nX^2_{3-n}$ [wherein $R^0$ represents a (meth)acryloyl group; and $X^2$ represents a hydrolyzable group] to the composition to perform the hydrolysis copolycondensation of the silicon compounds under alkaline conditions.

4 Claims, No Drawings

(56) References Cited

OTHER PUBLICATIONS

Office Action issued on Nov. 19, 2013, in Japanese Patent Application No. 2010-509149 ( with English Translation).

Japanese Office Action in corresponding application No. 2010-509149 mailed Mar. 4, 2014. (w/English Translation).

Chinese Office Action in corresponding application No. 201210252652.5 mailed Feb. 24, 2014. (w/English Translation).

* cited by examiner

CURABLE COMPOSITION AND PROCESS FOR PRODUCTION OF ORGANOSILICON COMPOUND

FIELD OF THE INVENTION

The present invention relates to a curable composition and a production method of an organosilicon compound. More specifically, the present invention relates to a curable composition containing an organosilicon compound which is obtained by hydrolysis copolycondensation under an alkaline condition, and is excellent in stability and radical curability, being excellent in curability, and leading to a cured material excellent in scratch resistance and adherence to a base material, and to a production method of an organosilicon compound capable of incorporating to the curable composition.

BACKGROUND ART

Conventionally, a silicon compound having a polymerizable functional group and a production method thereof are known. For example, Patent Document 1 discloses a process for the production of a polysiloxane-based macromonomer in which a reactive alkoxysilane having a polymerizable functional group and three alkoxyl groups and an alkoxysilane having an alkoxyl group are subjected to hydrolysis copolycondensation in the presence of a solid catalyst which is insoluble in the system, and in the presence of a specific amount of water.

Patent Document 2 discloses a process for the production of a cationically curable silicon-containing compound in which an organosilicon compound having an oxetanyl group and three hydrolyzable groups and a silicon compound having a siloxane-bond forming group such as an alkoxy group are subjected to hydrolysis copolycondensation in the presence of an acid catalyst.

Further, Patent Document 3 discloses a process for the production of a photocationically curable composition and a composition for a photocationically curable hardcoating agent in which an organosilicon compound having an oxetanyl group and three hydrolyzable groups is subjected to hydrolysis in an atmosphere at a pH of 7 or more.

[Patent Document 1] JP-A H6-32903
[Patent Document 2] WO 2004/076534
[Patent Document 3] JP-A H11-29640

DISCLOSURE OF THE INVENTION

Problems that the Invention is to Solve

The polysiloxane-based macromonomer described in Patent Document 1 is obtained by hydrolysis copolycondensation in the presence of the solid catalyst which is insoluble in the system, and in the presence of a specific amount of water, in a manner to restrict gelation upon conduction of polymerization, reaction, and the like. However, although this polysiloxane-based macromonomer exhibits a stability, a composition containing it is not regarded to be sufficient in curability because a sufficient amount of water has not been used upon hydrolysis condensation reaction of an alkoxysilane.

In addition, there are no description of the usage of 1-propanol as a reaction solvent, and of a process in which the hydrolysis copolycondensation is conducted after alcohol exchange reaction of an organosilicon compound having four siloxane-bond forming group (Q monomer).

Further, the cationically curable silicon-containing compound described in Patent Document 2 is a compound obtained by hydrolysis copolycondensation in the presence of the acid catalyst, which compound is occasionally insufficient in stability, so that the organosilicon compound or a composition containing the same is restricted in application, depending on its purpose of use.

In turn, the photocationically curable composition described in Patent Document 3 does not contain an organosilicon compound obtained by using a Q monomer, and is thus not sufficient in curability yet.

The objective of the present invention is to provide a curable composition containing an organosilicon excellent in stability, being excellent in curability, and leading a cured material excellent in scratch resistance and adherence to a base material.

Additionally, the objective of the present invention is to provide a production method of an organosilicon compound which is hardly gelated during or after the production thereof and is excellent in stability as well as solubility to an organic solvent and radical curability.

Means for Solving the Problems

The present invention is as follows.
1. A curable composition, characterized by comprising a organosilicon compound (C1) that is obtained by a method including a process in which a silicon compound (A1) represented by the general formula (1) and a silicon compound (B1) represented by the general formula (2) are subjected to hydrolysis copolycondensation under an alkaline condition, at a ratio of 0.3 to 1.8 mol of the silicon compound (B1) based on 1 mol of the silicon compound (A1).

(1)

[In the general formula (1), $R^0$ is an organic group having a methacryloyl group or an acryloyl group, $R^0$s may be the same or different from each other, $R^1$ is an organic group containing an alkyl group having 1 to 6 carbon atoms, an aralkyl group having 7 to 10 carbon atoms, or an aryl group having 6 to 10 carbon atoms, $R^1$s may be the same or different from each other, $X^1$ is a hydrolyzable group, $X^1$s may be the same or different from each other, and n is 0 or 1.]

$$SiY^1_4 \quad (2)$$

[In the general formula (2), $Y^1$ is a siloxane-bond forming group, and $Y^1$s may be the same or different from each other.]
2. The curable composition according to 1 above, wherein $R^0$ in the general formula (1) is an organic group represented by the general formula (3).

(3)

[In the general formula (3), $R^2$ is a hydrogen atom or a methyl group, $R^2$s may be the same or different from each other, $R^3$ is an alkylene group having 1 to 6 carbon atoms, and $R^3$s may be the same or different from each other.]

3. The curable composition according to 1 or 2 above, wherein $X^1$ in the general formula (1) is at least one group selected from the group consisting of an alkoxy group, a cycloalkoxy group, an aryloxy group and an arylalkoxy group.

4. The curable composition according to any one of claims 1 to 3, wherein a solvent used for the hydrolysis copolycondensation is a 1-propanol.

5. The curable composition according to any one of 1 to 3 above, wherein the silicon compound (B1) contains a silicon compound (bb) having an n-propoxy group, and wherein the content of the silicon compound (bb) is in the range from 50% to 100% by weight based on the silicon compound (B1).

6. The curable composition according to any one of 1 to 3 above, wherein the composition is obtained by a reaction process in which the silicon compound (B1) is subjected to alcohol exchange reaction in 1-propanol, a process in which the silicon compound (A1) is added to the resultant composition from the reaction process, and the hydrolysis copolycondensation process under an alkaline condition.

7. The curable composition according to any one of 1 to 6 above, further comprising a component having a methacryloyl group or an acryloyl group, in addition to the organosilicon compound (C1).

8. An article characterized by comprising a base material, and a cured film that is formed on the base material using the curable composition according to any one of 1 to 7 above.

9. A method for producing an organosilicon compound (C2), characterized in that the method comprises a reaction process in which a silicon compound (A2) represented by the general formula (5) is subjected to alcohol exchange reaction in 1-propanol and a condensation process in which a silicon compound (B2) represented by the general formula (6) is added to the resultant composition by the above reaction and a hydrolysis copolycondensation is conducted under an alkaline condition, and that the silicon compound (A2) and the silicon compound (B2) are used so as to be the ratio of 0.3 to 1.8 mol of the silicon compound (A2) based on 1 mol of the silicon compound (B2).

$$SiX^2_4 \qquad (5)$$

[In the general formula (5), $X^2$ is a siloxane-bond forming group, and $X^2$s may be the same or different from each other.]

(6)

[In the general formula (6), $R^0$ is an organic group having a methacryloyl group or an acryloyl group, $R^0$s may be the same or different from each other, $R^1$ is an organic group containing an alkyl group having 1 to 6 carbon atoms, an aralkyl group having 7 to 10 carbon atoms, or an aryl group having 6 to 10 carbon atoms, $R^1$s may be the same or different from each other, $Y^2$ is a hydrolyzable group, $Y^2$s may be the same or different from each other, and n is 0 or 1.]

10. The method for producing an organosilicon compound (C2) according to 9 above, wherein $R^0$ in the general formula (6) is an organic group represented by the general formula (7).

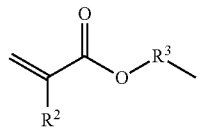

(7)

[In the general formula (7), $R^2$ is a hydrogen atom or a methyl group, $R^2$s may be the same or different from each other, $R^3$ is an alkylene group having 1 to 6 carbon atoms, and $R^3$s may be the same or different from each other.]

11. The method for producing an organosilicon compound (C2) according to 9 or 10 above, wherein tetraalkylammonium hydroxide is used as an alkali agent for adjusting an alkaline condition.

12. The method for producing an organosilicon compound (C2) according to any one of 9 to 11 above, wherein the amount of the alkali agent to be used for adjusting an alkaline condition is in the range from 0.1 to 20 mol based on 100 mol of the total mol number of the silicon compound (A2) and the silicon compound (B2).

Effect of the Invention

Since the curable composition of the present invention contains the organosilicon compound (C1), which is obtained by a specific production method, has a methacryloyl group or acryloyl group, and a siloxane bond, and is excellent in stability, the composition is excellent in curability and a cured film formed from the curable composition is excellent in scratch resistance and adherence to a base material.

In the case where the organic group $R^0$ in the silicon compound (A1) is an organic group represented by the above general formula (3), a curable composition can be obtained which has an efficient characterization of methacryloyl group or acryloyl group and is more excellent in curability and scratch resistance.

In the case where the hydrolyzable group in the silicon compound (A1) is at least one selected from the group consisting of an alkoxy group, cycloalkoxy group, aryloxy group and arylalkoxy group, a curable composition can be obtained which leads to a sufficient polysiloxane structure, hardness and stability.

According to the curable composition containing the organosilicon compound (C1) obtained by a reaction process in which the silicon compound (B1) is subjected to alcohol exchange reaction in 1-propanol, a process in which the silicon compound (A1) is added to the resultant composition from the reaction process, and the hydrolysis copolycondensation process under an alkaline condition, the curable composition can give a more excellent hardness and stability since the hydrolysis copolycondensation can be smoothly progressed to form a more stable organosilicon compound (C1).

In the case where the curable composition of the present invention contains further a component having a methacryloyl group or an acryloyl group, in addition to the organosilicon compound (C1), the resultant cured material has excellent physical properties including hardness, mechanical strength, chemical resistance, adherence and the like.

According to the article of the present invention, since the article has a base material and a cured film on the base material formed using the present curable composition, the article is excellent in scratch resistance, hardness and stability.

In the production method of the organosilicon compound including a reaction process in which a silicon compound (A2) is subjected to alcohol exchange reaction in 1-propanol and a copolycondensation process in which a silicon compound (B2) is added to the resultant composition by the reaction process and a hydrolysis copolycondensation is conducted under an alkaline condition, since the ratio between the silicon compound (A2) and silicon compound (B2) is in a specific range, an organosilicon compound (C2) can be efficiently produced which is hardly gelated during or after the production thereof and is excellent in stability as well as solubility to an organic solvent and radical curability.

In the case where the organic group $R^0$ in the silicon compound (B2) is an organic group represented by the above general formula (7), an organosilicon compound (C2) can be obtained which is more excellent in radical curability.

In the case where tetraalkylammonium hydroxide is used as an alkali agent for adjusting an alkaline condition in the present production method, gels are hardly generated during reaction, and an organosilicon compound (C2) can be efficiently obtained which is excellent in storage stability.

Further, in the case where the amount of the alkali agent is in the range from 0.1 to 20 mol based on 100 mol of the total mol number of the silicon compound (A2) and the silicon compound (B2) gels are hardly generated during reaction, and an organosilicon compound (C2) can be efficiently obtained which is excellent in storage stability.

BEST MODE FOR CARRYING OUT THE INVENTION

Hereinafter, the present invention is described in detail. In the present specification, "(meth)acryl" means acryl and methacryl, "(meth)acrylate" means acrylate and methacrylate. Additionally, "(meth)acryloyl group" means acryloyl group and methacryloyl group.

1. Curable Composition

The curable composition of the present invention is characterized by comprising a organosilicon compound (C1) that is obtained by a method including a process in which a silicon compound (A1) represented by the general formula (1) and a silicon compound (B1) represented by the general formula (2) are subjected to hydrolysis copolycondensation under an alkaline condition, at a ratio of 0.3 to 1.8 mol of the silicon compound (B1) based on 1 mol of the silicon compound (A1).

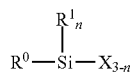

(1)

[In the general formula (1), $R^0$ is an organic group having a methacryloyl group or an acryloyl group, $R^0$s may be the same or different from each other, $R^1$ is an organic group containing an alkyl group having 1 to 6 carbon atoms, an aralkyl group having 7 to 10 carbon atoms, or an aryl group having 6 to 10 carbon atoms, $R^1$s may be the same or different from each other, $X^1$ is a hydrolyzable group, $X^1$s may be the same or different from each other, and n is 0 or 1.]

$$SiY^1_4 \quad (2)$$

[In the general formula (2), $Y^1$ is a siloxane-bond forming group, and $Y^1$s may be the same or different from each other.]

Hereinafter, the starting material for the formation of the organosilicon compound (C1) is described at first.

1-1. Silicon Compound (A1)

The silicon compound (A1) according to the present invention is a silicon compound that is represented by the above general formula (1).

The silicon compound (A1) may be used singly or in combination of two or more types thereof.

The silicon compound (A1) has an organic group including a methacryloyl group or an acryloyl group, and is a component imparting curability to the organosilicon compound (C1).

In the general formula (1), $R^0$ is not particularly limited so long as it is an organic group having a methacryloyl group or an acryloyl group.

$R^0$ is an organic group having a methacryloyl group or an acryloyl group, and carbon number thereof is preferably 20 or less, and more preferably in the range from 4 to 9. When the carbon number is 20 or less, an excellent and stable radical curability can be obtained in the resultant organosilicon compound (C1) obtained by hydrolysis copolycondensation of the silicon compound (A1) and silicon compound (B1).

The organic group having a structure represented by the following general formula (3) is preferable as $R^0$ in the above general formula (1).

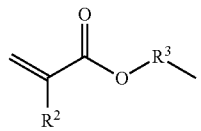

(3)

In the general formula (3), $R^2$ is a hydrogen atom or a methyl group, and is preferably a methyl group.

Further, $R^3$ in the general formula (3) is an alkylene group having 1 to 6 carbon atoms, and is preferably a propylene group (trimethylene group). This is because, it is easy to obtain or synthesize a compound forming such an organic functional group.

If the $R^3$ in the general formula (3) has too much carbon atoms, the surface hardness of a resultant cured material obtained using a composition containing the resultant organosilicon compound (C1) may be lowered.

In the above general formula (1), $R^1$ is not particularly limited so long as it is an organic group including an alkyl group having 1 to 6 carbon atoms, an aralkyl group having 7 to 10 carbon atoms, or an aryl group having 6 to 10 carbon atoms. $R^1$s may be the same or different from each other.

In the general formula (1), $X^1$ is a hydrolyzable group and is not particularly limited so long as it is a group having hydrolyzability. The plural $X^1$s may be the same or different from each other.

Specific examples of $X^1$ include a hydrogen atom, an alkoxy group, a cycloalkoxy group, an aryloxy group, an arylalkoxy group and the like.

The alkoxy group is preferably an alkoxy group having 1 to 6 carbon atoms. Example thereof includes methoxy group, ethoxy group, n-propoxy group, iso-propoxy group, n-butoxy group, iso-butoxy group, sec-butoxy group, tert-butoxy group, n-pentyloxy group, n-hexyloxy group and the like.

The cycloalkoxy group is preferably a cycloalkoxy group having 3 to 8 carbon atoms. Example thereof includes cyclopentyloxy group, cyclohexyloxy group and the like.

The aryloxy group is preferably an aryloxy group having 6 to 10 carbon atoms. Example thereof includes phenyloxy group, o-toluoyloxy group, m-toluoyloxy group, p-toluoyloxy group, naphtyloxy group and the like.

The arylalkoxy group is preferably an aralkyloxy group having 7 to 12 carbon atoms. Example thereof includes benzyloxy group, and the like.

$X^1$ in the general formula (1) is preferably an alkoxy group since the alkoxy group is excellent in hydrolyzability. An alkoxy group having 1 to 3 carbon atoms is more preferable. A methoxy group is further preferable, because the source material thereof is readily available, inexpensive, and easy to control a hydrolysis reaction therefor.

In the general formula (1), n is 0 or 1. A silicon compound (A1) in which n is 0 has three hydrolyzable groups, and is also called "T monomer". In turn, the silicon compound (A1) in which n is 1 has two hydrolyzable groups, and is also called "D monomer".

The ratio between inorganic moiety and organic moiety that are described below is not particularly limited in the obtained organosilicon compound (C1). It is preferable to use the T monomer in which n is 0 to make the compound higher in ratio of inorganic moiety.

Examples of the T monomer include 2-acryloxyethyl trimethoxysilane, 2-acryloxyethyl triethoxysilane, 3-acryloxypropyl trimethoxysilane, 3-acryloxypropyl triethoxysilane, 2-methacryloxyethyl trimethoxysilane, 2-methacryloxyethyl triethoxysilane, 3-methacryloxypropyl trimethoxysilane, 3-methacryloxypropyl triethoxysilane, and the like.

For the purpose of making the obtained organosilicon compound (C1) more excellent in solubility in an organic solvent, the D monomer in which n is preferably 1 is preferably used.

Examples of the D monomer include acryloxymethyl methyldimethoxysilane, acryloxymethyl methyldiethoxysilane, acryloxymethyl methyldipropoxysilane, acryloxyethyl methyldimethoxysilane, acryloxyethyl methyldiethoxysilane, acryloxyethyl methyldipropoxysilane, acryloxypropyl methyldimethoxysilane, acryloxypropyl methyldiethoxysilane, acryloxypropyl methyldipropoxysilane, acryloxymethyl ethyldimethoxysilane, acryloxymethyl ethyldiethoxysilane, acryloxymethyl ethyldipropoxysilane, acryloxyethyl ethyldimethoxysilane, acryloxyethyl ethyldiethoxysilane, acryloxyethyl ethyldipropoxysilane, acryloxypropyl ethyldimethoxysilane, acryloxypropyl ethyldiethoxysilane, acryloxypropyl ethyldipropoxysilane, acryloxymethyl propyldimethoxysilane, acryloxymethyl propyldiethoxysilane, acryloxymethyl propyldipropoxysilane, acryloxyethyl propyldimethoxysilane, acryloxyethyl propyldiethoxysilane, acryloxyethyl propyldipropoxysilane, acryloxypropyl propyldimethoxysilane, acryloxypropyl propyldiethoxysilane, acryloxypropyl propyldipropoxysilane, acryloxymethyl phenyldimethoxysilane, acryloxymethyl phenyldiethoxysilane, acryloxymethyl phenyldipropoxysilane, acryloxyethyl phenyldimethoxysilane, acryloxyethyl phenyldiethoxysilane, acryloxyethyl phenyldipropoxysilane, acryloxypropyl phenyldimethoxysilane, acryloxypropyl phenyldiethoxysilane, acryloxypropyl phenyldipropoxysilane, acryloxymethyl methyldiphenoxysilane, acryloxyethyl methyldiphenoxysilane, acryloxypropyl methyldiphenoxysilane, acryloxymethyl ethyldiphenoxysilane, acryloxyethyl ethyldiphenoxysilane, acryloxypropyl ethyldiphenoxysilane, acryloxymethyl methyldibenzyloxysilane, acryloxyethyl methyldibenzyloxysilane, acryloxypropyl methyldibenzyloxysilane, acryloxymethyl ethyldibenzyloxysilane, acryloxyethyl ethyldibenzyloxysilane, acryloxypropyl ethyldibenzyloxysilane, and the like.

Further, from the viewpoint of a balance between an inorganic ratio in the organosilicon compound (C1) and the solubility of the organosilicon compound (C1) into an organic solvent, a silicon compound (T monomer) in which n is 0 and a silicon compound (D monomer) in which n is 1 can be used in combination. In the case of using these compounds, the ratio of the silicon compound (T monomer) in which n is 0 and silicon compound (D monomer) in which n is 1 is appropriately selected according to the usage of the resultant organosilicon compound (C1).

The silicon compound (A1) is preferably a T monomer.

1-2. Silicon Compound (B1)

The silicon compound (B1) according to the present invention is represented by the above general formula (2).

The silicon compound (B1) may be used singly or in combination of two or more types thereof.

The silicon compound (B1) is a component (Q monomer) having four siloxane-bond forming group $Y^1$s, and is one for increasing a ratio of inorganic moiety in the organosilicon compound (C1) contained in the curable composition of the present invention. The siloxane-bond forming group in the silicon compound (B1) is configured to form a siloxane bond by a reaction with a hydrolyzable group in the silicon compound (A1).

The siloxane-bond forming group $Y^1$ in the general formula (2) means a hydroxyl group or a hydrolyzable group. The plural $Y^1$s may be the same or different from each other.

The hydrolyzable group is not particularly limited so long as it has a group with hydrolyzability. Specific example thereof includes a hydrogen atom, an alkoxy group, a cycloalkoxy group, an aryloxy group, an arylalkoxy group, and the like.

Example of the alkoxy group includes methoxy group, ethoxy group, n-propoxy group, iso-propoxy group, n-butoxy group, iso-butoxy group, sec-butoxy group, tert-butoxy group, n-pentyloxy group, n-hexyloxy group and the like.

Example the cycloalkoxy group includes cyclopentyloxy group, cyclohexyloxy group and the like.

Example the aryloxy group includes phenyloxy group, o-toluoyloxy group, m-toluoyloxy group, p-toluoyloxy group, naphtyloxy group and the like.

Example the arylalkoxy group includes benzyloxy group, and the like.

Among the hydrolyzable group, an alkoxy group is preferable from the viewpoint of the hydrolyzability. In particular, an alkoxy group having 1 to 3 carbon atoms is preferred.

The silicon compound (B1) is exemplified as follows:
(i) a silicon compound, in which four siloxane-bond forming group $Y^1$s are the same of different from each other and each is an alkoxy group, cycloalkoxy group, aryloxy group or arylalkoxy group;
(ii) a silicon compound, in which one siloxane-bond forming group $Y^1$ is an alkoxy group, cycloalkoxy group, aryloxy group or arylalkoxy group, and the remaining three are the same of different from each other and each is a hydroxyl group or hydrogen atom;
(iii) a silicon compound, in which two siloxane-bond forming group $Y^1$s are the same of different from each other and each is an alkoxy group, cycloalkoxy group, aryloxy group or arylalkoxy group, and the remaining two are the same of different from each other and each is a hydroxyl group or hydrogen atom;
(iv) a silicon compound, in which three siloxane-bond forming group $Y^1$s are the same of different from each other and each is an alkoxy group, cycloalkoxy group, aryloxy group or arylalkoxy group, and the remaining one is a hydroxyl group or hydrogen atom; and
(v) a silicon compound, in which four siloxane-bond forming group $Y^1$s are the same of different from each other and each is a hydroxyl group or hydrogen atom.

Examples of the silicon compound in the embodiment (i) include tetramethoxysilane $Si(OCH_3)_4$, tetraethoxysilane $Si(OC_2H_5)_4$, tetrapropoxysilane $Si(OC_3H_7)_4$, tetrabutoxysilane $Si(OC_4H_9)_4$, triethoxymethoxysilane, tripropoxymethoxysilane, trimethoxyethoxysilane, trimethoxypropoxysilane, diethoxydimethoxysilane, dimethoxydipropoxysilane, and the like. The hydrocarbon group forming the alkoxy group may be linear or branched. The linear hydrocarbon group is preferable since the branched one is susceptible to occurrence of a steric hindrance.

Examples of the silicon compound in the embodiment (ii) include $H_3SiOCH_3$, $H_3SiOC_2H_5$, $H_3SiOC_3H_7$, and the like.

Examples of the silicon compound in the embodiment (iii) include $H_2Si(OCH_3)_2$, $H_2Si(OC_2H_5)_2$, $H_2Si(C_3H_7)_2$, and the like.

Examples of the silicon compound in the embodiment (iv) include $HSi(OCH_3)_3$, $HSi(OC_2H_5)_3$, $HSi(C_3H_7)_3$, and the like.

In addition, examples of the silicon compound in the embodiment (v) include $HSi(OH)_3$, $H_2Si(OH)_2$, $H_3Si(OH)$, $SiH_4$, $Si(OH)_4$, and the like.

From the viewpoint of stability of the organosilicon compound (C1) after the production thereof, the compound by the embodiment (i) is preferable as the silicon compound (B1). Among these, an alkoxysilane compound including an alkoxy group having carbon atoms of 3 or less. Particularly preferred is a silicon compound having an n-propoxy group including an alkoxysilane compound having an n-propoxy group such as tetra-n-propoxysilane, trimethoxy-n-propoxysilane, dimethoxy-di-n-propoxysilane and methoxy-tri-n-propoxysilane.

When an alkoxysilane compound having an n-propoxy group is used as a silicon compound having an n-propoxy group, the organosilicon compound (C1) can be obtained which is particularly excellent in stability and storage stability after production. When a curable composition containing the organosilicon compound (C1) is used, a cured film (cured material) can be efficiently formed which is excellent in scratch resistance and adherence to a base material. The number of n-propoxy group in the alkoxysilane compound having an n-propoxy group is usually 1 or more, and preferably 2, 3 or 4.

When the silicon compound (B1) contains a silicon compound having an n-propoxy group (that is an alkoxysilane compound having an n-propoxy group), the content of the alkoxysilane compound having an n-propoxy group is preferably in the range from 50% to 100% by weight, more preferably from 70% to 100% by weight, and further preferably from 80% to 100% by weight, because the above effect is assuredly obtained then. In the case where the silicon compound (B1) consists of the alkoxysilane compound having an n-propoxy group and other compound, the other compound is not particularly limited.

Further, it is preferable to use two or more kinds of the alkoxysilane compounds, the numbers of n-propoxy group of which are mutually different, as the silicon compound (B1). In this case, the above effect is remarkable, when an averaged number of n-propoxy groups bonded to a silicon atom per 1 molecule of the n-propoxy group-containing alkoxysilane compound is preferably in the range from 1.2 to 3.8, more preferably from 1.5 to 3.6, and further preferably from 1.8 to 3.4 based on the whole of the alkoxysilane compound having an n-propoxy group.

The above-mentioned n-propoxy group-containing alkoxysilane compound having preferable number of n-propoxy groups can be obtained by alcohol exchange reaction in 1-propanol, of a compound (hereinafter referred to as "precursor (b)"), which is the silicon compound (B1) represented by the formula (2) and which has no n-propoxy groups, and a composition obtained by this reaction can be used as it is.

The precursor (b) may be, as mentioned above, used singly or in combination of two or more types thereof. In the present invention, the precursor (b) is preferably a tetramethoxysilane and/or tetraethoxysilane.

The silicon compound obtained by alcohol exchange reaction includes n-propoxy group which is derived from the 1-propanol. It is noted that, even when the precursor (b) to be used in the alcohol exchange reaction is only one kind, two or more kinds of n-propoxy group-containing alkoxysilane compounds are typically formed. The reaction products are, for example, n-propoxy group-containing alkoxysilane compounds having mutually different numbers of n-propoxy group.

When at least one part of the siloxane-bond forming group in the precursor (b) is exchanged by an n-propoxy group during the alcohol exchange reaction to thereby form an alkoxysilane compound having an n-propoxy group, the balance of reactivity (copolycondensation) between the silicon compound (B1) containing this compound and the silicon compound (A1) is improved. Namely, this progresses a homogeneous and smooth copolycondensation reaction of the former compound with the silicon compound (A1) in a hydrolysis copolycondensation process (first process to be described later).

The amount of 1-propanol to be used is preferably in the range from 0.1 to 10 equivalents, and more preferably from 0.5 to 6 equivalents based on 1 equivalent of the siloxane-bond forming group in the precursor (b).

It is noted that other alcohol such as methanol, ethanol, 2-propanol and 1-butanol may be used in combination.

The reaction temperature for the alcohol exchange reaction is preferably in the range from 0° C. to 100° C., more preferably from 10° C. to 60° C., and further preferably from 15° C. to 30° C.

In addition, the reaction time for the first process is in the range from 5 minutes to 30 hours, preferably from 10 minutes to 24 hours, and more preferably from 15 minutes to 24 hours.

The pH of the reaction system in the alcohol exchange reaction is not particularly limited and may be alkaline, neutral or acidic. However, since the reaction between the silicon compound (A1) and silicon compound (B1) is to be progressed by means of an alkaline condition, it is possible to utilize the same reaction system and the reaction is preferably conducted under an alkaline condition.

When the alcohol exchange reaction is conducted under an alkaline condition, the pH of the reaction liquid has a value exceeding 7. In this case, the pH of the reaction liquid is preferably in the range from 8 to 13, and further preferably from 9 to 12.

When the alcohol exchange reaction is conducted under an alkaline condition, an alkali agent is usually added. The alkali agent acts as a reaction catalyst for smoothly performing the alcohol exchange reaction between an alkoxy group in the silicon compound (B1) and 1-propanol.

Examples of the alkali agent include ammonia, an organic amine, tetramethylammonium hydroxide, tetraethylammonium hydroxide, tetrapropylammonium hydroxide, tetrabutylammonium hydroxide, choline, sodium hydroxide, potassium hydroxide, calcium hydroxide and the like. Among these, an ammonium compound having a quaternary nitrogen atom leading an excellent catalytic activity is preferable. From the viewpoint of the smooth alcohol exchange reaction, tetramethylammonium hydroxide is more preferable. The alkali agent may be used singly or in combination of two or more types thereof.

The amount of the alkali agent to be used is preferably in the range from 0.001 to 0.1 mol, more preferably from 0.01 to 0.08 mol, and further preferably from 0.01 to 0.06 mol based on 1 mol of the silicon compound (B1). When the alkali agent is used in an amount of 0.001 to 0.1 mol, the alcohol exchange reaction is efficiently progressed, being economically preferable.

The reaction product contained in a composition obtained by the alcohol exchange reaction is to be contained in the silicon compound (B1). Further, this composition can be exclusively constituted of an n-propoxy group-containing alkoxysilane compound, depending on types of a starting material component. Furthermore, the composition occasionally comprises the n-propoxy group-containing alkoxysilane compound and a precursor (b) which is unreacted. The content of the n-propoxy group-containing alkoxysilane compound is preferably in the range from 50% to 100% by weight, more preferably from 70% to 100% by weight, and further preferably 80% to 100% by weight based on 100% by weight of the content of the silicon compound (B1) contained in the composition.

Moreover, the types and contents of the n-propoxy group-containing silicon compounds contained in the composition obtained by the alcohol exchange reaction, can be obtained by gas chromatographic analysis of the composition. From the quantified values based on the gas chromatographic analysis, it is also possible to calculate an averaged number of n-propoxy groups bonded to a silicon atom per 1 molecule of the n-propoxy group-containing compound.

1-3. Production Method of Organosilicon Compound (C1)

The production method of the organosilicon compound (C1) include a process (hereinafter, referred to as "first process") in which the silicon compound (A1) and the silicon compound (B2) are subjected to hydrolysis copolycondensation under an alkaline condition, at a ratio of 0.3 to 1.8 mol of the silicon compound (B1) based on 1 mol of the silicon compound (A1). For the production of the organosilicon compound (C1), the method may further include the following processes.

(Second process): a process for neutralizing the reaction liquid obtained in the first process with an acid.

(Third process): a process for removing a volatile component from the neutralized liquid obtained in the second process.

(Fourth process): a process for mixing and contacting the concentrated liquid obtained in the third process with an organic solvent for washing, thereby dissolving at least an organosilicon compound (C1) in the organic solvent for washing.

(Fifth process): a process for washing the organic liquid obtained in the fourth process with water, and thereafter obtaining an organic solution containing the organosilicon compound (C1).

(Sixth process): a process for removing a volatile component from the organic solution obtained in the fifth process.

The production method of the organosilicon compound (C1) includes preferably the first, second and fifth processes.

1-3-1. First Process

The first process is a process in which the silicon compound (A1) and the silicon compound (B1) are subjected to hydrolysis copolycondensation by using them at a particular ratio under an alkaline condition.

The silicon compound (A1) may be used singly or in combination of two or more types thereof. Additionally, the silicon compound (B1) may be used singly or in combination of two or more types thereof.

Regarding usage ratio of the silicon compound (A1) and silicon compound (B1), the amount of the silicon compound (B1) is in the range from 0.3 to 1.8 mol, preferably from 0.8 to 1.8 mol, and further preferably from 1 to 1.8 mol based on 1 mol of the silicon compound (A1). When the amount of the silicon compound (B1) to be used is in the range from 0.3 to 1.8 mol, the hydrolysis copolycondensation can be smoothly progressed to produce an organosilicon compound (C1) efficiently without generating a gel during and after the reaction.

In the first process, a composition obtained by the alcohol exchange reaction can be used as the silicon compound (B1), however, the calculation target of the silicon compound (B1) in the usage ratio between the silicon compounds (A1) and (B1) is to be, not the silicon compound (contained in the silicon compound (B1)) contained in the composition obtained by the alcohol exchange reaction, but the precursor (b) (contained in the silicon compound (B1)) provided for the alcohol exchange reaction. When the silicon compound (B1) is not based on the alcohol exchange reaction, the usage ratio is of course calculated by adopting the usage amount of the silicon compound (B1) itself.

Additionally, when the hydrolysis is conducted in the first process, water is usually used. The amount of water to be used is preferably in the range from 0.5 to 10 equivalents, and more preferably from 1 to 5 equivalents relative to 1 equivalent of the hydrolyzable group included in the starting silicon compound (the silicon compound (A1), and the silicon compound (B1) in case of having a hydrolyzable group). If the amount of water to be used is too little, the reaction may be insufficiently progressed. On the other hand, if the amount of water is too much, a process for removing water after reaction may be longer, being uneconomical.

The reaction for the first process is conducted in an alkaline condition. The pH of the reaction liquid is exceeding 7. The pH is preferably 8 or more, and further preferably 9 or more. The upper limit of the pH is usually 13. Keeping the reaction system at such a pH enables to produce an organosilicon compound (C1) excellent in storage stability at a higher yield.

If the reaction condition is acidic (less than pH 7), the resulting organosilicon compound by hydrolysis copolycondensation may be one inferior in storage stability and may be gelated during storage according to the reaction condition or the like.

Additionally, under a neutral condition (near pH 7), the hydrolysis copolycondensation reaction is difficult to progress, thereby failing to obtain the targeted organosilicon compound, at a higher yield.

The method for bringing the reaction system into an alkaline condition in the first process, is not particularly limited. When the reaction system is adjusted to the above-mentioned preferable pH range, an alkali agent is usually added thereto. It is noted that the hydrolysis copolycondensation can be conducted without newly adding an alkali agent, when the silicon compound (B1) is a compound obtained by alcohol exchange reaction of the precursor (b) under an alkaline condition, and when the first process is to be progressed in the same reaction system, where the reaction system is in the above-mentioned preferable pH range.

Examples of the alkali agent include ammonia, an organic amine, tetramethylammonium hydroxide, tetraethylammonium hydroxide, tetrapropylammonium hydroxide, tetrabutylammonium hydroxide, choline, sodium hydroxide, potassium hydroxide, calcium hydroxide and the like. Among these, an ammonium compound having a quaternary nitrogen atom leading an excellent catalytic activity is preferable. From the viewpoint of the smooth hydrolysis copolycondensation reaction, tetramethylammonium hydroxide is more preferable. The alkali agent may be used singly or in combination of two or more types thereof.

The alkali agent functions as a reaction catalyst for smooth copolycondensation reaction based on a hydrolysis using a siloxane-bond forming group in the silicon compound (B1) and a hydrolyzable group in the silicon compound (A1).

When the alkali agent is used, the amount thereof to be used is in the range from 0.001 to 0.20 mol, more preferably from 0.01 to 0.1 mol, and further preferably from 0.01 to 0.08 mol based on 1 mol of the total mol number of the silicon compound (A1) and silicon compound (B1). When the alkali agent is used in an amount of 0.001 to 0.1 mol, the hydrolysis copolycondensation reaction is smoothly progressed.

It is preferable to use an organic solvent as the reaction solvent in the first process. Examples of the organic solvent include an alcohol as methyl alcohol, ethyl alcohol, 1-propanol and 2-propanol, a ketone such as methylethylketone, an ether such as tetrahydrofurane and 1,4-dioxane, an aromatic hydrocarbon such as toluene, hexane, ligroin, and the like. Among these, a solvent having higher polarity such as alcohol and ketone is preferable because of the excellent solubility of the organosilicon compound (C1). The more preferable solvent is 1-propanol. The organic solvent may be used singly or in combination of two or more types thereof.

The reaction temperature for the first process is preferably in the range from 0° C. to 120° C., more preferably from 10° C. to 80° C., and further preferably from 40° C. to 80° C.

In addition, the reaction time for the first process is in the range from 30 minutes to 30 hours, preferably from 30 minutes to 10 hours, and more preferably from 1 to 5 hours.

1-3-2. Second Process

The second process is a process in which the reaction liquid containing the organosilicon compound (C1) obtained in the first process is subjected to neutralization with an acid. Examples of the acid include an inorganic acid such as phosphoric acid, nitric acid, sulfuric acid and hydrochloric acid, an organic acid such as a carboxylic acid including acetic acid, formic acid, lactic acid, acrylic acid and the like, a sulfonic acid including p-toluenesulfonic acid, methanesulfonic acid, and the like. Among these, nitric acid is preferable, because nitric acid hardly exerts adverse effects on the stability of methacryloyl group and acryloyl group (an addition reaction of the acid to a methacryloyl group or acryloyl group is hardly caused), and is apt to be relatively readily removed by water washing. The amount of the acid to be used is appropriately selected depending on the pH of a reaction liquid containing the organosilicon compound (C1). The amount thereof is preferably in the range from 1 to 1.1 equivalent, and more preferably from 1 to 1.05 equivalent relative to 1 equivalent of the alkali agent contained in the reaction liquid.

1-3-3. Third Process

The third process is a process in which a volatile component is removed from the neutralized liquid obtained in the second process. In the process, distillation is conducted under a condition of ordinary pressure or reduced pressure. The volatile component to be removed is mainly an organic solvent used as the reaction solvent in the first process. This third process is usually conducted when such an organic solvent is used, which is compatibly mixed with water, like methanol, because such a solvent is inconvenient for washing by water (fifth process) to be described later.

The third process and fourth process can be omitted, in case that the reaction solvent in the first process is incompatible with water and is an organic solvent suitable for washing by water in the fifth process, and in case that, although the reaction solvent in the first process is one such as an alcohol, which compatibly mixes with water, washing process can be conducted by adding a large amount of an organic solvent suitable for washing by water in the fifth process.

1-3-4. Fourth Process

The fourth process is a process in which the concentrated liquid obtained in the third process is subjected to mixing and contacting with an organic solvent for washing to dissolve at least an organosilicon compound (C1) in the organic solvent for washing. As the organic solvent for washing, a compound is used which dissolves the organosilicon compound (C1) as a reaction product therein and which is incompatible with water. The term "incompatible with water" implies that, when water and the organic solvent for washing are sufficiently mixed with each other and then the mixture is left to stand still, the mixture is separated into a water layer and an organic layer.

Examples of the preferable organic solvent for washing include a ketone such as methylethylketone, an ether such as diisopropylether, an aromatic hydrocarbon such as toluene, an aliphatic hydrocarbon such as hexane, an ester such as ethyl acetate, and the like.

The organic solvent for washing may be the same as or different from the reaction solvent used in the first process.

1-3-5. Fifth Process

The fifth process is a process in which the organic liquid obtained in the fourth process is washed with water, and an organic solution containing the organosilicon compound (C1) is obtained. The organic solution means a liquid obtained in the second process when the third and fourth processes are aborted. By means of the fifth process, the alkali agent used in the first process, the acid used in the second process, and the salt thereof are all contained in the water layer, and are substantially removed from the organic layer.

The fifth process includes a process in which water and the organic liquid are subjected to mixing to contact the water and the organic liquid, and a process in which a water layer and an organic layer that is a layer containing the organosilicon compound (C1) are separated to recover the organic layer (organic solution). In these processes, when mixing of water and the organic liquid is insufficient, when contact of water and the organic liquid is insufficient, or when the separation of the organic layer from the water layer is insufficient, the resulting organosilicon compound (C1) sometimes contains a large amount of impurities and is an organosilicon compound (C1) having inferior stability.

The temperature in the process for mixing and contacting water with the organic liquid in the fifth process is not particularly limited and is preferably in the range from 0° C. to 70° C., and more preferably from 10° C. to 60° C. Further, the temperature in the process for separating the organic layer from the water layer is not particularly limited and is preferably in the range from 0° C. to 70° C., and more preferably from 10° C. to 60° C. It is preferable to set the treating temperatures in the two processes at a temperature range of 40° C. to 60° C. from the viewpoint of a shortening effect of the time for separating the organic layer from the water layer.

1-3-6. Sixth Process

The sixth process is a process in which a volatile component is removed from the organic solution obtained in the fifth process. Distillation is conducted under a condition of ordinary pressure (atmospheric pressure) or reduced pressure in the sixth process. The volatile component to be removed in the sixth process is mainly the organic solvent for washing used in the fourth process. If the other volatile components are contained, all are removed simultaneously in this process.

The organosilicon compound (C1) of the present invention is separated by the above-mentioned processes.

It is noted that, when the organosilicon compound (C1) is to be provided as a solution obtained by dissolving the compound in an organic solvent, it is possible to directly use the organic solvent used in the fourth process as the solvent for the organosilicon compound (C1) and to omit the sixth process.

The condensation ratio of the silicon compound (A1) and the silicon compound (B1) in the production method of the organosilicon compound (C1) can be 92% or higher, more preferably 95% or higher, and further preferably 98% or higher. Although it is most preferable that substantially all the siloxane-bond forming groups (including a hydrolyzable group) are condensed, the upper limit of the condensation ratio is typically 99.9%.

When the organosilicon compound (C1) is produced, it is also possible to add a polymerization inhibitor for inhibiting polymerization of an acryloyl group and a methacryloyl group, into at least one of the reaction system, the reaction liquid containing the organosilicon compound (C1), the neutralized liquid, the organic liquid and the organic solution.

The polymerization inhibitor is not particularly limited, it is also possible to use a radical catching agent to be typically used. Example thereof includes hydroquinone, hydroquinone monomethylether, 2,6-di-tert-butyl-4-methylphenol, 2,4-dimethyl-6-tert-butylphenol, 3-hydroxythiophenol, α-nitroso-β-naphthol, p-benzoquinone, N-nitrosophenyl hydroxylamine aluminum salt, 2-[1-(2-hydroxy-3,5-di-tert-pentylphenyl)ethyl]-4,6-di-tert-pentylphenyl acrylate, a copper salt, and the like.

These compounds may be used singly or in combination of two or more types thereof.

In case that the polymerization inhibitor, such as hydroquinone and hydroquinone monomethylether fails to exhibit a polymerization inhibiting ability under an anaerobic condition, it is preferable to appropriately supply oxygen.

The amount of the polymerization inhibitor to be used is preferably in the range from 1 ppm by weight to 2,000 ppm by weight, more preferably from 10 ppm by weight to 1,000 ppm by weight, and further preferably from 100 ppm by weight to 500 ppm by weight based on a theoretical yield of the organosilicon compound (C1). When the usage amount of the polymerization inhibitor is within the above range, it is possible to restrict a defect such as a formation of gel during desolvation under reduced pressure and a deteriorated storage stability of the resultant organosilicon compound (C1). Excessively larger usage amounts of the polymerization inhibitor occasionally lead to a strengthened coloration caused by the polymerization inhibitor, and an occurrence of an obstructing factor upon curing the composition containing the resultant organosilicon compound (C1).

The polymerization inhibitor may be used before start of the condensation process or during the reaction.

As mentioned above, in a copolycondensation reaction of Q monomers and T monomers by a known method such as a production method under an acidic condition, it is difficult to homogeneously react both of them with each other, and gel is likely to be formed. Thus, a method is known to avoid gelation, which is configured to cause a silicon compound (M monomer) such as trimethylalkoxysilane and hexamethyldisiloxane, having only one siloxane-bond forming group, to act as an end capping agent.

However, although gelation can be avoided by using M monomers in a predetermined amount or more, the inorganic property of the obtained organosilicon compound tends to be lowered. Although the present invention is configured to copolyconderise the T monomer and/or D monomer and the Q monomer without causing gelation, it is possible to combiningly use the M monomer at such a lower ratio not to lower the inorganic property. Specifically, in the first process, it is possible to use the M monomer in an amount of 10 mol or less based on 100 mol of the total mol number of the silicon compound (A1) and silicon compound (B1).

1-4. Organosilicon Compound (C1)

The organosilicon compound (C1) obtained by the above processes is a polysiloxane having a three-dimensional siloxane bond (Si—O—Si) formed by hydrolysis of the siloxane-bond forming group contained in the silicon compound (B1) and the hydrolyzable group contained in the silicon compound (A1), and having a methacryloyl group and/or acryloyl group. Most of the siloxane-bond forming group and hydrolyzable group are converted into a siloxane bond, while restricting polymerization based on the methacryloyl group and/or acryloyl group contained in the silicon compound (A1) in the first process.

Further, the organosilicon compound (C1) has a methacryloyl groups and/or acryloyl groups, and thus possesses a radical curability. Radical curing of the organosilicon compound (C1) leads to a cured product which is high in surface hardness and excellent in scratch resistance.

The organosilicon compound (C1) has an organic moiety and an inorganic moiety, in its structure. $R^0$ and $R^1$ in the general formula (1) representing the silicon compound (A1) constitute the organic moiety. When a part of at least one of the hydrolyzable group such as an alkoxy group derived from the silicon compound (B1) and the hydrolyzable group such as an alkoxy group derived from the silicon compound (A1), is remained, such a residue is also included in the organic moiety. The moiety other than the organic moiety is the inorganic moiety including no carbon atoms.

Since the condensation ratio between the silicon compound (A1) and silicon compound (B1) can be increased to 92% or higher in the production method of the organosilicon compound (C1), as mentioned above, the resultant organosilicon compound (C1) is a compound having a higher ratio of inorganic moiety and having a sufficiently formed polysiloxane structure. If the condensation ratio is lowered, a cured film obtained using the organosilicon compound (C1) tends to have a deteriorated hardness. Additionally, the storage stability of the organosilicon compound (C1) may be deteriorated.

When the organosilicon compound (C1) has a siloxane-bond forming group (including a hydrolyzable group), the remaining ratio thereof can be calculated from a chart of $^1$H NMR (nuclear magnetic resonance). The fact that "all the hydrolyzable groups have been substantially condensed" can be confirmed by a fact that peaks based on siloxane-bond forming groups are rarely observed in an NMR chart for the obtained organosilicon compound (C1) which is a polysiloxane compound.

When the organosilicon compound (C1) is an organosilicon compound obtained by hydrolysis copolycondensation reaction of a compound (T monomer having three hydrolyzable groups) where n is 0 in the general formula (1), as the silicon compound (A1) and the silicon compound (B1) (Q monomer having four siloxane-bond forming groups), the organosilicon compound is made to be a compound having T monomer unit and Q monomer unit, as constitutional units.

In such a case, the organosilicon compound (C1) is allowed to have a structure in a partially laddered, caged, or randomized shape.

The number-average molecular weight of the organosilicon compound (C1) is preferably in the range from 500 to 100,000, more preferably from 1,000 to 50,000, and further preferably from 2,000 to 20,000, which is determined relative to polystyrene standards by gel permeation chromatographic (GPC) analysis.

The organosilicon compound (C1) is preferably an organosilicon compound which is obtained by a method including a process for hydrolysis copolycondensation of the silicon compound (A1) and silicon compound (B1) containing at least one alkoxysilane compound having an n-propoxy group.

1-5. Curable Composition

The curable composition of the present invention contains the above-mentioned organosilicon compound (C1) and may contain, as necessary, other components according to the purposes, applications and the like. Examples of the other components include a polymerizable unsaturated compound, a radical polymerization inhibitor, an antioxidant, a ultraviolet absorber, a photostabilizer, a levelling agent, an organic polymer, a filler, a metal particle, a pigment, a polymerization initiator, a sensitizer, an organic solvent, and the like.

The polymerizable unsaturated compound is preferably a compound having an acryloyl group or methacryloyl group (hereinafter, referred to as "(meth)acrylate compound") or the like for the purpose of: adjusting a physical property such as hardness, mechanical strength, chemical resistance and adherence of a resultant cured product obtained using the curable composition of the present invention, obtaining a cured film excellent in adherence to a base material, or adjusting a viscosity, curability, and the like of the curable composition.

Examples of the (meth)acrylate compound include a monofunctional (meth)acrylate, a multifunctional (meth)acrylate, a urethane (meth)acrylate, and the like. These compounds may be used singly or in combination of two or more types thereof.

Examples of the monofunctional (meth)acrylate include a (meth)acrylate of a phenol/alkylene oxide adduct such as a (meth)acrylate of an ethylene oxide modified phenol and a (meth)acrylate of a propylene oxide modified phenol, a (meth)acrylate of an alkylphenol/alkylene oxide adduct such as a (meth)acrylate of an ethylene oxide modified nonylphenol and a (meth)acrylate of a propylene oxide modified nonylphenol, 2-ethylhexyl carbitol (meth)acrylate, isobornyl (meth)acrylate, tetrahydrofurfryl (meth)acrylate, hydroxyethyl(meth)acrylate, hydroxypropyl (meth)acrylate, hydroxybutyl(meth)acrylate, hydroxyhexyl (meth)acrylate, diethylene glycol mono(meth)acrylate, dipropylene glycol mono(meth)acrylate, triethylene glycol mono(meth)acrylate, tripropylene glycol mono(meth)acrylate, (meth)acrylic acid, a Michael addition dimer of acrylic acid, w-carboxy-polycaprolactone mono(meth)acrylate, phthalic acid mono-2-(meth)acryloxyethyl ester, methyl(meth)acrylate, ethyl (meth)acrylate, butyl(meth)acrylate, 2-ethylhexyl(meth)acrylate, benzyl(meth)acrylate, phenyl (meth)acrylate, cyclohexyl(meth)acrylate, tert-butyl-cyclohexyl (meth)acrylate, a (meth)acrylate of p-cumylphenol/alkylene oxide adduct, o-phenylphenol (meth)acrylate, a (meth)acrylate of o-phenylphenol/alkylene oxide adduct, tetrahydrofurfuryl (meth)acrylate, tricyclodecanemethylol (meth)acrylate, 2-hydroxy-3-phenoxypropyl (meth)acrylate, and the like. The monofunctional (meth)acrylate may be used singly or in combination of two or more types thereof.

Examples of the multifunctional (meth)acrylate include diethylene glycol di(meth)acrylate, triethylene glycol di(meth)acrylate, tetraethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, 1,4-butanediol di(meth)acrylate, neopentyl glycol di(meth)acrylate, di(meth)acrylate of ethylene oxide modified neopentyl glycol, di(meth)acrylate of ethelene oxide modified bisphenol A, di(meth)acrylate of propylene oxide modified bisphenol A, di(meth)acrylate of ethylene oxide modified hydrogenated bisphenol A, trimethylolpropane di(meth)acrylate, trimethylolpropane allylether di(meth)acrylate, trimethylolpropane tri(meth)acrylate, tri(meth)acrylate of ethylene oxide modified trimethylolpropane, tri(meth)acrylate of propylene oxide modified trimethylolpropane, pentaerythritol tri(meth)acrylate, pentaerythritol tetra(meth)acrylate, dipentaerythritol hexa(meth)acrylate, and the like. The multifunctional (meth)acrylate may be used singly or in combination of two or more types thereof.

Examples of the urethane (meth)acrylate include a compound obtained by addition reaction of an organic polyisocyanate and a hydroxyl group-containing (meth)acrylate, a compound obtained by addition reaction of a polyol, an organic polyisocyanate and a hydroxyl group-containing (meth)acrylate, and the like. These compounds may be used singly or in combination of two or more types thereof.

Additionally, examples of the polyol include a low molecular weight polyol, a polyether polyol, a polyester polyol, a polycarbonate polyol, and the like. These compounds may be used singly or in combination of two or more types thereof.

Examples of the low molecular weight polyol include ethylene glycol, propylene glycol, neopentyl glycol, cyclohexane dimethylol, 3-methyl-1,5-pentane diol, and the like.

Examples of the polyether polyol include a polypropylene glycol, a polytetramethylene glycol, and the like.

Examples of the polyester polyol include a reaction product of a low molecular weight polyol and/or polyether polyol, and an acid component such as a dicarboxylic acid including adipic acid, succinic acid, phthalic acid, hexahydrophthalic acid, terephthalic acid and the like, and an acid anhydride of the dicarboxylic acid.

The polyol may be used singly or in combination of two or more types thereof.

Examples of the organic polyisocyanate include tolylene diisocyanate, xylylene diisocyanate, tetramethylxylylene diisocyanate, 4,4'-diphenylmethane diisocyanate, 4,4'-dicyclohexylmethane diisocyanate, hexamethylene diisocyanate, isophorone diisocyanate, and the like. The organic polyisocyanate may be used singly or in combination of two or more types thereof.

Examples of the hydroxyl group-containing (meth)acrylate include a hydroxyalkyl(meth)acrylate such as 2-hydroxyethyl (meth)acrylate, 2-hydroxypropyl(meth)acrylate and 4-hydroxybutyl (meth)acrylate, a hydroxyl group-containing multifunctional (meth)acrylates such as pentaerythritol tri(meth)acrylate, di(meth)acrylate of 3 mol alkylene oxide-added product of isocyanuric acid and dipentaerythritol penta(meth)acrylate, and the like. The hydroxyl group-containing (meth)acrylate may be used singly or in combination of two or more types thereof.

Among the (meth)acrylate compounds, a multifunctional (meth)acrylate having three or more functionalities such as trimethylolpropane tri(meth)acrylate, pentaerythritol tri (meth)acrylate, pentaerythritol tetra(meth)acrylate and dipentaerythritol hexa(meth)acrylate, and a urethane (meth)acrylate are preferable. When the compounds are used, a cured material can be obtained which is higher in hardness and excellent in contamination resistance.

Examples of the other polymerizable unsaturated compound include a maleimide group, amide group, vinyl group, and the like.

Examples of the unsaturated compound having a maleimide group include N-(2-(meth)acryloxyethyl)hexahydrophthalimide, N-(2-hydroxyethyl)citracone imide, and the like.

Examples of the unsaturated compound having an amide group include N,N-dimethyl acrylamide and the like.

Examples of the unsaturated compound having a vinyl group include acryloyl morphorine, N-vinyl pyrrolidone, N-vinyl caprolactam, and the like.

The content ratio of the organosilicon compound (C1) and the (meth)acrylate compound in the case where the compounds are used in combination for the curable composition of the present invention, is different depending on the purposes, and is not particularly limited. Nonetheless, the content of the (meth)acrylate compound relative to 100 parts by weight of the organosilicon compound (C1), is preferably in the range from 1 to 100,000 parts by weight, more preferably from 10 to 10,000 parts by weight, and further preferably from 80 to 1,000 parts by weight, from a standpoint of a physical property balance among contamination resistance, adherence, hardness, and the like of the resultant cured product.

Examples of the radical polymerization inhibitor include a phenol-based compound such as hydroquinone and hydroquinone monomethylether.

Examples of the antioxidant include a hindered phenol-based antioxidant such as 2,6-di-tert-butyl-4-methylphenol, and pentaerythritol tetrakis(3-(3,5-di-tert-butyl-4-hydroxyphenyl)propionate, a sulfur-based antioxidant such as 4,6-bis(octylthiomethyl)-o-cresol, a phosphorus-based antioxidant, and the like. These compounds may be used singly or in combination of two or more types thereof.

When the radical polymerization inhibitor and antioxidant are used, storage stability, thermal stability and the like of the curable composition can be improved.

In the case where the curable composition contains a radical polymerization inhibitor, the content of the radical polymerization inhibitor is preferably in the range from 1 to 10,000 parts by weight, more preferably from 10 to 2,000, and further preferably from 100 to 500 partsy by weight based on 1,000,000 parts by weight of the organosilicon compound (C1).

In the case where the curable composition contains an antioxidant, the content of the antioxidant is preferably in the range from 1 to 10,000 parts by weight, more preferably from 10 to 2,000, and further preferably from 100 to 500 parts by weight based on 1,000,000 parts by weight of the organosilicon compound (C1).

Examples of the ultraviolet absorber include a hydroxyphenyltriazine-based ultraviolet absorber such as 2-[4-[(2-hydroxy-3-dodecyloxypropyl)oxy]-2-hydroxyphenyl]-4,6-bis(2,4-dimethylphenyl)-1,3,5-triazine, a benzotriazole-based ultraviolet absorber such as 2-(2H-benzotriazole-2-yl)-4,6-bis(1-methyl-1-phenylethyl)phenol, an inorganic fine particle for absorbing ultraviolet rays, such as fine titanium oxide particle and fine zinc oxide particles, and the like. These compounds may be used singly or in combination of two or more types thereof. In addition, examples of the photostabilizer include a hindered amine-based photostabilizer such as bis(1,2,2,6,6-pentamethyl-4-piperidinyl)sebacate, and the like.

When the ultraviolet absorber and photostabilizer are used, UV resistance and weather resistance can be improved.

In the case where the curable composition contains the ultraviolet absorber, the content of the ultraviolet absorber is preferably in the range from 0.1 to 100 parts by weight, and more preferably from 1 to 20 parts by weight based on 100 parts by weight of the organosilicon compound (C1).

In the case where the curable composition contains the photostabilizer, the content of the photostabilizer is preferably in the range from 0.01 to 100 parts by weight, and more preferably from 0.1 to 10 parts by weight based on 100 parts by weight of the organosilicon compound (C1).

Examples of the levelling agent include a silicone-based polymer, a fluorine atom-containing polymer, and the like.

When the levelling agent is used, a levelling property upon coating of the curable composition can be improved.

Examples of the organic polymer include (meth)acrylic polymers. Examples of the preferable constituent monomer include methyl methacrylate, cyclohexyl(meth)acrylate, N-(2-(meth)acryloxyethyl)tetrahydrophthalimide, and the like.

When the organic polymer is used, a shrinkage of a resultant cured product obtained using the curable composition can be suppressed.

Examples of the filler include silica, alumina, and the like.

The curable composition of the present invention may be an active energy beam-curable composition, or a heat-curable composition. A polymerization initiator is selected and blended thereinto depending on the purpose.

Examples of the photopolymerization initiator to be contained in the curable composition of the present invention when the composition is an active energy beam-curable composition, include an acetophenone-based compound such as 2,2-dimethoxy-1,2-diphenylethane-1-one, 1-hydroxy-cyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-methyl-1-[4-(methylthio) phenyl]-2-morpholinopropane-1-one, 2-benzyl-2-dimethylamino-1-(4-morpholinophenyl)-butane-1-one, diethoxyacetophenone, oligo[2-hydroxy-2-methyl-1-[4-(1-methylvinyl)phenyl]propanone], and 2-hydroxy-1-[4-[4-(2-hydroxy-2-methyl-propionyl)-benzyl]-phenyl]-2-methyl-propane-1-one, a benzophenone-based compound such as benzophenone, 4-phenylbenzophenone, 2,4,6-trimethylbenzophenone, and 4-benzoyl-4'-methyl-diphenylsulfide, an α-ketoester-based compound such as methylbenzoyl formate, oxy-phenyl-acetic acid 2-[2-oxo-2-phenyl-acetoxy-ethoxy]-ethyl ester, and oxy-phenyl-acetic acid 2-[2-hydroxy-ethoxy]-ethyl ester, a phosphine oxide-based compound such as 2,4,6-trimethylbenzoyl-diphenyl-phosphine oxide, bis(2,4,6-trimethylbenzoyl)-phenylphosphine oxide, and bis(2,6-dimethoxybenzoyl)-2,4,4-trimethyl-pentylphosphine oxide, a benzoin-based compound such as benzoin, benzoin methyl ether, benzoin ethyl ether, benzoin isopropyl ether, and benzoin isobutyl ether, a titanocene-based compound, an acetophenone/benzophenone hybrid-based photoinitiator such as 1-[4-(4-benzoylphenylsulfanyl)phenyl]-2-methyl-2-(4-methylphenylsulfinyl)propane-1-one, an oxime ester-based photopolymerization initiator such as 1,2-octanedione, 1-[4-(phenylthio)-, 2-(O-benzoyloxime)), camphorquinone, and the like. These compounds may be used singly or in combination of two or more types thereof.

When the curable composition contains a photopolymerization initiator, the content of the photopolymerization initiator is preferably in the range from 0.1 to 20 parts by weight, more preferably from 1 to 10 parts by weight based on 100 parts by weight of the organosilicon compound (C1).

When the curable composition of the present invention is an active energy beam-curable composition, it is possible to add a photosensitizer for the purpose of exemplarily increasing a curing rate, enhancing an adherence of the cured product to a base material, and the like.

Examples of the preferable photosensitizer include a thioxanthone-based compound such as diethyl thioxanthone and diisopropyl thioxanthone, acetophenone, benzophenone, and the like.

Examples of the thermal polymerization initiator to be contained in the curable composition of the present invention when the composition is a heat-curable composition, include a peroxide such as dicumyl peroxide and benzoyl peroxide, an azo compound such as AIBN, and the like.

When the curable composition contains a thermal polymerization initiator, the content of the thermal polymerization initiator is preferably in the range from 0.1 to 20 parts by weight, and more preferably from 1 to 10 parts by weight based on 100 parts by weight of the organosilicon compound (C1).

The curable composition of the present invention preferably contains an organic solvent, when the curable composition is coated as a thin-film such as a hardcoat, or when the curable composition has a higher viscosity or is a solid because the organosilicon compound (C1) therein is high in condensation degree.

The organic solvent is not particularly limited and is preferably a solvent which is capable of dissolving the organosilicon compound (C1) and other components.

Examples of the solvent include an alcohol such as ethanol and isopropyl alcohol, an alkyleneglycol monoalkylether such as propylene glycol monomethylether, an aromatic compound such as toluene and xylen, an ester such as propylene glycol monomethylether acetate, ethyl acetate and butyl acetate, a ketone such as acetone, methylethylketone and methylisobutylketone, an ether such as dibutylether, N-methylpyrrolidone, and the like. These compounds may be used singly or in combination of two or more types thereof.

The solvent for the composition may be a reaction solvent for the production of the organosilicon compound (C1) as it is. This case has an advantage of reducing a production cost. In addition, the composition may be one in which the reaction solvent is substituted by other organic solvent. In the case where a base material, onto which the composition is coated, is a substance such as a wooden material where a smaller amount of the organic solvent is apt to be remained, it is possible to remove the reaction solvent in the production of the organosilicon compound (C1), in a manner to substitute the reaction solvent with an organic solvent such as ethanol having a higher safety.

In the case where the curable composition of the present invention contains an organic solvent, the concentration of the organosilicon compound (C1) is not particularly limited. The lower limit of the concentration is usually 0.1% by weight.

The curable composition of the present invention may be a solventless type curable composition.

The curable composition of the present can be prepared by mixing starting materials. When the mixing is conducted, conventionally known mixer or the like may be used. Specific example thereof include a reaction flask, a change-can type mixer, a planetary mixer, a disper, a Henschel mixer, a kneader, an ink roll, an extruder, a three-roll mill, a sand mill, and the like.

1-6. Forming Method of Cured Product

As mentioned above, the curable composition of the present invention may be an active energy beam-curable composition or a heat-curable composition. That is to say, a coated film obtained using the curable composition of the present invention can be hardened with an energy such as ultraviolet rays, electron beam, X-rays, heat, or the like, after forming the coated film. Thereby a cured product (cured film) can be formed which is excellent in scratch resistance, adherence to a base material, and the like.

Specific examples of the active energy beam include an electron beam, ultraviolet rays, and visible light, and ultraviolet rays are particularly desirable. Examples of the irradiation apparatus for ultraviolet rays include a high-pressure mercury lamp, a metal halide lamp, an electrodeless UV lamp, an LED, and the like. The irradiation energy is to be appropriately set depending on a type of active energy beam, a blended composition, and the like. For example, when a high-pressure mercury lamp is used, the irradiation energy for UV-A region is preferably in the range from 100 to 5,000 mJ/cm$^2$, more preferably from 500 to 3,000 mJ/cm$^2$, and further preferably from 2,000 to 3,000 mJ/cm$^2$.

Additionally, when the heat-curing is conducted, the curing temperature is preferably in the range from 40° C. to 200° C., and more preferably from 50° C. to 150° C. Within this range, the temperature may be fixed or elevated. Further, it is possible to combine a temperature elevation with a temperature fall. The curing time is appropriately selected according to the type of the thermal polymerization initiator, the content ratio of the other components, or the like. It is usually in the range from 0.01 to 24 hours, and preferably from 0.1 to 5 hours.

The formation method of a coating film before curing is not particularly limited and is appropriately selected according to the constituent material, shape and the like of the base material. When the base material is in a flat plate shape such as a film and sheet, it is possible to form a coating film thereon by using an applicator, bar coater, wire-bar coater, roll coater, curtain flow coater, or the like. It is also possible to adopt a dip coating method, scat method, spraying method, and the like.

1-7. Application of Curable Composition and Article Including Cured Film

The curable composition of the present invention is usable in various applications. The composition can be used as a coating agent, adhesive, and the like, for example.

In addition to these applications, the curable composition provided as an active energy beam-curable composition is also usable for a cladding material of an optical waveguide, an insulative coating material of electrical wiring, and a photoresist.

The article of the present invention is characterized in that the article comprises a base material, and a cured film which is provided on a surface of the base material and which is formed from the curable composition of the present invention.

The constituent material of the applicable base material may be an organic material or an inorganic material. Specifically usable are a metal, alloy, glass, ceramic, resin, paper, wood, concrete, and the like. Examples of a shape thereof include a finite form such as a film, sheet, plate (flat plate or curved plate), cube, rectangular parallelepiped, pyramid, cone, linear body (straight, curved, and the like), ring body (circular, polygonal, and the like), tube, and sphere, and an indefinite form having irregularities, grooves, through-holes, corners, and the like.

The curable composition of the present invention is preferably usable as a coating agent, such as a hardcoat of a polymer material, a paint for a woodwork, and the like.

Specific examples of the polymer material include a polyester such as polyethylene terephthalate and polyethylene naphthalate, polycarbonate, polyethylene, polypropylene, cycloolefin polymer, acrylic resin, methacrylic resin, MS resin, polystyrene, poly vinyl chloride, poly vinyl alcohol, triacetyl cellrose, polyether sulfone, polyamide, polyimide, urea melamine resin, epoxy resin, polyurethane, polylactic acid, liquid crystal polymer, and the like. When the polymer is hardly adhesive, it is preferable to conduct an adhesion enhancing treatment such as corona treatment so as to improve adherence to the polymer.

The most preferable usage embodiment of the curable composition of the present invention is an active energy beam-curable hardcoat composition.

In this case, the composition is preferably a composition containing an organic solvent, for the purpose of improving a coating ability. Specific examples of the organic solvent include those described in the section of the curable composition.

Preferable content ratio of the organic solvent in the composition is in the range from 30% to 99.9% by weight.

The hardcoat can be produced according to the conventional method. Examples of the production method include a method in which the curable composition is coated onto a base material, heated and dried, and then the coated film is subjected to irradiation of an active energy beam to cure.

The conditions for coating, heating and drying in this case may be provided in accordance with the conventional method. The irradiation of the active energy beam may be conducted in accordance with the above-described preferable conditions.

The active energy beam-curable hardcoat composition can be used for the formation of a hardcoat of an optical sheet to be used in a liquid crystal display, a projection television and the like, and a hardcoat for a plastic product related to a field of view, such as lenses of eyeglasses, a goggle, and a front face plate of a helmet for a rider of a motorcycle. Additionally, the composition can be also used for the formation of a hardcoat a casing of a mobile product such as a cellular phone, and of a household electric appliance. Further, the composition can be also used for the formation of a hardcoat of a plastic instead of glass. Specifically, the composition can be used for the formation of a hardcoat in case of replacing, by a plastic, window glasses of automobiles, electric trains, and glass parts of construction materials and furnitures.

For a base material other than plastics, the composition is usable in various applications, for a hardcoat of a wooden floor material, an exterior paint for automobiles, bicycles and electric trains, and the like.

In the case where the composition of the present invention is used as a coating agent, the present invention relates to an article in which a cured film made of the composition of the present invention is formed on the surface of a base material.

Specific examples and preferable examples of the base material in this case, include the same ones as those described above.

The formation method of the cured film may be conventional. Example thereof includes a method in which after the composition is coated onto a base material, the coated film is subjected to heating in case of the heat curable composition, and the coated film is subjected to irradiation of active energy beam in case of the active energy beam-curable composition.

The production method of the article is not particularly limited and the conventional methods can be appropriately applied. The preferable method is one including a film formation process in which the curable composition is used to form a film on a base substrate of a polycarbonate or the like, and a curing process in which an active energy beam is irradiated to the film at a dose of 100 mJ/cm² or higher to harden and form a cured film.

Hereinafter, the case in which the base substrate is consisting of a polycarbonate is described.

The size, shape, and the like of the polycarbonate substrate are not particularly limited. They are appropriately selected, depending on the application in which a polycarbonate plate to be formed with a cured film is used.

Additionally, the film formation method onto a polycarbonate substrate may be a conventional method. Examples thereof include a method in which a bar coater or the like is used to coat the curable composition onto a polycarbonate plate.

The coated curable composition on the polycarbonate substrate is formed into a film by volatilizing an organic solvent therefrom. The temperature for volatilizing the organic solvent is preferably in the range from 20° C. to 300° C., more preferably from 30° C. to 100° C., and further preferably from 40° C. to 80° C.

The time for volatilizing the organic solvent is preferably in the range from 1 to 30 minutes, more preferably from 2 to 15 minutes, and further preferably from 3 to 10 minutes.

The thickness of the film formed on the polycarbonate plate is not particularly limited. The thickness thereof is appropriately selected according to the usage of the laminated body and is preferably in the range from 0.1 to 100 µm, more preferably from 1 to 50 µm, and further preferably from 5 to 30 µm.

In the curing process, an active energy beam of 100 mJ/cm² or higher is irradiated to the film formed on the polycarbonate substrate in the film formation process, and the film is subjected to photo-curing to form a cured film.

Examples of the irradiation apparatus for ultraviolet rays include a high-pressure mercury lamp, a metal halide lamp, an electrodeless UV lamp, an LED, and the like.

The irradiation energy is usually in the range from 100 mJ/cm² or higher, preferably from 100 to 5,000 mJ/cm², more preferably from 500 to 3,000 mJ/cm², and further preferably from 2,000 to 3,000 mJ/cm².

The article of the present invention is excellent in curability, scratch resistance, hardness and stability, and is preferably usable in parts of automobiles, various parts of electric products, building materials, and other typical industrial materials. Particularly, the article is also excellent in transparency, it can be optimally used as a substitute of a highly brittle material such as glass.

2. Production Method of Organosilicon Compound

The production method of the organosilicon compound (hereinafter, referred to "organosilicon compound (C2)") of the present invention is characterized in that the method comprises a reaction process in which a silicon compound (A2) represented by the following general formula (5) is subjected to alcohol exchange reaction in 1-propanol and a condensation process in which a silicon compound (B2) represented by the following general formula (6) is added to the resultant composition by the reaction process and a hydrolysis copolycondensation is conducted under an alkaline condition, and that the silicon compound (A2) and the silicon compound (B2) are used so as to be the ratio of 0.3 to 1.8 mol of the silicon compound (A2) based on 1 mol of the silicon compound (B2).

$$SiX^2{}_4 \qquad (5)$$

[In the general formula (5), $X^2$ is a siloxane-bond forming group, and $X^2$s may be the same or different from each other.]

$$R^0-\underset{\underset{R^1{}_n}{|}}{Si}-Y^2{}_{3-n} \qquad (6)$$

[In the general formula (6), $R^0$ is an organic group having a methacryloyl group or an acryloyl group, $R^0$ s may be the same or different from each other, $R^1$ is an organic group containing an alkyl group having 1 to 6 carbon atoms, an aralkyl group having 7 to 10 carbon atoms, or an aryl group having 6 to 10 carbon atoms, $R^1$s may be the same or different from each other, $Y^2$ is a hydrolyzable group, $Y^2$s may be the same or different from each other, and n is 0 or 1.]

2-1. Reaction Process

The reaction process is a process in which the silicon compound (A2) represented by the general formula (5) is subjected to alcohol exchange reaction in 1-propanol and is a process for obtaining a silicon compound having at least one n-propoxy group (hereinafter, referred to as "n-propoxy group-containing silicon compound") by substituting a siloxane-bond forming group in the silicon compound (A2) by an n-propoxy group. The resultant silicon compound is included in the silicon compound (A2).

The silicon compound (A2) is a compound represented by the following general formula (5).

$$SiX^2_4 \tag{5}$$

[In the general formula (5), $X^2$ is a siloxane-bond forming group, and $X^2$s may be the same or different from each other.]

The silicon compound (A2) is one (Q monomer) having four of $X^2$ that is a siloxane-bond forming group. The silicon compound (A2) may be used singly or in combination of two or more types thereof.

As mentioned above, a silicon compound obtained by the reaction process has n-propoxy group and the n-propoxy group is contained in the siloxane-bond forming group. The siloxane-bond forming group in the n-propoxy group-containing silicon compound is subjected to reaction with the hydrolyzable group of the silicon compound (B2) to form a siloxane bond.

The siloxane-bond forming group $X^2$ in the general formula (5) means a hydroxyl group or a hydrolyzable group. The plural $X^2$s may be the same or different from each other.

The hydrolyzable group is not limited so long as it has hydrolyzability. Specific example thereof includes a hydrogen atom, an alkoxy group, a cycloalkoxy group, an aryloxy group, an arylalkoxyl group and the like.

Examples of the alkoxy group include methoxy group, ethoxy group, n-propoxy group, iso-propoxy group, n-butoxy group, iso-butoxy group, sec-butoxy group, tert-butoxy group, n-pentyloxy group, n-hexyloxy group and the like.

Examples the cycloalkoxy group include cyclopentyloxy group, cyclohexyloxy group and the like.

Examples the aryloxy group include phenyloxy group, o-toluoyloxy group, m-toluoyloxy group, p-toluoyloxy group, naphtyloxy group and the like.

Examples the arylalkoxy group include benzyloxy group, and the like.

Among the hydrolyzable groups, an alkoxy group is preferable since the alkoxy group is excellent in hydrolyzability. An alkoxy group having 1 to 3 carbon atoms is more preferable. A methoxy group is further preferable, because the source material thereof is readily available, inexpensive, and easy to control a hydrolysis reaction therefor.

The silicon compound (A2) is exemplified as follows:
(i) a silicon compound, in which four siloxane-bond forming group $X^2$s are the same of different from each other and each is an alkoxy group, cycloalkoxy group, aryloxy group or arylalkoxy group;
(ii) a silicon compound, in which one siloxane-bond forming group $X^2$ is an alkoxy group, cycloalkoxy group, aryloxy group or arylalkoxy group, and the remaining three are the same of different from each other and each is a hydroxyl group or hydrogen atom;
(iii) a silicon compound, in which two siloxane-bond forming group $X^2$s are the same of different from each other and each is an alkoxy group, cycloalkoxy group, aryloxy group or arylalkoxy group, and the remaining two are the same of different from each other and each is a hydroxyl group or hydrogen atom;
(iv) a silicon compound, in which three siloxane-bond forming group $X^2$s are the same of different from each other and each is an alkoxy group, cycloalkoxy group, aryloxy group or arylalkoxy group, and the remaining one is a hydroxyl group or hydrogen atom; and
(v) a silicon compound, in which four siloxane-bond forming group $X^2$s are the same of different from each other and each is a hydroxyl group or hydrogen atom.

Examples of the silicon compound in the embodiment (i) include tetramethoxysilane $Si(OCH_3)_4$, tetraethoxysilane $Si(OC_2H_5)_4$, tetrapropoxysilane $Si(OC_3H_7)_4$, tetrabutoxysilane $Si(OC_4H_9)_4$, triethoxymethoxysilane, tripropoxymethoxysilane, trimethoxyethoxysilane, trimethoxypropoxysilane, diethoxydimethoxysilane, dimethoxydipropoxysilane, and the like. The hydrocarbon group forming the alkoxy group may be linear or branched. The linear hydrocarbon group is preferable since the branched one is susceptible to occurrence of a steric hindrance.

Examples of the silicon compound in the embodiment (ii) include $H_3SiOCH_3$, $H_3SiOC_2H_5$, $H_3SiOC_3H_7$, and the like.

Examples of the silicon compound in the embodiment (iii) include $H_2Si(OCH_3)_2$, $H_2Si(OC_2H_5)_2$, $H_2Si(C_3H_7)_2$, and the like.

Examples of the silicon compound in the embodiment (iv) include $HSi(OCH_3)_3$, $HSi(OC_2H_5)_3$, $HSi(C_3H_7)_3$, and the like.

In addition, examples of the silicon compound in the embodiment (v) include $HSi(OH)_3$, $H_2Si(OH)_2$, $H_3Si(OH)$, $SiH_4$, $Si(OH)_4$, and the like.

The preferable compound is tetramethoxysilane and tetraethoxysilane as the silicon compound (A2). Among these, tetramethoxysilane is preferred since it is readily available and the alcohol exchange reaction with 1-propanol is efficiently conducted.

The alcohol to be used in the reaction process is 1-propanol. This enables to improve a reactivity balance between the composition containing the obtained n-propoxy group-containing silicon compound, and the silicon compound (B2), thereby leading a homogeneous and smooth copolycondensation reaction in the condensation process to be described later.

The amount of 1-propanol to be used is preferably in the range from 0.1 to 10 equivalents, and more preferably from 0.5 to 6 equivalents based on 1 equivalent of the siloxane-bond forming group in the silicon compound (A2).

It is noted that other alcohol such as methanol, ethanol, 2-propanol and 1-butanol may be used in combination.

The reaction temperature for the reaction process is preferably in the range from 0° C. to 100° C., more preferably from 10° C. to 60° C., and further preferably from 15° C. to 30° C.

In addition, the reaction time is in the range from 5 minutes to 30 hours, preferably from 10 minutes to 24 hours, and more preferably from 15 minutes to 24 hours.

The pH of the reaction system in the reaction process may be alkaline, neutral or acidic. However, since the condensation process is to be progressed by means of an alkaline condition, it is possible to utilize the same reaction system and the reaction is preferably conducted under an alkaline condition.

When the reaction process is conducted under an alkaline condition, the pH of the reaction liquid has a value exceeding 7. In this case, the pH of the reaction liquid is preferably in the range from 8 to 13, and further preferably from 9 to 12.

When the alcohol exchange reaction is conducted under an alkaline condition, an alkali agent is usually added. The alkali agent acts as a reaction catalyst for smoothly performing the alcohol exchange reaction between an alkoxy group in the silicon compound (A2) and 1-propanol. Examples of the alkali agent include ammonia, an organic amine, tetramethylammonium hydroxide, tetraethylammonium hydroxide, tetrapropylammonium hydroxide, tetrabutylammonium hydroxide, choline, sodium hydroxide, potassium hydroxide, calcium hydroxide and the like. Among these, an ammonium compound having a quaternary nitrogen atom leading an excellent catalytic activity is preferable. From the viewpoint of the smooth alcohol exchange reaction, tetramethylammonium hydroxide is more preferable. The alkali agent may be used singly or in combination of two or more types thereof.

The amount of the alkali agent to be used is preferably in the range from 0.001 to 0.1 mol, more preferably from 0.01 to 0.08 mol, and further preferably from 0.01 to 0.06 mol based on 1 mol of the silicon compound (A2). When the alkali agent is used in an amount of 0.001 to 0.1 mol, the alcohol exchange reaction is efficiently progressed, being economically preferable.

According to the reaction process, a composition containing n-propoxy group-containing silicon compound having at least one n-propoxy group is obtained. It is noted that the composition may contain a non-reacted silicon compound (A2).

The n-propoxy group-containing silicon compound is preferably one in which two, three or four siloxane bond-forming groups among four siloxane bond-forming groups in the silicon compound (A2) are substituted by n-propoxy groups.

The composition obtained by the reaction process is usually a composition containing two or more kinds of silicon compounds having mutually different numbers of n-propoxy groups. The above effect is remarkable, when an averaged number of n-propoxy groups bonded to a silicon atom per 1 molecule of the n-propoxy group-containing silicon compound is preferably in the range from 1.2 to 3.8, more preferably from 1.5 to 3.6, and further preferably from 1.8 to 3.4 based on the whole of the alkoxysilane compound having an n-propoxy group. The averaged number of n-propoxy groups can be obtained by analysis of the composition with gas chromatography to qualify and quantify detected components.

The reaction product included in a composition obtained by the reaction process may consist of an n-propoxy group-containing alkoxysilane compound. In addition, the reaction product sometimes consists of the n-propoxy group-containing alkoxysilane compound and a non-reacted silicon compound (A2). The content of the n-propoxy group-containing alkoxysilane compound is preferably in the range from 50% to 100% by weight, more preferably from 70% to 100% by weight, and further preferably from 80% to 100% by weight, based on 100% by weight of the silicon compound contained in the composition.

2-2. Condensation Process

The condensation process is a process in which a silicon compound (B2) represented by the following general formula (6) is added to the resultant composition containing the n-propoxy group-containing silicon compound by the reaction process and a hydrolysis copolycondensation is conducted under an alkaline condition.

The composition may contain a silicon compound (A2) except the n-propoxy group-containing silicon compound unless losing the effects of the present invention.

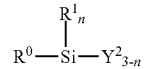

(6)

[In the general formula (6), $R^0$ is an organic group having a methacryloyl group or an acryloyl group, $R^0$s may be the same or different from each other, $R^1$ is an organic group containing an alkyl group having 1 to 6 carbon atoms, an aralkyl group having 7 to 10 carbon atoms, or an aryl group having 6 to 10 carbon atoms, $R^1$s may be the same or different from each other, $Y^2$ is a hydrolyzable group, $Y^2$s may be the same or different from each other, and n is 0 or 1.]

The composition which is a reaction solution after the reaction process can be used as it is.

The silicon compound (B2) may be used singly or in combination of two or more types thereof.

The silicon compound (B2) has an organic group having a methacryloyl group or acryloyl group, and is a component for imparting radical curability to the organosilicon compound (C2) obtained by the production method of the present invention.

In the general formula (6), $R^0$ is not particularly limited so long as it is an organic group having a methacryloyl group or acryloyl group.

$R^0$ is an organic group having a methacryloyl group or acryloyl group, the number of carbon atoms is preferably 20 or less, and more preferably in the range from 4 to 9. The number of carbon atoms of 20 or less enables to impart favorable and stable radical curability to the organosilicon compound (C2) obtained by the production method of the present invention.

In addition, an organic group having the following structure represented by the general formula (7) is preferable as $R^0$ in the general formula (6).

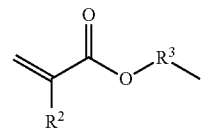

(7)

In the general formula (7), is a hydrogen atom or a methyl group, and preferably is a methyl group.

In the general formula (7), $R^3$ is an alkylene group having 1 to 6 carbon atoms, and is preferably a propylene group (trimethylene group). This is because a compound capable of forming such an organic functional group is readily available or and easy to be synthesized.

In the general formula (6), $R^1$ is not particularly limited so long as it is an organic group having an alkyl group having 1 to 6 carbon atoms, an aralkyl group having 7 to 10 carbon atoms, or an aryl group having 6 to 10 carbon atoms. The plural $R^1$s may be the same or different from each other.

In the general formula (6), $Y^2$ is a hydrolyzable group and is not particularly limited so long as it is a hydrolyzable group. The plural $Y^2$s may be the same or different from each other.

Specific examples of $Y^2$ include a hydrogen atom, alkoxy group, cycloalkoxy group, aryloxy group, arylalkoxy group, and the like.

The alkoxy group is preferably an alkoxy group having 1 to 6 carbon atoms. Example thereof includes methoxy group, ethoxy group, n-propoxy group, iso-propoxy group, n-butoxy group, iso-butoxy group, sec-butoxy group, tert-butoxy group, n-pentyloxy group, n-hexyloxy group and the like.

The cycloalkoxy group is preferably a cycloalkoxy group having 3 to 8 carbon atoms. Example thereof includes cyclopentyloxy group, cyclohexyloxy group and the like.

The aryloxy group is preferably an aryloxy group having 6 to 10 carbon atoms. Example thereof includes phenyloxy group, o-toluoyloxy group, m-toluoyloxy group, p-toluoyloxy group, naphtyloxy group and the like.

The arylalkoxy group is preferably an aralkyloxy group having 7 to 12 carbon atoms. Example thereof includes benzyloxy group, and the like.

$Y^2$ in the general formula (6) is preferably an alkoxy group since the alkoxy group is excellent in hydrolyzability. An alkoxy group having 1 to 3 carbon atoms is more preferable in the present invention. A methoxy group is further preferable, because the source material thereof is readily available, inexpensive, and easy to control a hydrolysis reaction therefor.

In the general formula (6), n is 0 or 1. A silicon compound (B2) in which n is 0 has three hydrolyzable groups, and is also called "T monomer". In turn, the silicon compound (B2) in which n is 1 has two hydrolyzable groups, and is also called "D monomer".

The ratio between inorganic moiety and organic moiety that are described below is not particularly limited in the obtained organosilicon compound (C2). It is preferable to use the T monomer in which n is 0 to make the compound higher in ratio of inorganic moiety.

Examples of the T monomer include 2-acryloxyethyl trimethoxysilane, 2-acryloxyethyl triethoxysilane, 3-acryloxypropyl trimethoxysilane, 3-acryloxypropyl triethoxysilane, 2-methacryloxyethyl trimethoxysilane, 2-methacryloxyethyl triethoxysilane, 3-methacryloxypropyl trimethoxysilane, 3-methacryloxypropyl triethoxysilane, and the like.

For the purpose of making the obtained organosilicon compound (C2) more excellent in solubility in an organic solvent in the present invention, the D monomer in which n is preferably 1 is preferably used.

Examples of the D monomer include acryloxymethyl methyldimethoxysilane, acryloxymethyl methyldiethoxysilane, acryloxymethyl methyldipropoxysilane, acryloxyethyl methyldimethoxysilane, acryloxyethyl methyldiethoxysilane, acryloxyethyl methyldipropoxysilane, acryloxypropyl methyldimethoxysilane, acryloxypropyl methyldiethoxysilane, acryloxypropyl methyldipropoxysilane, acryloxymethyl ethyldimethoxysilane, acryloxymethyl ethyldiethoxysilane, acryloxymethyl ethyldipropoxysilane, acryloxyethyl ethyldimethoxysilane, acryloxyethyl ethyldiethoxysilane, acryloxyethyl ethyldipropoxysilane, acryloxypropyl ethyldimethoxysilane, acryloxypropyl ethyldiethoxysilane, acryloxypropyl ethyldipropoxysilane, acryloxymethyl propyldimethoxysilane, acryloxymethyl propyldiethoxysilane, acryloxymethyl propyldipropoxysilane, acryloxyethyl propyldimethoxysilane, acryloxyethyl propyldiethoxysilane, acryloxyethyl propyldipropoxysilane, acryloxypropyl propyldimethoxysilane, acryloxypropyl propyldiethoxysilane, acryloxypropyl propyldipropoxysilane, acryloxymethyl phenyldimethoxysilane, acryloxymethyl phenyldiethoxysilane, acryloxymethyl phenyldipropoxysilane, acryloxyethyl phenyldimethoxysilane, acryloxyethyl phenyldiethoxysilane, acryloxyethyl phenyldipropoxysilane, acryloxypropyl phenyldimethoxysilane, acryloxypropyl phenyldiethoxysilane, acryloxypropyl phenyldipropoxysilane, acryloxymethyl methyldiphenoxysilane, acryloxyethyl methyldiphenoxysilane, acryloxypropyl methyldiphenoxysilane, acryloxymethyl ethyldiphenoxysilane, acryloxyethyl ethyldiphenoxysilane, acryloxypropyl ethyldiphenoxysilane, acryloxymethyl methyldibenzyloxysilane, acryloxyethyl methyldibenzyloxysilane, acryloxypropyl methyldibenzyloxysilane, acryloxymethyl ethyldibenzyloxysilane, acryloxyethyl ethyldibenzyloxysilane, acryloxypropyl ethyldibenzyloxysilane, and the like.

Further, from the viewpoint of a balance between an inorganic ratio in the organosilicon compound (C2) and the solubility of the compound into an organic solvent, a silicon compound (B2) in which n is 0 and a silicon compound (B2) in which n is 1 can be used in combination. In the case of using these compounds, the ratio of the silicon compound (B2) in which n is 0 and silicon compound (B2) in which n is 1 is appropriately selected according to the usage of the resultant organosilicon compound (C2).

The silicon compound (B2) is preferably a T monomer.

Regarding usage ratio of the silicon compound (A2) and silicon compound (B2), the amount of the silicon compound (A2) is in the range from 0.3 to 1.8 mol, preferably from 0.8 to 1.8 mol, and further preferably from 1 to 1.8 mol based on 1 mol of the silicon compound (B2). When the amount of the silicon compound (A2) to be used is in the range from 0.3 to 1.8 mol based on 1 mol of the silicon compound (B2), the hydrolysis copolycondensation reaction can be smoothly progressed to produce an organosilicon compound (C2) efficiently without generating a gel during and after the reaction.

Additionally, when the hydrolysis is conducted in the condensation process, water is usually used. The amount of water to be used is preferably in the range from 0.5 to 10 equivalents, and more preferably from 1 to 5 equivalents relative to 1 equivalent of the hydrolyzable group included in the starting silicon compound (the silicon compound (B2), and the silicon compound (A2) in case of having a hydrolyzable group). If the amount of water to be used is too little, the reaction may be insufficiently progressed. On the other hand, if the amount of water is too much, a process for removing water after reaction may be longer, being uneconomical.

The reaction for the condensation process is conducted in an alkaline condition. The pH of the reaction liquid is exceeding 7. The pH is preferably 8 or more, and further preferably 9 or more. The upper limit of the pH is usually 13. Keeping the reaction system at such a pH enables to produce an organosilicon compound (C2) excellent in storage stability at a higher yield.

If the reaction condition is acidic (less than pH 7), the resulting organosilicon compound by hydrolysis copolycondensation may be one inferior in storage stability and may be gelated during storage according to the reaction condition or the like.

Additionally, under a neutral condition (near pH 7), the hydrolysis copolycondensation reaction is difficult to progress, thereby failing to obtain the targeted organosilicon compound, at a higher yield.

When the pH of the reaction liquid is 8 or higher, the hydrolysis copolycondensation reaction is efficiently progressed with high yield.

The method for bringing the reaction system into an alkaline condition in the condensation process, is not particularly limited. When the reaction system is adjusted to the above-mentioned preferable pH range, an alkali agent is usually added thereto. It is noted that the hydrolysis copolycondensation can be conducted without newly adding an alkali agent, when the condensation process is to be progressed in the same reaction system as one in the reaction process in which alcohol exchange reaction of the silicon compound (A2) is conducted, where the reaction system is in the above-mentioned preferable pH range.

Examples of the alkali agent include ammonia, an organic amine, tetramethylammonium hydroxide, tetraethylammonium hydroxide, tetrapropylammonium hydroxide, tetrabutylammonium hydroxide, choline, sodium hydroxide, potassium hydroxide, calcium hydroxide and the like. Among these, an ammonium compound having a quaternary nitrogen atom leading an excellent catalytic activity is preferable. From the viewpoint of the smooth hydrolysis condensation reaction, tetramethylammonium hydroxide is more preferable. The alkali agent may be used singly or in combination of two or more types thereof.

The alkali agent functions as a reaction catalyst for smooth copolycondensation reaction based on a hydrolysis using a siloxane-bond forming group in the n-propoxy group containing silicon compound and a hydrolyzable group in the silicon compound (B2).

When the alkali agent is used in the condensation process, the amount of the alkali agent to be used is preferably in the range from 0.001 to 0.20 mol, more preferably from 0.01 to 0.1 mol, and further preferably from 0.01 to 0.08 mol based on 1 mol of the total mol number of the silicon compound (A2) and the silicon compound (B2). When the alkali agent is used in an amount of 0.001 to 0.1 mol, the hydrolysis copolycondensation reaction is smoothly progressed.

In the condensation process, an organic solvent is preferably used as the reaction solvent. Examples of the organic solvent include an alcohol such as methyl alcohol, ethyl alcohol, 1-propanol and 2-propanol, a ketone such as acetone and methylethylketone, tetrahydrofurane, toluene, 1,4-dioxane, hexane, ligroin, and the like. Among these, a solvent having higher polarity such as alcohol and ketone is preferable because of the excellent solubility of the organosilicon compound (C2). The organic solvent may be used singly or in combination of two or more types thereof.

The reaction temperature for the condensation process is preferably in the range from 0° C. to 120° C., more preferably from 10° C. to 80° C. and further preferably from 40° C. to 80° C.

In addition, the reaction time for the process is in the range from 30 minutes to 30 hours, preferably from 30 minutes to 10 hours, and more preferably from 1 to 5 hours.

In the condensation process, it is also possible to use a polymerization inhibitor for inhibiting polymerization of an acryloyl group and a methacryloyl group.

The polymerization inhibitor is not particularly limited, and it is also possible to use a radical catching agent to be typically used. Example thereof includes hydroquinone, hydroquinone monomethylether, 2,6-di-tert-butyl-4-methylphenol, 2,4-dimethyl-6-tert-butylphenol, 3-hydroxythiophenol, α-nitroso-β-naphthol, p-benzoquinone, N-nitrosophenyl hydroxylamine aluminum salt, 2-[1-(2-hydroxy-3,5-di-tert-pentylphenyl)ethyl]-4,6-di-tert-pentylphenyl acrylate, a copper salt, and the like.

These compounds may be used singly or in combination of two or more types thereof.

In case that the polymerization inhibitor, such as hydroquinone and hydroquinone monomethylether fails to exhibit a polymerization inhibiting ability under an anaerobic condition, it is preferable to appropriately supply oxygen.

The amount of the polymerization inhibitor to be used is preferably in the range from 1 ppm by weight to 2,000 ppm by weight, more preferably from 10 ppm by weight to 1,000 ppm by weight, and further preferably from 100 ppm by weight to 500 ppm by weight based on a theoretical yield of the organosilicon compound (C2). When the usage amount of the polymerization inhibitor is within the above range, it is possible to restrict a defect such as a formation of gel during desolvation under reduced pressure and a deteriorated storage stability of the resultant organosilicon compound (C2). Excessively larger usage amounts of the polymerization inhibitor occasionally lead to a strengthened coloration caused by the polymerization inhibitor, and an occurrence of an obstructing factor upon curing the composition containing the resultant organosilicon compound (C2).

The polymerization inhibitor may be used before start of the condensation process or during the reaction.

The present invention may have other processes such as neutralization process, as described later. The period for using the polymerization inhibitor may be after each process.

2-3. Other Processes

In the production method of the organosilicon compound of the present invention, a neutralization process, volatile component removing process (1), dissolving process, washing process and volatile component removing process (2) can be further included after the condensation process.

The neutralization process is a process in which the reaction liquid containing the organosilicon compound (C2) obtained in the first process is subjected to neutralization with an acid. Examples of the acid include an inorganic acid such as phosphoric acid, nitric acid, sulfuric acid and hydrochloric acid, an organic acid such as a carboxylic acid including acetic acid, formic acid, lactic acid, acrylic acid and the like, a sulfonic acid including p-toluenesulfonic acid, methanesulfonic acid, and the like. Among these, nitric acid is preferable, because nitric acid hardly exerts adverse effects on the stability of methacryloyl group and acryloyl group (an addition reaction of the acid to a methacryloyl group or acryloyl group is hardly caused), and is apt to be relatively readily removed by water washing. The amount of the acid to be used is appropriately selected depending on the pH of a reaction liquid containing the organosilicon compound (C2). The amount thereof is preferably in the range from 1 to 1.1 equivalent, and more preferably from 1 to 1.05 equivalent relative to 1 equivalent of the alkali agent contained in the reaction liquid.

The volatile component removing process (1) is a process in which a volatile component is removed from the neutralized liquid obtained in the neutralization process. In the volatile component removing process (1), distillation is conducted under a condition of ordinary pressure or reduced pressure. The volatile component to be removed is mainly an organic solvent used as the reaction solvent in the neutralization process. This process is usually conducted when such an organic solvent is used, which is compatibly mixed with water, like methanol, because such a solvent is inconvenient for washing by water (washing process) to be described later.

The volatile component removing process (1) and dissolving process to be described later can be omitted, in case that the reaction solvent in the condensation process is incompatible with water and is an organic solvent suitable for washing by water in the washing process, and in case that, although the reaction solvent in the condensation process is one such as an alcohol, which compatibly mixes with water, washing process can be conducted by adding a large amount of an organic solvent suitable for washing by water in the washing process.

The dissolving process is a process in which the concentrated liquid obtained in the volatile component removing process (1) is subjected to mixing and contacting with an organic solvent for washing to dissolve at least an organosilicon compound (C2) in the organic solvent for washing. As the organic solvent for washing, a compound is used which dissolves the organosilicon compound (C2) as a reaction product therein and which is incompatible with water. The term "incompatible with water" implies that, when water and the organic solvent for washing are sufficiently mixed with each other and then the mixture is left to stand still, the mixture is separated into a water layer and an organic layer.

Examples of the preferable organic solvent for washing include a ketone such as methyl ethyl ketone, an ether such as diisopropylether, an aromatic hydrocarbon such as toluene, an aliphatic hydrocarbon such as hexane, an ester such as ethyl acetate, and the like.

The organic solvent for washing may be the same as or different from the reaction solvent used in the condensation process.

The washing process is a process in which the organic liquid obtained in the dissolving process is washed with water, and an organic solution containing the organosilicon compound (C2) is obtained. The organic solution means a liquid obtained in the neutralization process when the volatile component removing process (1) and dissolving process are aborted. By means of the washing process, the alkali agent used in the condensation process, the acid used in the neutralization process, and the salt thereof are all contained in the water layer, and are substantially removed from the organic layer.

The washing process includes a process in which water and the organic liquid are subjected to mixing to contact the water and the organic liquid, and a process in which a water layer and an organic layer that is a layer containing the organosilicon compound (C2) are separated to recover the organic layer (organic solution). In these processes, when mixing of water and the organic liquid is insufficient, when contact of water and the organic liquid is insufficient, or when the separation of the organic layer (organic liquid) from the water layer is insufficient, the resulting organosilicon compound (C2) sometimes contains a large amount of impurities and is an organosilicon compound (C2) having inferior stability.

The temperature in the process for mixing and contacting water with the organic liquid in the washing process is not particularly limited and is preferably in the range from 0° C. to 70° C., and more preferably from 10° C. to 60° C. Further, the temperature in the process for separating the organic layer from the water layer is not particularly limited and is preferably in the range from 0° C. to 70° C., and more preferably from 10° C. to 60° C. It is preferable to set the treating temperatures in the two processes at a temperature range of 40° C. to 60° C. from the viewpoint of a shortening effect of the time for separating the organic layer from the water layer.

The volatile component removing process (2) is a process in which a volatile component is removed from the organic solution obtained in the washing process. Distillation is conducted under a condition of ordinary pressure (atmospheric pressure) or reduced pressure in the volatile component removing process (2). The volatile component to be removed in the volatile component removing process (2) is mainly the organic solvent for washing used in the dissolving process. If the other volatile components are contained, all are removed simultaneously in this process.

The organosilicon compound (C2) of the present invention is separated by the above-mentioned processes.

It is noted that, when the organosilicon compound (C2) is to be provided as a solution obtained by dissolving the compound in an organic solvent, it is possible to directly use the organic solvent used in the dissolving process as the solvent for the organosilicon compound (C2) and to omit the volatile component removing process (2).

In the production method of the organosilicon compound (C2) of the present invention, the condensation ratio between the silicon compound (B2) and the composition including an n-propoxy group containing silicon compound can be 92% or higher, more preferably 95% or higher, and further preferably 98% or higher. Although it is most preferable that substantially all the siloxane-bond forming groups (including a hydrolyzable group) are condensed, the upper limit of the condensation ratio is typically 99.9%.

As mentioned above, in a copolycondensation reaction of Q monomers and T monomers by a known method such as a production method under an acidic condition, it is difficult to homogeneously react both of them with each other, and gel is likely to be formed. Thus, a method is known to avoid gelation, which is configured to cause a silicon compound (M monomer) such as trimethylalkoxysilane and hexamethyldisiloxane, having only one siloxane—bond forming group, to act as an end capping agent.

However, although gelation can be avoided by using M monomers in a predetermined amount or more, the inorganic property of the obtained organosilicon compound tends to be lowered. Although the present invention is configured to copolycondense the T monomer and/or D monomer and the Q monomer without causing gelation, it is possible to combiningly use the M monomer at such a lower ratio not to lower the inorganic property. Specifically, in the condensation process, it is possible to use the M monomer in an amount of 10 mol or less based on 100 mol of the total mol number of the silicon compound (A2) and silicon compound (B2).

2-4. Silicon Compound (C2)

The organosilicon compound (C2) is obtained by the above processes. The resultant organosilicon compound (C2) is a polysiloxane having a three-dimensional siloxane bond (Si—O—Si) formed by hydrolysis of the siloxane-bond forming group, hydrolyzable group and n-propoxy group, and having a methacryloyl group and/or acryloyl group. Most of the siloxane-bond forming group and hydrolyzable group are converted into a siloxane bond, while restricting polymerization based on the methacryloyl group and/or acryloyl group contained in the silicon compound (A2) in the condensation process.

Further, the organosilicon compound (C2) has a methacryloyl groups and/or acryloyl groups, and thus possesses a radical curability. Radical curing of the organosilicon compound (C2) leads to a cured film which is high in surface hardness and excellent in scratch resistance.

The organosilicon compound (C2) has an organic moiety and an inorganic moiety, in its structure. $R^0$ and $R^1$ in the general formula (6) representing the silicon compound (B2) constitute the organic moiety. When a part of at least one of the hydrolyzable group such as an alkoxy group derived from the silicon compound (B2) and n-propoxy group containing silicon compound in the composition, is remained, such a residue is also included in the organic moiety. The moiety other than the organic moiety is the inorganic moiety including no carbon atoms.

When the organosilicon compound (C2) has a siloxane-bond forming group (including a hydrolyzable group), the remaining ratio thereof can be calculated from a chart of $^1$H NMR (nuclear magnetic resonance). The fact that "all the hydrolyzable groups have been substantially condensed" can be confirmed by a fact that peaks based on siloxane-bond forming groups are rarely observed in an NMR chart for the obtained organosilicon compound (C2) which is a polysiloxane compound.

The organosilicon compound (C2) has usually a T monomer unit and Q monomer unit, as constitutional units.

In such a case, the organosilicon compound (C2) is allowed to have a structure in a partially laddered, caged, or randomized shape.

The number-average molecular weight of the organosilicon compound (C2) is preferably in the range from 500 to 100,000, more preferably from 1,000 to 50,000, and further preferably from 2,000 to 20,000, which is determined relative to polystyrene standards by gel permeation chromatographic (GPC) analysis.

In the present invention, the preferable method for producing an organosilicon compound (C2) which is hardly gelated during or after the production thereof and is excellent in stability is a method including a reaction process in which at least one n-propoxy group containing compound is used as the silicon compound (A2) to form a composition in which an averaged number of n-propoxy groups per 1 molecule of the n-propoxy group-containing compound is in the range from 1.2 to 3.8, and a condensation process in which the composition and the silicon compound (B2) are subjected to hydrolysis copolycondensation.

EXAMPLE

Hereinafter, the present invention is specifically described using Examples. The present invention is not limited to these Examples.

In the following description, "Mn" means number average molecular weight, "Mw" means weight average molecular weight, and they are values calculated reduced to standard polystyrene by gel permeation chromatography (hereinafter, referred to as "GPC").

Additionally, $^1$H NMR analysis for the obtained organosilicon compounds (C1) and (C2) was conducted using a proton of hexamethyldisiloxane (hereinafter referred to as "HMDSO") as a standard after precise weighing about 1 g of a sample and about 100 mg of HMDSO as an internal standard substance and mixing.

1. Production and Evaluation of Curable Composition 1-1. Synthesis of Organosilicon Compound (C1)

Synthesis Example 1-1

150 g of 1-propanol for alcohol exchange reaction and 36.53 g (0.24 mol) of tetramethoxysilane (hereinafter, referred to as "TMOS") as a Q monomer were charged into a reaction vessel provided with a stirrer and a thermometer, and then 4.37 g of a methanol solution of 25% by weight of tetramethylammonium hydroxide (containing 0.1 mol of methanol and 12 mmol of tetramethylammonium hydroxide) was gradually added therein while stirring to react at a temperature of 25° C. and a pH of 9 for 6 hours. After that, the internal temperature was brought to 60° C., and the reaction was further conducted. When the reaction liquid was subjected to gas chromatographic analysis using TCD detector, compounds (including mono-substituted product to tetra-substituted product) where methoxy groups of TMOS were substituted by n-propoxy groups, respectively and an unreacted TMOS were detected. The TMOS was detected only in a trace amount. The ratio of the n-propoxy group-containing compounds among them was substantially 100% by weight as a total. Based on the peak area of the product in the gas chromatogram, a number of substituted 1-propanols (an averaged number of n-propoxy groups per 1 molecule of the n-propoxy group-containing compound) was obtained to be 2.7.

Subsequently, 59.62 g (0.24 mol) of 3-methacryloxypropyl trimethoxysilane as a T monomer was added into the reaction liquid, followed by addition of 30.2 g of water thereinto. Further, 7.88 g of a methanol solution of 25% by weight of tetramethylammonium hydroxide (containing 0.18 mol of methanol and 21.6 mmol of tetramethylammonium hydroxide) was added while stirring to react at a temperature of 25° C. and a pH of 9 for 24 hours. After that, 22.2 g (35.3 mmol) of an aqueous solution of 10% by weight of nitric acid was added to neutralize them. Next, this neutralized liquid was added into a mixed liquid of 120 g of diisopropyl ether and 180 g of water, thereby conducting extraction. The diisopropyl ether layer was washed with water to remove salts and excessive acids therefrom, and then 11.5 mg of N-nitrosophenyl hydroxylamine aluminum salt (trade name "Q-1301" manufactured by Wako Pure Chemical Ind., Ltd.) as a polymerization inhibitor was added thereto. Organic solvents were distilledly removed from the resultant diisopropyl ether solution under reduced pressure to obtain an organosilicon compound (C1-1) which was colorless, transparent and solid (See, Table 1). The yield thereof was 57.72 g. Hereinafter, the yield to be thus obtained will be called "isolation yield".

The organosilicon compound (C1-1) was subjected to $^1$H NMR analysis to confirm a presence of a methacryloyl group.

According to the result of $^1$H NMR analysis, the content of a structural unit (T monomer unit) derived from the silicon compound (A1), i.e., derived from the T monomer, and the content of an alkoxy group in the organosilicon compound [[(C1)]] (C1-1) were determined. Based on these contents, the content of a structural unit (Q monomer unit) derived from the silicon compound (B1), i.e., derived from the Q monomer, was calculated. As a result, the obtained organosilicon compound [[(C1)]] (C1-1) was confirmed to be a copolycondensate by stoichiometric reaction of the silicon compound (A1) and the silicon compound (B1).

The content of the alkoxy group (n-propoxy group bonded to a silicon atom) of the organosilicon compound (C1-1) calculated from $^1$H NMR chart, was an amount corresponding to 2.5% based on the total amount of the alkoxy group contained in the starting materials.

Mn was 9,600.

Synthesis Example 1-2

56.3 g of 1-propanol and 15.22 g (0.1 mol) of TMOS were charged into a reaction vessel provided with a stirrer and a thermometer, and then 1.82 g of a methanol solution of 25% by weight of tetramethylammonium hydroxide (containing 0.04 mol of methanol and 5 mmol of tetramethylammonium hydroxide) was gradually added therein while stirring to react at a temperature of 25° C. and a pH of 9 for one hour. When the reaction liquid was subjected to gas chromatographic analysis using TCD detector, compounds (including mono-substituted product to tetra-substituted product) where methoxy groups of TMOS were substituted by n-propoxy groups, respectively and an unreacted TMOS were detected. The ratio of the n-propoxy group-containing compounds among them was 99% by weight as a total. When a number of substituted 1-propanols (an averaged number of n-propoxy groups per 1 molecule of the n-propoxy group-containing compound) was measured in the same manner as that in Synthesis Example 1-1, it was 2.9. After that, 23.42 g (0.1 mol) of 3-acryloxypropyl trimethoxysilane was added into the reaction liquid, followed by addition of 12.32 g of water thereinto. Further, 3.28 g of a methanol solution of 25% by weight of tetramethylammonium hydroxide (containing 0.08 mol of methanol and 9 mmol of tetramethylammonium hydroxide) was added while stirring to react at a temperature of 65° C. and a pH of 9 for 2 hours. After that, 9.3 g (14.7 mmol) of an aqueous solution of 10% by weight of nitric acid was added to neutralize them. Next, this neutralized liquid was added into a mixed liquid of 80 g of ethyl acetate and 125 g of water, thereby conducting extraction. The ethyl acetate layer was washed with water to remove salts and excessive acids therefrom, and then 4.3 mg of the above-mentioned polymerization inhibitor was added thereto. Organic solvents were distilledly removed from the resultant ethyl acetate solution under reduced pressure to obtain an organosilicon compound (C1-2) which was colorless, transparent and solid (See, Table 1). The isolation yield thereof was 21.5 g.

The organosilicon compound (C1-2) was subjected to $^1$H NMR analysis. It was confirmed that an acryloyl group was present and that the organosilicon compound (C1-2) was a copolycondensate by stoichiometric reaction of the silicon compound (A1) and the silicon compound (B1).

The content of the alkoxy group (n-propoxy group bonded to a silicon atom) of the organosilicon compound (C1-2) calculated from $^1$H NMR chart, was an amount corresponding to 6% based on the total amount of the alkoxy group contained in the starting materials.

Mn was 11,000.

Synthesis Example 1-3

270 g of 1-propanol and 45.68 g (0.3 mol) of TMOS were charged into a reaction vessel provided with a stirrer and a thermometer, and then 2.46 g of a methanol solution of 25% by weight of tetramethylammonium hydroxide (containing 0.06 mol of methanol and 6.75 mmol of tetramethylammonium hydroxide) was gradually added therein while stirring to react at a temperature of 25° C. and a pH of 9 for 24 hours. When the reaction liquid was subjected to gas chromatographic analysis using TCD detector, compounds (including mono-substituted product to tetra-substituted product) where methoxy groups of TMOS were substituted by n-propoxy groups, respectively were detected, but TMOS was not detected. When a number of substituted 1-propanols (an averaged number of n-propoxy groups per 1 molecule of the n-propoxy group-containing compound) was measured in the same manner as that in Synthesis Example 1-1, it was 3.3. After that, 49.67 g (0.2 mol) of 3-methacryloxypropyl trimethoxysilane was added into the reaction liquid, followed by addition of 32.4 g of water thereinto. Further, 15.77 g of a methanol solution of 25% by weight of tetramethylammonium hydroxide (containing 0.37 mol of methanol and 43.25 mmol of tetramethylammonium hydroxide) was added while stirring to react at a temperature of 65° C. and a pH of 9 for 2 hours. After that, 33.1 g (52.5 mmol) of an aqueous solution of 10% by weight of nitric acid was added to neutralize them. Next, this neutralized liquid was added into a mixed liquid of 220 g of diisopropyl ether and 200 g of water, thereby conducting extraction. The diisopropyl ether layer was washed with water to remove salts and excessive acids therefrom, and then 11 mg of the above-mentioned polymerization inhibitor was added thereto. Organic solvents were distilledly removed from the resultant diisopropyl ether solution under reduced pressure to obtain an organosilicon compound (C1-3) which was colorless, transparent and solid (See, Table 1). The isolation yield thereof was 53.94 g.

The organosilicon compound (C1-3) was subjected to $^1$H NMR analysis. It was confirmed that a methacryloyl group was present and that the organosilicon compound (C1-3) was a copolycondensate by stoichiometric reaction of the silicon compound (A1) and the silicon compound (B1).

The content of the alkoxy group (n-propoxy group bonded to a silicon atom) of the organosilicon compound (C1-3) calculated from $^1$H NMR chart, was an amount corresponding to 1.3% based on the total amount of the alkoxy group contained in the starting materials.

Mn was 3,300.

Synthesis Example 1-4

80 g of 1-propanol and 11.00 g (0.07 mol) of TMOS were charged into a reaction vessel provided with a stirrer and a thermometer, and then 0.57 g of a methanol solution of 25% by weight of tetramethylammonium hydroxide (containing 0.01 mol of methanol and 1.55 mmol of tetramethylammonium hydroxide) was gradually added therein while stirring to react at a temperature of 25° C. and a pH of 9 for 20 minutes. When the reaction liquid was subjected to gas chromatographic analysis using TCD detector, compounds (including mono-substituted product to tetra-substituted product) where methoxy groups of TMOS were substituted by n-propoxy groups, respectively were detected, but TMOS was not detected. When a number of substituted 1-propanols (an averaged number of n-propoxy groups per 1 molecule of the n-propoxy group-containing compound) was measured in the sane manner as that in Synthesis Example 1-1, it was 2.6. After that, 9.93 g (0.04 mol) of 3-methacryloxypropyl trimethoxysilane was added into the reaction liquid, followed by addition of 7.36 g of water thereinto. Further, 3.53 g of a methanol solution of 25% by weight of tetramethylammonium hydroxide (containing 0.08 mol of methanol and 9.67 mmol of tetramethylammonium hydroxide) was added while stirring to react at a temperature of 65° C. and a pH of 9 for 2 hours. After that, 7.41 g (11.75 mmol) of an aqueous solution of 10% by weight of nitric acid was added to neutralize them. Next, this neutralized liquid was added into a mixed liquid of 70 g of diisopropyl ether and 65 g of water, thereby conducting extraction. The diisopropyl ether layer was washed with washer to remove salts and excessive acids therefrom, and then 2.2 mg of the above-mentioned polymerization inhibitor was added thereto. Organic solvents were distilledly removed from the resultant diisopropyl ether solution under reduced pressure to obtain an organosilicon compound (C1-4) which was light yellow, transparent and solid (See, Table 1). The isolation yield thereof was 11.42 g.

The organosilicon compound (C1-4) was subjected to $^1$H NMR analysis. It was confirmed that a methacryloyl group was present and that the organosilicon compound (C1-4) was a copolycondensate by stoichiometric reaction of the silicon compound (A1) and the silicon compound (B1).

The content of the alkoxy group (n-propoxy group bonded to a silicon atom) of the organosilicon compound (C1-4) calculated from $^1$H NMR chart, was an amount corresponding to 3.8% based on the total amount of the alkoxy group contained in the starting materials.

Mn could not be determined precisely since components exceeding a detection limit (molecular weight of 400,000) of the GPC column were included. When the resultant chromatogram was used to measure an area of components (in which retention time was in the range from 6 to 10 minutes) exceeding the detection limit of the column and an area of components (in which retention time was exceeding 11 minutes and 16 minutes or less) not exceeding the detection limit. The ratio thereof was 5:3.

Synthesis Example 1-5

55 g of methanol, 26.44 g (0.1 mol) of tetra-n-propoxysilane and 24.84 g (0.1 mol) of 3-methacryloxypropyl trimethoxysilane were charged into a reaction vessel provided with a stirrer and a thermometer, and then 13.51 g of an aqueous solution of 7% by weight of tetramethylammonium hydroxide (containing 0.7 mol of water and 10 mmol of tetramethylammonium hydroxide) was gradually added therein while stirring to react at a temperature of 25° C. for 3 hours and then at 65° C. for 2 hours, both at a pH of 9. After that, 6.6 g (10.5 mmol) of an aqueous solution of 10% by weight of nitric acid was added to neutralize them. Subsequently, 2.4 mg of the above-mentioned polymerization inhibitor was added to this neutralized liquid. Organic solvents and water were distilledly removed from the mixture under reduced pressure. And then, the obtained residue was added into a mixed liquid of 90 g of ethyl acetate and 25 g of water, thereby conducting extraction. The ethyl acetate layer was washed with water to remove salts and excessive acids therefrom, and then 2.2 mg of the above-mentioned polymerization inhibitor was added thereto. Organic solvents was distilledly removed from the resultant ethyl acetate solution under reduced pressure to obtain an organosilicon compound (C1-5) which was colorless, transparent and solid (See, Table 2). The isolation yield thereof was 22.77 g.

The organosilicon compound (C1-5) was subjected to $^1$H NMR analysis. It was confirmed that a methacryloyl group was present and that the organosilicon compound (C1-5) was a copolycondensate by stoichiometric reaction of the silicon compound (A1) and the silicon compound (B1).

The content of the alkoxy group (n-propoxy group bonded to a silicon atom) of the organosilicon compound (C1-5) calculated from $^1$H NMR chart, was an amount corresponding to 3.6% based on the total amount of the alkoxy group contained in the starting materials.

Mn of the resultant organosilicon compound (C1-5) was 8,200.

Synthesis Example 1-6

185 g of methanol, 15.21 g (0.1 mol) of tetramethoxysilane and 24.85 g (0.1 mol) of 3-methacryloxypropyl trimethoxysilane were charged into a reaction vessel provided with a stirrer and a thermometer, and then 13.9 g of an aqueous solution of 9.2% by weight of tetramethylammonium hydroxide (containing 0.7 mol of water and 14 mmol of tetramethylammonium hydroxide) was gradually added therein while stirring to react at a temperature of 25° C. for 30 minutes and then at 65° C. for 2.5 hours, both at a pH of 9. After that, 9.26 g (14.7 mmol) of an aqueous solution of 10% by weight of nitric acid was added to neutralize them. Subsequently, 2.4 mg of the above-mentioned polymerization inhibitor was added to this neutralized liquid. Organic solvents and water were distilledly removed from the mixture under reduced pressure. And then, the obtained residue was added into a mixed liquid of 90 g of ethyl acetate and 30 g of water, thereby conducting extraction. The ethyl acetate layer was washed with water to remove salts and excessive acids therefrom, and then 2.5 mg of the above-mentioned polymerization inhibitor was added thereto. Organic solvents was distilledly removed from the resultant ethyl acetate solution under reduced pressure to obtain an organosilicon compound (C1-6) which was colorless, transparent and solid (See, Table 2). The isolation yield thereof was 22.0 g.

The organosilicon compound (C1-6) was subjected to $^1$H NMR analysis. It was confirmed that a methacryloyl group was present and that the organosilicon compound (C1-6) was a copolycondensate by stoichiometric reaction of the silicon compound (A1) and the silicon compound (B1).

The content of the alkoxy group (n-propoxy group bonded to a silicon atom) of the organosilicon compound (C1-6) calculated from $^1$H NMR chart, was an amount corresponding to 4.2% based on the total amount of the alkoxy group contained in the starting materials.

Mn of the resultant organosilicon compound (C1-6) was 6,000.

Synthesis Example 1-7

36.35 g of methanol, 10.95 g (0.072 mol) of tetramethoxysilane and 9.95 g (0.04 mol) of 3-methacryloxypropyl trimethoxysilane were charged into a reaction vessel provided with a stirrer and a thermometer, and then 8.07 g of an aqueous solution of 8.9% by weight of tetramethylammonium hydroxide (containing 0.41 mol of water and 7.84 mmol of tetramethylammonium hydroxide) was gradually added therein while stirring to react at a temperature of 25° C. for 1 hour and then at 60° C. for 1.5 hours, both at a pH of 9. After that, 5.28 g (8.38 mmol) of an aqueous solution of 10% by weight of nitric acid was added to neutralize them. Subsequently, 2.4 mg of the above-mentioned polymerization inhibitor was added to this neutralized liquid. Organic solvents and water were distilledly removed from the mixture under reduced pressure. And then, the obtained residue was added into a mixed liquid of 80 g of ethyl acetate and 40 g of water, thereby conducting extraction. The ethyl acetate layer was washed with water to remove salts and excessive acids therefrom, and then 2.9 mg of the above-mentioned polymerization inhibitor was added thereto. Organic solvents was distilledly removed from the resultant ethyl acetate solution under reduced pressure to obtain an organosilicon compound (C1-7) which was colorless, transparent and solid (See, Table 2). The isolation yield thereof was 10.5 g.

The organosilicon compound (C1-7) was subjected to $^1$H NMR analysis. It was confirmed that a methacryloyl group was present and that the organosilicon compound (C1-7) was a copolycondensate by stoichiometric reaction of the silicon compound (A1) and the silicon compound (B1).

The content of the alkoxy group (methoxy group bonded to a silicon atom) of the organosilicon compound (C1-7) calculated from $^1$H NMR chart, was an amount corresponding to 2.7% based on the total amount of the alkoxy group contained in the starting materials.

Mn of the resultant organosilicon compound (C1-7) was 9,700.

Synthesis Example 1-8

13.41 g of methanol, 33.01 g (0.125 mol) of tetra-n-propoxysilane and 24.86 g (0.100 mol) of 3-methacryloxypropyl trimethoxysilane were charged into a reaction vessel provided with a stirrer and a thermometer, and then the reaction solution was heated to a temperature of 60° C. After that, a mixed liquid of 5.74 g of an aqueous solution of 25% by weight of tetramethylammonium hydroxide (containing 15.73 mmol of tetramethylammonium hydroxide), 10.15 g (0.8 mol) of water and 14.41 g of methanol was gradually added therein while stirring to react at a temperature of 60° C. and a pH of 9 for 2 hours. After that, 10.4 g (16.5 mmol) of an aqueous solution of 10% by weight of nitric acid was added to neutralize them. Subsequently, 3.8 mg of the above-mentioned polymerization inhibitor was added to this neutralized liquid. Organic solvents and water were distilledly removed from the mixture under reduced pressure. And then, the obtained residue was added into a mixed liquid of 51 g of propylene glycol monomethylether acetate (hereinafter, referred to as "PGMEA") and 25 g of water, thereby conducting extraction. The PGMEA layer was washed with water to remove salts and excessive acids therefrom, and then 3.0 mg of the above-mentioned polymerization inhibitor was added thereto. Organic solvents was distilledly removed from the resultant PGMEA solution under reduced pressure to obtain an organosilicon compound (C1-8) which was colorless, transparent and solid (See, Table 2). The isolation yield thereof was 22.6 g.

The organosilicon compound (C1-8) was subjected to $^1$H NMR analysis. It was confirmed that a methacryloyl group was present and that the organosilicon compound (C1-8) was a copolycondensate by stoichiometric reaction of the silicon compound (A1) and the silicon compound (B1).

The content of the alkoxy group (n-propoxy group bonded to a silicon atom) of the organosilicon compound (C1-8) calculated from $^1$H NMR chart, was an amount corresponding to 0.9% based on the total amount of the alkoxy group contained in the starting materials.

Mn of the resultant organosilicon compound (C1-8) was 10,000.

Synthesis Example 1-9

28.52 g of 1-propanol, 19.03 g (0.125 mol) of tetra-n-propoxysilane and 24.82 g (0.1 mol) of 3-methacryloxypropyl trimethoxysilane were charged into a reaction vessel provided with a stirrer and a thermometer, and then the reaction solution was heated to a temperature of 60° C. After that, a mixed liquid of 5.8 g of an aqueous solution of 25% by weight of tetramethylammonium hydroxide (containing 15.9 mmol of tetramethylammonium hydroxide), 10.21 g (0.8 mol) of water and 13.84 g of 1-propanol was gradually added therein while stirring to react at a temperature of 60° C. and a pH of 9 for 2 hours. After that, 10.5 g (16.7 mmol) of an aqueous solution of 10% by weight of nitric acid was added to neutralize them. Subsequently, 3 mg of the above-mentioned polymerization inhibitor was added to this neutralized liquid. Organic solvents and water were distilledly removed from the mixture under reduced pressure. And then, the obtained residue was added into a mixed liquid of 45 g of PGMEA and 25 g of water, thereby conducting extraction. The PGMEA layer was washed with water to remove salts and excessive acids therefrom, and then 3.3 mg of the above-mentioned polymerization inhibitor was added thereto. Organic solvents was distilledly removed from the resultant PGMEA solution under reduced pressure to obtain an organosilicon compound (C1-9) which was colorless, transparent and solid (See, Table 2). The isolation yield thereof was 22.9 g.

The organosilicon compound (C1-9) was subjected to $^1$H NMR analysis. It was confirmed that a methacryloyl group was present and that the organosilicon compound (C1-9) was a copolycondensate by stoichiometric reaction of the silicon compound (A1) and the silicon compound (B1).

The content of the alkoxy group (methoxy group bonded to a silicon atom) of the organosilicon compound (C1-9) calculated from $^1$H NMR chart, was an amount corresponding to 2.1% based on the total amount of the alkoxy group contained in the starting materials.

Mn of the resultant organosilicon compound (C1-9) was 15,000.

Synthesis Example 1-10

85 g of 1-propanol and 11.60 g (0.08 mol) of TMOS were charged into a reaction vessel provided with a stirrer and a thermometer, and then 0.57 g of a methanol solution of 25% by weight of tetramethylammonium hydroxide (containing 0.01 mol of methanol and 1.55 mmol of tetramethylammonium hydroxide) was gradually added therein while stirring to react at a temperature of 25° C. and a pH of 9 for 15 minutes. When the reaction liquid was subjected to gas chromatographic analysis using TCD detector, compounds (including mono-substituted product to tetra-substituted product) where methoxy groups of TMOS were substituted by n-propoxy groups, respectively. TMOS was not detected. When a number of substituted 1-propanols (an averaged number of n-propoxy groups per 1 molecule of the n-propoxy group-containing compound) was measured in the same manner as that in Synthesis Example 1-1, it was 2.9. After that, 9.94 g (0.04 mol) of 3-methacryloxypropyl trimethoxysilane was added into the reaction liquid, followed by addition of 7.65 g of water thereinto. Further, 3.65 g of a methanol solution of 25% by weight of tetramethylammonium hydroxide (containing 0.09 mol of methanol and 10 mmol of tetramethylammonium hydroxide) was added while stirring to react at a temperature of 65° C. and a pH of 9 for 2 hours. After that, 7.7 g (12.22 mmol) of an aqueous solution of 10% by weight of nitric acid was added to neutralize them. Next, this neutralized liquid was added into a mixed liquid of 70 g of diisopropyl ether and 65 g of water, thereby conducting extraction. The diisopropyl ether layer was washed with water to remove salts and excessive acids therefrom, and then 2.3 mg of the above-mentioned polymerization inhibitor was added thereto. Organic solvents were distilledly removed from the resultant diisopropyl ether solution under reduced pressure to obtain an organosilicon compound (C1-10) which was white and solid (See, Table 3). The obtained solid was not dissolved in an organic solvent (such as tetrahydrofurane, methanol and methylisobutylketone) and was gelated.

Synthesis Example 1-11

155 g of 2-propanol, 26.44 g (0.1 mol) of tetra-n-propoxysilane and 24.84 g (0.1 mol) of 3-methacryloxypropyl trimethoxysilane were charged into a reaction vessel provided with a stirrer and a thermometer, and then 12.81 g of an aqueous solution of 0.6% by weight of hydrochloric acid (containing 0.7 mol of water and 2 mmol of hydrochloric acid) was gradually added therein while stirring to react at a temperature of 25° C. and a pH of 5 for 24 hours. After that, 5.3 mg of the above-mentioned polymerization inhibitor was added to a reaction liquid. Subsequently, organic solvents were distilledly removed from the resultant solution under reduced pressure to obtain an organosilicon compound (C1-11) which was light yellow, transparent and liquid (and which was extremely high in viscosity and low in flowability) (See, Table 3). The isolation yield thereof was 26.54 g.

The organosilicon compound (C1-11) was subjected to $^1$H NMR analysis. It was confirmed that a methacryloyl group was present and that the organosilicon compound (C1-11) was a copolycondensate by stoichiometric reaction of the silicon compound (A1) and the silicon compound (B1).

The content of the alkoxy group (methoxy group, isopropoxy group and n-propoxy group bonded to a silicon atom) of the organosilicon compound (C1-11) calculated from $^1$H NMR chart, was an amount corresponding to 17% based on the total amount of the alkoxy group contained in the starting materials.

Mn of the resultant organosilicon compound (C1-11) was 990.

Synthesis Example 1-12

160 g of 2-propanol, 26.44 g (0.1 mol) of tetra-n-propoxysilane and 23.43 g (0.1 mol) of 3-acryloxypropyl trimethoxysilane were charged into a reaction vessel provided with a stirrer and a thermometer, and then 12.81 g of an aqueous solution of 0.6% by weight of hydrochloric acid (containing 0.7 mol of water and 2 mmol of hydrochloric acid) was gradually added therein while stirring to react at a temperature of 25° C. and a pH of 5 for 24 hours. After that, 5.6 mg of the above-mentioned polymerization inhibitor was added to a reaction liquid. Subsequently, organic solvents were distilledly removed from the resultant solution under reduced pressure to obtain an organosilicon compound (C1-12) which was light yellow, transparent and liquid (and which was extremely high in viscosity and low in flowability) (See, Table 3). The isolation yield thereof was 28.02 g.

The organosilicon compound (C1-12) was subjected to $^1$H NMR analysis. It was confirmed that an acryloyl group was present and that the organosilicon compound (C1-12) was a copolycondensate by stoichiometric reaction of the silicon compound (A1) and the silicon compound (B1).

The content of the alkoxy group (methoxy group, isopropoxy group and n-propoxy group bonded to a silicon atom) of the organosilicon compound (C1-12) calculated from $^1$H NMR chart, was an amount corresponding to 20% based on the total amount of the alkoxy group contained in the starting materials.

Mn of the resultant organosilicon compound (C1-12) was 800.

Synthesis Example 1-13

290 g of 2-propanol and 248.48 g (1 mol) of 3-methacryloxypropyl trimethoxysilane were charged into a reaction vessel provided with a stirrer and a thermometer, and then 57.69 g of an aqueous solution of 1.6% by weight of tetramethylammonium hydroxide (containing 3 mol of water and 10 mmol of tetramethylammonium hydroxide) was gradually added therein while stirring to react at a temperature of 25° C. and a pH of 9 for 1 hour. After that, 6.62 g of an aqueous solution of 10% by weight of nitric acid was added to neutralize them, and then 17.6 mg of the above-mentioned polymerization inhibitor was added thereto. Next, this liquid was subjected to distillation under reduced pressure to remove an organic solvent and water. After that the residue was dissolved in diisopropyl ether. The diisopropyl ether layer was washed with water to remove salts and excessive acids therefrom, and then 17.3 mg of the above-mentioned polymerization inhibitor was added thereto. Solvents were distilledly removed from the resultant diisopropyl ether solution under reduced pressure to obtain an organosilicon compound (C1-13) which was light yellow, transparent and liquid (and which was extremely high in viscosity and low in flowability) (See, Table 3). The isolation yield thereof was 173.86 g.

The organosilicon compound (C1-13) was subjected to $^1$H NMR analysis. It was confirmed that a methacryloyl group was present and that the organosilicon compound (C1-13) was a copolycondensate by stoichiometric reaction of the silicon compound (A1) and the silicon compound (B1).

The content of the alkoxy group (isopropoxy group bonded to a silicon atom) of the organosilicon compound (C1-13) calculated from $^1$H NMR chart, was an amount corresponding to 0.8% based on the total amount of the alkoxy group contained in the starting materials.

Mn of the resultant organosilicon compound (C1-13) was 2,700.

Synthesis Example 1-14

78 g of 2-propanol and 70.27 g (300 mmol) of 3-acryloxypropyl trimethoxysilane were charged into a reaction vessel provided with a stirrer and a thermometer, and then 16.5 g of an aqueous solution of 1.7% by weight of tetramethylammonium hydroxide (containing 900 mmol of water and 3 mmol of tetramethylammonium hydroxide) was gradually added therein while stirring to react at a temperature of 25° C. and a pH of 9 for 1 hour. After that, 1.95 g of an aqueous solution of 10% by weight of nitric acid was added to the reaction liquid to neutralize them, and then 4.9 mg of the above-mentioned polymerization inhibitor was added thereto. Next, this liquid was subjected to distillation under reduced pressure to remove an organic solvent and water. After that the residue was dissolved in diisopropyl ether. The diisopropyl ether layer was washed with water to remove salts and excessive acids therefrom, and then 4.6 mg of the above-mentioned polymerization inhibitor was added thereto. Solvents were distilledly removed from the resultant diisopropyl ether solution under reduced pressure to obtain an organosilicon compound (C1-14) which was light yellow, transparent and liquid (and which was extremely high in viscosity and low in flowability) (See, Table 3). The isolation yield thereof was 48.61 g.

The organosilicon compound (C1-14) was subjected to $^1$H NMR analysis. It was confirmed that an acryloyl group was present.

The content of the alkoxy group (isopropoxy group bonded to a silicon atom) of the organosilicon compound (C1-14) calculated from $^1$H NMR chart, was an amount corresponding to 1% based on the total amount of the alkoxy group contained in the starting materials.

Mn of the resultant organosilicon compound (C1-14) was 3,000.

Synthesis Example 1-15

22 g of 1-propanol and 15.20 g (0.1 mol) of TMOS were charged into a reaction vessel provided with a stirrer and a thermometer, and then 0.52 g of an aqueous solution of 35% by weight of hydrogen chloride (containing 0.02 mol of water and 5 mmol of hydrogen chloride) was gradually added therein while stirring to react at a temperature of 25° C. and a pH of 5 for 1 hour. When the reaction liquid was subjected to gas chromatographic analysis using TCD detector, compounds (including mono-substituted product to tetra-substituted product) where methoxy groups of TMOS were substituted by n-propoxy groups, respectively and an unreacted TMOS were detected. The ratio of the n-propoxy group-containing compounds among them was 99% by weight as a total. When a number of substituted 1-propanols (an averaged number of n-propoxy groups per 1 molecule of the n-propoxy group-containing compound) was measured in the same manner as that in Synthesis Example 1-1, it was 2.3. After that, 24.83 g (0.1 mol) of 3-methacryloxypropyl trimethoxysilane was added into the reaction liquid, followed by addition of 12.65 g of water thereinto. Subsequently, 3.3 g of an aqueous solution of 10% by weight of hydrogen chloride (containing 0.17 mol of water and 9 mmol of hydrogen chloride) was added to react while stirring at a temperature of 25° C. and a pH of 4 for 2 hours. Then, 4.38 g of an aqueous solution of 25% by weight of tetramethylammonium hydroxide (12 mmol) was added to neutralize them. Next, this neutralized liquid was added into a mixed liquid of 70 g of diisopropyl ether and 65 g of water, thereby conducting extraction. The diisopropyl ether layer was concentrated with an evaporator, and methylisobutylketone (MIBK) was added to the resultant concentrate to dissolve. After that, the MIBK solution was washed with water to remove salts and excessive acids therefrom, and then 2.7 mg of the above-mentioned polymerization inhibitor was added thereto. Solvents were distilledly removed under reduced pressure to obtain an organosilicon compound (C1-15) which was light yellow, transparent and liquid (See, Table 3). The obtained liquid was insoluble in an organic solvent after one day at 25° C., and was gelated. It was thus impossible to conduct analysis of $^1$H NMR and GPC, and evaluation of physical properties (scratch resistance, adherence and curability) of a cured product.

1-2. Evaluation of Organosilicon Compound (1) Synthesis Evaluation

Synthesis evaluation of the organosilicon compound was conducted based on whether or not the organosilicon compound was allowed to be produced in its production process, without forming a gel. The judgement in the synthesis evaluation was indicated as "0" where the compound was not gelated in its production process, and as "X" where the compound was gelated. The evaluation results are shown in Tables 1 to 3.

Further, the term "NV %" denoting a blending amount of a solvent in Tables 1 to 3 is indicated by a percentage (%) to be obtained by dividing: a yield (weight) when the starting monomers to be reacted were fully hydrolyzed; by a charged total weight. The phrase "when the monomers were fully hydrolyzed" implies that: $SiO_2$ was obtained from a silicon compound (Q monomer) having four siloxane-bond forming groups; and $SiO_{1.5}$ was obtained from a silicon compound (T monomer) having three hydrolyzable groups; both by hydrolysis.

(2) Characterization

Concerning the organosilicon compound (C1) allowed to be produced without gelation, the yield (% by weight) of the organosilicon compound, and the content (%) of the residual alkoxy groups, were measured and calculated by the following procedure.

The yield (% by weight) was calculated by the following equation:

{(isolation yield)/(theoretical yield, assuming that all alkoxysilanes as Q monomers are hydrolyzed into $SiO_2$, and all alkoxysilanes as T monomers are hydrolyzed into $SiO_{1.5}$)×100

The content (%) of the residual alkoxy groups was calculated from a chart of $^1$H NMR (nuclear magnetic resonance spectrum).

It is noted that those organosilicon compounds (C1) were not evaluated and were indicated by "–", where a gel was formed during the production process of each compound.

(3) Stability Evaluation

Stability evaluation was conducted for the organosilicon compounds (C1). The compound obtained in Synthesis Example 1-1 and the compound obtained in Synthesis Example 1-11 were separately dissolved in propylene glycol monoethylether acetate (PGMEA) in the same amounts, respectively, and these solutions were stored within a drier at a temperature of 60° C., and observed over time. Although the product obtained in Synthesis Example 1-11 was gelated after 10 hours, the product obtained in Synthesis Example 1-1 was not gelated even after a lapse of 3 days. In turn, at a temperature of 25° C., although the product obtained in Synthesis Example 1-1 was not gelated even after a lapse of 2 months, the product obtained in Synthesis Example 1-11 was gelated after a lapse of only one day.

The product obtained in Synthesis Example 1-11 included an unreacted alkoxy group of 17%. On the other hand, the product obtained in Synthesis Example 1-1 included such group of only about 4%. From this fact, it is supposed that unreacted and residual alkoxy group obstructs a stability of the organosilicon compound.

Thus, the stability of the organosilicon compound was evaluated by content (%) of the residual alkoxy group.

Since a stability of an organosilicon compound is obstructed when a content (%) of the residual alkoxy group thereof is high, the judgment as to whether the applicable organosilicon compound had a stability, was indicated to be "○" when the content (%) of the residual alkoxy group was 8% or less, and to be "X" when larger than 8%.

TABLE 1

|  |  | Synthesis Example | | | |
| --- | --- | --- | --- | --- | --- |
|  |  | 1-1 | 1-2 | 1-3 | 1-4 |
| Q monomer | TMOS (mmol) | 240 | 100 | 300 | 70 |
| T monomer | 3-Acryloxypropyl trimethoxysilane (mmol) | 240 |  | 200 | 40 |
|  | 3-Methacryloxypropyl trimethoxysilane (mmol) |  | 100 |  |  |
| Solvent | 1-Propanol (NV %) | 20 | 20 | 13 | 10 |
| *1 | <It is used in alcohol exchange reaction> | 2.5 | 2.5 | 1.35 | 1.35 |
| Catalyst | 25% TMAH methanol solution (mol %) |  |  |  |  |
|  | <It is used in condensation reaction after alcohol exchange reaction> 25% TMAH methanol solution (mol %) | 4.5 | 4.5 | 8.65 | 8.65 |
| Organosilicon compound (C1) |  | C1-1 | C1-2 | C1-3 | C1-4 |
| Number-average molecular weight (Mn) |  | 9,600 | 11,000 | 3,300 | >400000 |
| Synthetic evaluation (gelation) |  | ○ | ○ | ○ | ○ |
| Yield (%) |  | 96 | 96 | 98 | 99 |
| Content of remained alkoxy group (%) |  | 4.1 | 6 | 1.3 | 0.9 |
| Stability evaluation |  | ○ | ○ | ○ | ○ |

*1 It is a ratio (mol %) based on total mol number of Q monomer and T monomer.

TABLE 2

|  |  | Synthesis Example | | | | |
|---|---|---|---|---|---|---|
|  |  | 1-5 | 1-6 | 1-7 | 1-8 | 1-9 |
| Q monomer | TMOS (mmol) |  | 100 | 72 |  | 125 |
|  | TPOS (mmol) | 100 |  |  | 125 |  |
| T monomer | 3-Methacryloxypropyl trimethoxysilane (mmol) | 100 | 100 | 40 | 100 | 100 |
| Solvent | Methanol (NV %) | 20 | 10 | 10 | 25 |  |
|  | 1-Propanol (NV %) |  |  |  |  | 25 |
| *1 Catalyst | <It is used in simultaneously charging condensation reaction> 25% TMAH aqueous solution (mol %) | 2.5 | 7 | 7 | 7 | 7 |
| Organosilicon compound (C1) |  | C1-5 | C1-6 | C1-7 | C1-8 | C1-9 |
| Number-average molecular weight (Mn) |  | 8,200 | 6,000 | 9,700 | 10,000 | 15,000 |
| Synthetic evaluation (gelation) |  | ○ | ○ | ○ | ○ | ○ |
| Yield (%) |  | 95 | 92 | 91 | 89 | 90 |
| Content of remained alkoxy group (%) |  | 3.6 | 4.2 | 2.7 | 0.9 | 2.1 |
| Stability evaluation |  | ○ | ○ | ○ | ○ | ○ |

*1 It is a ratio (mol %) based on total mol number of Q monomer and T monomer.

TABLE 3

|  |  | Synthesis Example | | | | | |
|---|---|---|---|---|---|---|---|
|  |  | 1-10 | 1-11 | 1-12 | 1-13 | 1-14 | 1-15 |
| Q monomer | TMOS (mmol) | 80 |  |  |  |  | 100 |
|  | TPOS (mmol) |  | 100 | 100 |  |  |  |
| T monomer | 3-Methacryloxypropyl trimethoxysilane (mmol) | 40 | 100 |  | 1000 |  | 100 |
|  | 3-Acryloxypropyl trimethoxysilane (mmol) |  |  | 100 |  | 300 |  |
| Solvent | 2-Propanol (NV %) |  | 10 | 10 | 30 | 30 |  |
|  | 1-Propanol (NV %) | 10 |  |  |  |  | 30 |
| *1 Catalyst | HCl (mol %) |  | 1 | 1 |  |  | 7 |
|  | <It is used in simultaneously charging condensation reaction> 25% TMAH aqueous solution (mol %) |  |  |  | 1 | 1 |  |
|  | <It is used in alcohol exchange reaction> 25% TMAH methanol solution (mol %) | 1.35 |  |  |  |  |  |
|  | <It is used in condensation reaction after alcohol exchange reaction> 25% TMAH methanol solution (mol %) | 8.65 |  |  |  |  |  |
| Organosilicon compound (C1) |  | C1-10 | C1-11 | C1-12 | C1-13 | C1-14 | C1-15 |
| Number-average molecular weight (Mn) |  | — | 990 | 800 | 2,700 | 3,000 | — |
| Synthetic evaluation (gelation) |  | X | ○ | ○ | ○ | ○ | ○ |
| Yield (%) |  | — | 120 | 125 | 97 | 98 | 102 |
| Content of remained alkoxy group (%) |  | — | 17 | 20 | 0.8 | 1.0 | — |
| Stability evaluation |  | — | X | X | ○ | ○ | — |

*1 It is a ratio (mol %) based on total mol number of Q monomer and T monomer.

Clearly from the results in Tables 1 and 2, the organosilicon compounds (Synthesis Examples 1-1 to 1-9) each obtained by hydrolysis copolycondensation under an alkaline condition, at a ratio of 0.3 to 1.8 mol of the Q monomer relative to 1 mol of the T monomer, were produced without forming a gel in the production processes, respectively. Further, the contents of the residual alkoxy group in these organosilicon compounds were less than 8%, and the organosilicon compounds were excellent in stability after production as well.

On the other hand, clearly from the results in Table 3, a gel was formed in the condensation process in Synthesis Example 1-10 in which 2.0 mol of Q the monomer as the silicon compound was included relative to 1 mol of the T monomer. Further, the contents of the residual alkoxy group were presented in larger values (17% and 20%) in Synthesis Examples 1-11 and 1-12 produced by using the acid catalyst, respectively, thereby supposingly suggesting that the organosilicon compounds were insufficient in stability and inferior in performance of cured products.

Moreover, in Synthesis Example 1-15 in which a part of alkoxy group of the Q monomer was subjected to alcohol exchange by using 1-propanol, and the Q monomer was then hydrolysisally copolycondensed together with the T monomer by the aid of the acid catalyst, gelation was caused shortly after the synthesis of the organosilicon compound, and thus the compound was considerably low in stability.

1-3. Preparation and Evaluation of Curable Composition (1) Examples 1-1 to 1-9 and Comparative Examples 1-1 to 1-4

100 parts by weight of the organosilicon compound (C1) of Synthesis Examples 1-1 to 1-9 and 1-11 to 1-14 obtained without gelation in the above and 3 parts by weight of 2-hydroxy-2-methyl-1-phenyl-propane-1-one as a radical polymerization initiator were dissolved in 100 parts by weight of PGMEA as a solvent to prepare curable compositions (S1) to (S13) as PGMEA solutions having concentrations of about 50% by weight, respectively (See, Table 4).

TABLE 4

| | Curable composition | Starting material | | | |
|---|---|---|---|---|---|
| | | Organosilicon compound (C1) | | Radical polymerization initiator | Solvent (PGMEA) |
| | | Type | Parts by weight | Parts by weight | Parts by weight |
| Example | 1-1 S1 | (C1-1) | 100 | 3 | 100 |
| | 1-2 S2 | (C1-2) | 100 | 3 | 100 |
| | 1-3 S3 | (C1-3) | 100 | 3 | 100 |
| | 1-4 S4 | (C1-4) | 100 | 3 | 100 |
| | 1-5 S5 | (C1-5) | 100 | 3 | 100 |
| | 1-6 S6 | (C1-6) | 100 | 3 | 100 |
| | 1-7 S7 | (C1-7) | 100 | 3 | 100 |
| | 1-8 S8 | (C1-8) | 100 | 3 | 100 |
| | 1-9 S9 | (C1-9) | 100 | 3 | 100 |
| Comparative Example | 1-1 S10 | (C1-11) | 100 | 3 | 100 |
| | 1-2 S11 | (C1-12) | 100 | 3 | 100 |
| | 1-3 S12 | (C1-13) | 100 | 3 | 100 |
| | 1-4 S13 | (C1-14) | 100 | 3 | 100 |

Curable compositions (S1) to (S13) were evaluated for the following items. Results are shown in Table 5.

(1) Curability Test

The curable composition was coated onto a polycarbonate plate using a bar coater, followed by heating at a temperature of about 50° C. for 5 minutes to volatilize a solvent, thereby forming a coating film having a thickness of about 10 μm. After that, the coating film was cured by ultraviolet irradiation under the following condition, in a manner to count the number of irradiations until the coating film lost a tackiness of its surface.

[Condition of Ultraviolet Irradiation]
Lamp: 80 W/cm high-pressure mercury lamp
Lamp height: 10 cm
Conveyor speed: 10 m/min.

(2) Scratch Resistance Test

The curable composition was coated onto a polycarbonate plate using a bar coater, followed by heating at a temperature of about 50° C. for 5 minutes to volatilize a solvent, thereby forming a coating film having a thickness of about 10 μm. After that, the coating film was subjected to ultraviolet irradiation under the same conditions (15 times of ultraviolet irradiation) as those in the curability test, thereby obtaining a cured film.

The cured film was subjected to Taber abrasion test under the following conditions, and hazes of the cured film before and after the test were measured.

Taber abrasion test condition was to use "CS-10F" as an abrasion wheel in a manner to apply a load of 250 g thereto, thereby measuring an abrasion loss after 500 revolutions. The abrasion wheel was subjected to refacing by "ST-11" (grindstone), each measurement.

The hazes were measured according to JIS K 7105, JIS K 7361-1, and JIS K 7136, by a hazemeter installed within a thermostatic chamber at a temperature of 23° C.±2° C. and a humidity of 50%±5% RH, respectively.

(3) Adherence Test

The curable composition was coated onto a polycarbonate plate using a bar coater, followed by heating at a temperature of about 50° C. for 5 minutes to volatilize a solvent, thereby forming a coating film having a thickness of about 10 μm. After that, the coating film was subjected to ultraviolet irradiation under the same conditions (15 times of ultraviolet irradiation) as those in the curability test, thereby obtaining a cured film.

The cured film was subjected to cross cut peeling test according to JIS K 5600-5-6 (1999), and adherences were grouped into 6 steps (0 to 5). The cross-cut grid comprised 25 cells each in 2 mm-square. Hereinafter, the "number of remaining films" means a number of those cells in the 25 cells where the cured film was left after peeling of an adhesive tape.

TABLE 5

| | | | Evaluation | | | | | |
|---|---|---|---|---|---|---|---|---|
| | | | Curability | Haze (%) | | | Cross cut peeling test | |
| | | Curable composition | (number of irradiation times) | Before abrasion ($H_1$) | After abrasion ($H_2$) | *2 ΔH | Group | Number of remaining films |
| Example | 1-1 | S1 | 1 | 0.3 | 5.5 | 5.2 | 0 | 25/25 |
| | 1-2 | S2 | 1 | 0.2 | 5.0 | 4.8 | 0 | 25/25 |
| | 1-3 | S3 | 1 | 0.2 | 4.4 | 4.2 | 0 | 25/25 |
| | 1-4 | S4 | 1 | 0.2 | 5.0 | 4.8 | 0 | 25/25 |
| | 1-5 | S5 | 1 | 0.4 | 5.8 | 5.4 | 0 | 25/25 |
| | 1-6 | S6 | 1 | 0.4 | 5.8 | 5.4 | 0 | 25/25 |
| | 1-7 | S7 | 1 | 0.3 | 5.1 | 4.8 | 0 | 25/25 |
| | 1-8 | S8 | 1 | 0.2 | 5.1 | 4.9 | 0 | 25/25 |
| | 1-9 | S9 | 1 | 0.2 | 5.2 | 5.0 | 0 | 25/25 |
| Comparative Example | 1-1 | S10 | 10 | 0.3 | 38.8 | 38.5 | 5 | 0/25 |
| | 1-2 | S11 | 2 | 0.1 | 27.0 | 26.9 | 5 | 0/25 |
| | 1-3 | S12 | 5 | 0.3 | 7.9 | 7.6 | 4 | 5/25 |
| | 1-4 | S13 | 2 | 0.8 | 14.5 | 13.7 | 5 | 0/25 |

*2 ΔH = $H_2 - H_1$

According to the results in Table 5, it is found that the curable compositions (S1) to (S9) in which the organosilicon compounds obtained in Synthesis Examples 1-1 to 1-9 were used lost film tackness by only one time of ultraviolet irradiation in the curability test, and were thus excellent in curability.

It is further found that the cured films formed from the curable compositions (S1) to (S9) were smaller than 6% in difference of haze (H) between before and after the abrasion test, and were thus excellent in scratch resistance.

Moreover, it is found that the cured films formed from the curable compositions (S1) to (S9) were not peeled at all such that the number of remaining films was 25/25 for all the cured films, and were thus excellent in adherence.

However, clearly from the results in Table 5, it is found that it is found that the curable compositions (S10) to (S13) required two or more times of ultraviolet irradiation until loss of tackiness of the film in the curability test, and were thus inferior in curability.

tion initiator (R1)") and phenyl bis(2,4,6-trimethylbenzoyl) phosphine oxide (trade name "Trg 819" manufactured by Ciba. Japan, hereinafter referred to as "radical polymerization initiator (R2)"), each as a photopolymerization initiator; a hydroxyphenyltriazine-based ultraviolet absorber (trade name "Tinuvin 400" manufactured by Ciba Japan); a hindered amine-based photostabilizer (trade name "Tinuvin 123" manufactured by Ciba Japan); and propylene glycol monomethylether (PGM) as a solvent were mixed with one another at ratios listed in Table 6, to prepare curable compositions (S14) to (S18), respectively.

The detail of the urethane acrylate is as follows.

Charged into a separable flask were 300 g of isocyanuric acid EO-modified di- and tri-acrylates (trade name "Aronix" manufactured by TOAGDSEI CO., Ltd.), 0.10 g of dibutyl tin laurate, and 0.16 g of 2,6-di-tert-butyl-4-methyl phenol; and 22.2 g of isophorone diisocyanate (IPDI) was dropped into the resultant liquid at its temperature of 70° C. to 75° C. with stirring. After completion of dropping, the liquid was stirred at 85° C. for 2 hours, it was confirmed that isocyanate group was lost by an IR (infrared absorption) analysis for the reaction product, and then the reaction was terminated, to obtain a urethane acrylate.

TABLE 6

| | | | | Starting material | | | | | |
|---|---|---|---|---|---|---|---|---|---|
| | | | Organosilicon compound (C1) | Urethane acrylate | Radical polymerization initiator | | UV absorber | Light stabilizer | Solvent (PGMEA) |
| | | Curable Composition | Type | | R1 | R2 | | | |
| | | | Parts by weight | Parts by weight | Parts by weight | Parts by weight | Parts by weight | Parts by weight | Parts by weight |
| Example | 1-10 | S14 | (C1-1) | 25 | 75 | 5 | 2 | 5 | 1 | 100 |
| | 1-11 | S15 | (C1-1) | 50 | 50 | 5 | 2 | 5 | 1 | 100 |
| Comparative Example | 1-5 | S16 | — | — | 100 | 5 | 2 | 5 | 1 | 100 |
| | 1-6 | S17 | (C1-13) | 25 | 75 | 5 | 2 | 5 | 1 | 100 |
| | 1-7 | S18 | (C1-13) | 50 | 50 | 5 | 2 | 5 | 1 | 100 |

It is further found that the cured films formed from the curable compositions (S10) to (S13) were inferior in scratch resistance and adherence.

1-4. Preparation and Evaluation of Curable Composition (2)

Examples 1-10 to 1-11 and Comparative Examples 1-5 to 1-8

The organosilicon compound (C1-1) obtained in Synthesis Example 1-1, or the organosilicon compound (C1-13) obtained in Synthesis Example 1-13; urethane acrylate obtained by the method to be described later; 1-hydroxycyclohexyl phenyl ketone (trade name "Irg 184" manufactured by Ciba Japan, hereinafter referred to as "radical polymeriza- For the evaluation of the curable compositions (S14) to (S18), scratch resistance test and adherence test were conducted. The results are shown in Table 7. The method for fabricating a cured film is as follows.

The curable composition was coated onto a polycarbonate plate using a bar coater, followed by heating at a temperature of about 100° C. for 10 minutes to volatilize a solvent, thereby forming a coating film having a thickness of about 5 μm. After that, the coating film was cured by ultraviolet irradiation under the following condition to form a cured film. Thickness of the cured film formed was also shown in Table 7.

[Condition of Ultraviolet Irradiation]
  Lamp: 120 W/cm metal halide lamp
  Lamp height: 110 cm
  Conveyor speed: 5 m/min.
  Number of irradiations: 3

TABLE 7

| | | Curable composition | Film thickness (μm) | Haze (%) Before abrasion ($H_1$) | Haze (%) After abrasion ($H_2$) | *2 ΔH | Cross cut peeling test Number of remaining films |
|---|---|---|---|---|---|---|---|
| Example | 1-10 | S14 | 4-6 | 0.2 | 9.3 | 9.1 | 25/25 |
| | 1-11 | S15 | 4 | 0.2 | 6.9 | 6.7 | 25/25 |
| Comparative Example | 1-5 | S16 | 5 | 1.8 | 24.3 | 22.5 | 25/25 |
| | 1-6 | S17 | 4 | 0.2 | 23.2 | 23.0 | 25/25 |
| | 1-7 | S18 | 4-5 | 0.2 | 29.9 | 29.7 | 25/25 |

*2 ΔH = $H_2 - H_1$

According to the results in Tables 6 and 7, the curable composition (S16) containing a urethane acrylate and a polymerization initiator exhibited a considerably large haze difference ΔH before and after abrasion of 22.5. On the other hand, it was found that adoption of curable compositions (S14 and S15) each containing the urethane acrylate and the organosilicon compound (C1-1), remarkably improved scratch resistance. In Examples 1-10 and 1-11, the cured films each kept a higher adherence to the polycarbonate plate.

Further, in the compositions (S17 and S18) each containing an organosilicon compound obtained in Synthesis Example 1-13 and a urethane acrylate, scratch resistance was not improved and rather resultingly deteriorated.

1-5. Preparation and Evaluation of Curable Composition (3)

Examples 1-12

The organosilicon compound (C1-1) obtained by Synthesis Example 1-1, a polymerization initiator, and a solvent were mixed to prepare a curable composition (S19).

Regarding blending amounts, 0.3 part by weight of 4,4'-azobis(4-cyanovaleric acid) (trade name "V-501" manufactured by Wako Pure Chemical Ind., Ltd.) as a water-soluble azo-based polymerization initiator, and 100 parts by weight of PGMEA were used relative to 100 parts by weight of the organosilicon compound (C1-1) (See, Table 8).

The curable composition (S19) was evaluated by scratch resistance test and adherence test. The results are shown in Table 8. The method for fabricating a cured film is as follows.

The curable composition was coated onto a polycarbonate plate using a bar coater, followed by heating at a temperature of about 130° C. for 3 hours, thereby forming a cured film having a thickness of 10 μm.

According to the results in Table 8, it is found that the film obtained by heating the curable composition (S19) simultaneously had scratch resistance and an adherence.

2. Production and Evaluation of Organosilicon Compound (C2)

Organosilicon compounds were produced according to the following Examples and Comparative Examples to evaluate them.

Example 2-1

150 g of 1-propanol for alcohol exchange reaction and 36.53 g (0.24 mol) of tetramethoxysilane (hereinafter, referred to as "TMOS") as a Q monomer were charged into a reaction vessel provided with a stirrer and a thermometer, and then 4.37 g of a methanol solution of 25% by weight of tetramethylammonium hydroxide (containing 0.1 mol of methanol and 12 mmol of tetramethylammonium hydroxide) was gradually added therein while stirring to react at a temperature of 25° C. and a pH of 9 for 6 hours. After that, the internal temperature was brought to 60° C., and the reaction was further conducted. When the reaction liquid was subjected to gas chromatographic analysis using TCD detector, compounds (including mono-substituted product to tetra-substituted product) where methoxy groups of TMOS were substituted by n-propoxy groups, respectively and an unreacted TMOS were detected. The TMOS was detected only in a trace amount. The ratio of the n-propoxy group-containing compounds among them was substantially 100% by weight as a total. Based on the peak area of the product in the gas chromatogram, a number of substituted 1-propanols (an averaged number of n-propoxy groups per 1 molecule of the n-propoxy group-containing compound) was obtained to be 2.7.

TABLE 8

| | Curable composition | Starting material | | | | Evaluation | | | | |
| | | Organosilicon compound (C1) | | Polymerization initiator | Solvent (PGMEA) | | Haze (%) | | | Cross cut peeling test |
| | | Type | Parts by weight | Parts by weight | Parts by weight | Film thickness (μm) | Before abrasion ($H_1$) | After abrasion ($H_2$) | *2 ΔH | Number of remaining films |
| Example 1-12 | S19 | (C1-1) | 100 | 0.3 | 100 | 10 | 0.1 | 8.8 | 8.7 | 25/25 |

*2 ΔH = $H_2 - H_1$

Subsequently, 59.62 g (0.24 mol) of 3-methacryloxypropyl trimethoxysilane as a T monomer was added into the reaction liquid, followed by addition of 30.2 g of water thereinto. Further, 7.88 g of a methanol solution of 25% by weight of tetramethylammonium hydroxide (containing 0.18 mol of methanol and 21.6 mmol of tetramethylammonium hydroxide) was added while stirring to react at a temperature of 25° C. and a pH of 9 for 24 hours. After that, 22.2 g (35.3 mmol) of an aqueous solution of 10% by weight of nitric acid was added to neutralize them. Next, this neutralized liquid was added into a mixed liquid of 120 g of diisopropyl ether and 180 g of water, thereby conducting extraction. This diisopropyl ether layer was washed with water to remove salts and excessive acids therefrom, and then 11.5 mg of N-nitrosophenyl hydroxylamine aluminum salt (trade name "Q-1301" manufactured by Wako Pure Chemical Ind., Ltd.) as a polymerization inhibitor was added thereto. Organic solvents were distilledly removed from the resultant diisopropyl ether solution under reduced pressure to obtain an organosilicon compound (C2-1) which was colorless, transparent and solid (See, Table 9). The yield thereof was 57.72 g. Hereinafter, the yield to be thus obtained will be called "isolation yield".

The organosilicon compound (C2-1) was subjected to $^1$H NMR analysis to confirm a presence of a methacryloyl group.

According to the result of $^1$H NMR analysis, the content of a structural unit (T monomer unit) derived from the silicon compound (B2), i.e., derived from the T monomer, and the content of an alkoxy group in the organosilicon compound (C2-1) were determined. Based on these contents, the content of a structural unit (Q monomer unit) derived from the silicon compound (A2), i.e., derived from the Q monomer, was calculated. As a result, the obtained organosilicon compound (C2-1) was confirmed to be a copolycondensate by stoichiometric reaction of the silicon compound (A2) and the silicon compound (B2).

The content of the alkoxy group (n-propoxy group bonded to a silicon atom) of the organosilicon compound (C2-1) calculated from $^1$H NMR chart, was an amount corresponding to 2.5% based on the total amount of the alkoxy group contained in the starting materials.

Mn was 9,600.

Example 2-2

56.3 g of 1-propanol and 15.22 g (0.1 mol) of TMOS were charged into a reaction vessel provided with a stirrer and a thermometer, and then 1.82 g of a methanol solution of 25% by weight of tetramethylammonium hydroxide (containing 0.04 mol of methanol and 5 mmol of tetramethylammonium hydroxide) was gradually added therein while stirring to react at a temperature of 25° C. and a pH of 9 for one hour. When the reaction liquid was subjected to gas chromatographic analysis using TCD detector, compounds (including mono-substituted product to tetra-substituted product) where methoxy groups of TMOS were substituted by n-propoxy groups, respectively and an unreacted TMOS were detected. The ratio of the n-propoxy group-containing compounds among them was 99% by weight as a total. When a number of substituted 1-propanols (an averaged number of n-propoxy groups per 1 molecule of the n-propoxy group-containing compound) was measured in the same manner as that in Example 2-1, it was 2.9. After that, 23.42 g (0.1 mol) of 3-acryloxypropyl trimethoxysilane was added into the reaction liquid, followed by addition of 12.32 g of water thereinto. Further, 3.28 g of a methanol solution of 25% by weight of tetramethylammonium hydroxide (containing 0.08 mol of methanol and 9 mmol of tetramethylammonium hydroxide) was added while stirring to react at a temperature of 65° C. and a pH of 9 for 2 hours. After that, 9.3 g (14.7 mmol) of an aqueous solution of 10% by weight of nitric acid was added to neutralize them. Next, this neutralized liquid was added into a mixed liquid of 80 g of ethyl acetate and 125 g of water, thereby conducting extraction. The ethyl acetate layer was washed with water to remove salts and excessive acids therefrom, and then 4.3 mg of the above-mentioned polymerization inhibitor was added thereto. Organic solvents were distilledly removed from the resultant ethyl acetate solution under reduced pressure to obtain an organosilicon compound (C2-2) which was colorless, transparent and solid (See, Table 9). The isolation yield thereof was 21.5 g.

The organosilicon compound (C2-2) was subjected to $^1$H NMR analysis. It was confirmed that an acryloyl group was present and that the organosilicon compound (C2-2) was a copolycondensate by stoichiometric reaction of the silicon compound (A2) and the silicon compound (B2).

The content of the alkoxy group (n-propoxy group bonded to a silicon atom) of the organosilicon compound (C2-2) calculated from $^1$H NMR chart, was an amount corresponding to 6% based on the total amount of the alkoxy group contained in the starting materials.

Mn was 11,000.

Example 2-3

270 g of 1-propanol and 45.68 g (0.3 mol) of TMOS were charged into a reaction vessel provided with a stirrer and a thermometer, and then 2.46 g of a methanol solution of 25% by weight of tetramethylammonium hydroxide (containing 0.06 mol of methanol and 6.75 mmol of tetramethylammonium hydroxide) was gradually added therein while stirring to react at a temperature of 25° C. and a pH of 9 for 24 hours. When the reaction liquid was subjected to gas chromatographic analysis using TCD detector, compounds (including mono-substituted product to tetra-substituted product) where methoxy groups of TMOS were substituted by n-propoxy groups, respectively were detected, but TMOS was not detected. When a number of substituted 1-propanols (an averaged number of n-propoxy groups per 1 molecule of the n-propoxy group-containing compound) was measured in the same manner as that in Example 2-1, it was 3.3. After that, 49.67 g (0.2 mol) of 3-methacryloxypropyl trimethoxysilane was added into the reaction liquid, followed by addition of 32.4 g of water thereinto. Further, 15.77 g of a methanol solution of 25% by weight of tetramethylammonium hydroxide (containing 0.37 mol of methanol and 43.25 mmol of tetramethylammonium hydroxide) was added while stirring to react at a temperature of 65° C. and a pH of 9 for 2 hours. After that, 33.1 g (52.5 mmol) of an aqueous solution of 10% by weight of nitric acid was added to neutralize them. Next, this neutralized liquid was added into a mixed liquid of 220 g of diisopropyl ether and 200 g of water, thereby conducting extraction. The diisopropyl ether layer was washed with water to remove salts and excessive acids therefrom, and then 11 mg of the above-mentioned polymerization inhibitor was added thereto. Organic solvents were distilledly removed from the resultant diisopropyl ether solution under reduced pressure to obtain an organosilicon compound (C2-3) which was colorless, transparent and solid (See, Table 9). The isolation yield thereof was 53.94 g.

The organosilicon compound (C2-3) was subjected to $^1$H NMR analysis. It was confirmed that a methacryloyl group was present and that the organosilicon compound (C2-3) was a copolycondensate by stoichiometric reaction of the silicon compound (A2) and the silicon compound (B2).

The content of the alkoxy group (n-propoxy group bonded to a silicon atom) of the organosilicon compound (C2-3) calculated from $^1$H NMR chart, was an amount corresponding to 1.3% based on the total amount of the alkoxy group contained in the starting materials.

Mn was 3,300.

Example 2-4

80 g of 1-propanol and 11.00 g (0.07 mol) of TMOS were charged into a reaction vessel provided with a stirrer and a thermometer, and then 0.57 g of a methanol solution of 25% by weight of tetramethylammonium hydroxide (containing 0.01 mol of methanol and 1.55 mmol of tetramethylammonium hydroxide) was gradually added therein while stirring to react at a temperature of 25° C. and a pH of 9 for 20 minutes. When the reaction liquid was subjected to gas chromatographic analysis using TCD detector, compounds (including mono-substituted product to tetra-substituted product) where methoxy groups of TMOS were substituted by n-propoxy groups, respectively were detected, but TMOS was not detected. When a number of substituted 1-propanols (an averaged number of n-propoxy groups per 1 molecule of the n-propoxy group-containing compound) was measured in the sane manner as that in Example 2-1, it was 2.6. After that, 9.93 g (0.04 mol) of 3-methacryloxypropyl trimethoxysilane was added into the reaction liquid, followed by addition of 7.36 g of water thereinto. Further, 3.53 g of a methanol solution of 25% by weight of tetramethylammonium hydroxide (containing 0.08 mol of methanol and 9.67 mmol of tetramethylammonium hydroxide) was added while stirring to react at a temperature of 65° C. and a pH of 9 for 2 hours. After that, 7.41 g (11.75 mmol) of an aqueous solution of 10% by weight of nitric acid was added to neutralize them. Next, this neutralized liquid was added into a mixed liquid of 70 g of diisopropyl ether and 65 g of water, thereby conducting extraction. The diisopropyl ether layer was washed with water to remove salts and excessive acids therefrom, and then 2.2 mg of the above-mentioned polymerization inhibitor was added thereto. Organic solvents were distilledly removed from the resultant diisopropyl ether solution under reduced pressure to obtain an organosilicon compound (C2-4) which was light yellow, transparent and solid (See, Table 9). The isolation yield thereof was 11.42 g.

The organosilicon compound (C2-4) was subjected to $^1$H NMR analysis. It was confirmed that a methacryloyl group was present and that the organosilicon compound (C2-4) was a copolycondensate by stoichiometric reaction of the silicon compound (A2) and the silicon compound (B2).

The content of the alkoxy group (n-propoxy group bonded to a silicon atom) of the organosilicon compound (C2-4) calculated from $^1$H NMR chart, was an amount corresponding to 3.8% based on the total amount of the alkoxy group contained in the starting materials.

Mn could not be determined precisely since components exceeding a detection limit (molecular weight of 400,000) of the GPC column were included. When the resultant chromatogram was used to measure an area of components (in which retention time was in the range from 6 to 10 minutes) exceeding the detection limit of the column and an area of components (in which retention time was exceeding 11 minutes and 16 minutes or less) not exceeding the detection limit. The ratio thereof was 5:3.

Example 2-5

20.8 g of 1-propanol and 4.76 g (31.25 mmol) of TMOS were charged into a reaction vessel provided with a stirrer and a thermometer, and then 0.5 g of a methanol solution of 25% by weight of tetramethylammonium hydroxide (containing 12 mmol of methanol and 1.4 mmol of tetramethylammonium hydroxide) was gradually added therein while stirring to react at a temperature of 25° C. and a pH of 9 for 1 hour. When the reaction liquid was subjected to gas chromatographic analysis using TCD detector, compounds (including mono-substituted product to tetra-substituted product) where methoxy groups of TMOS were substituted by n-propoxy groups, respectively and an unreacted TMOS were detected. The ratio of the n-propoxy group-containing compounds among them was 91% by weight as a total. When a number of substituted 1-propanols (an averaged number of n-propoxy groups per 1 molecule of the n-propoxy group-containing compound) was measured in the same manner as that in Example 2-1, it was 1.7. After that, 6.21 g (25 mmol) of 3-methacryloxypropyl trimethoxysilane was added into the reaction liquid, followed by addition of 3.6 g of water thereinto. Subsequently, 0.92 g of a methanol solution of 25% by weight of tetramethylammonium hydroxide (containing 21.5 mmol of methanol and 2.53 mmol of tetramethylammonium hydroxide) was added and reacted while stirring at a temperature of 60° C. and a pH of 9 for 2 hours. After that, an aqueous solution of 10% by weight of nitric acid was added to neutralize them. Next, 1.6 mg of the above-mentioned polymerization inhibitor was added thereto. The reaction liquid was concentrated with an evaporator, and then methylisobutylketone (MIBK) was added to the resultant concentrate to dissolve. After that, the MIBK solution was washed with water and was dehydrated with anhydrous sodium sulfate. Subsequently, the solution was filtered with filter paper (No. 2), thereby obtaining 12.98 g of an MIBK solution containing an organosilicon compound (C2-5). When a part of the solution was collected and desolvated, the isolation yield was found to be 98%. Further, the concentration of the MIBK solution was equal to NV48%.

The organosilicon compound (C2-5) was subjected to $^1$H NMR analysis. It was confirmed that a methacryloyl group was present and that the organosilicon compound (C2-5) was a copolycondensate by stoichiometric reaction of the silicon compound (A2) and the silicon compound (B2).

The content of the alkoxy group (n-propoxy group bonded to a silicon atom) of the organosilicon compound (C2-5) calculated from $^1$H NMR chart, was an amount corresponding to 3.9% based on the total amount of the alkoxy group contained in the starting materials.

Mn of the resultant organosilicon compound (C2-5) was 12,000.

Example 2-6

53 g of 1-propanol and 36.53 g (0.24 mol) of TMOS were charged into a reaction vessel provided with a stirrer and a thermometer, and then 4.37 g of a methanol solution of 25% by weight of tetramethylammonium hydroxide (containing 0.1 mol of methanol and 12 mmol of tetramethylammonium hydroxide) was gradually added therein while stirring to react at a temperature of 25° C. and a pH of 9 for one hour. When the reaction liquid was subjected to gas chromatographic analysis using TCD detector, compounds (including mono-substituted product to tetra-substituted product) where methoxy groups of TMOS were substituted by n-propoxy groups, respectively and an unreacted TMOS were detected. The ratio of the n-propoxy group-containing compounds among them was 83% by weight as a total. When a number of substituted 1-propanols (an averaged number of n-propoxy groups per 1 molecule of the n-propoxy group-containing compound) was measured in the same manner as that in Example 2-1, it was 1.6. After that, 59.61 g (0.24 mol) of 3-methacryloxypropyl trimethoxysilane was added into the reaction liquid, followed by addition of 30.2 g of water thereinto. Further, 7.88 g of a methanol solution of 25% by weight of tetramethylammonium hydroxide (containing 0.18 mol of methanol and 21.6 mmol of tetramethylammonium hydroxide) was added while stirring to react at a temperature of 23° C. and a pH of 9 for 3 hours, and then at 65° C. for 30 minutes. After that, an aqueous solution of 10% by weight of nitric acid was added to neutralize them. Next, this neutralized liquid was added into a mixed liquid of 160 g of ethyl acetate and 70 g of water, thereby conducting extraction. The ethyl acetate layer was washed with water to remove salts and excessive acids therefrom, and then 9.7 mg of the above-mentioned polymerization inhibitor was added thereto. Organic solvents were distilledly removed from the resultant ethyl acetate solution under reduced pressure to obtain an organosilicon compound (C2-6) which was colorless, transparent and solid (See, Table 10). The isolation yield thereof was 54.70 g.

The organosilicon compound (C2-6) was subjected to $^1$H NMR analysis. It was confirmed that a methacryloyl group was present and that the organosilicon compound (C2-6) was a copolycondensate by stoichiometric reaction of the silicon compound (A2) and the silicon compound (B2).

The content of the alkoxy group (n-propoxy group bonded to a silicon atom) of the organosilicon compound (C2-6) calculated from $^1$H NMR chart, was an amount corresponding to 0.7% based on the total amount of the alkoxy group contained in the starting materials.

Mn of the resultant organosilicon compound (C2-6) was 10,000.

Comparative Example 2-1

85 g of 1-propanol and 11.60 g (0.08 mol) of TMOS were charged into a reaction vessel provided with a stirrer and a thermometer, and then 0.57 g of a methanol solution of 25% by weight of tetramethylammonium hydroxide (containing 0.01 mol of methanol and 1.55 mmol of tetramethylammonium hydroxide) was gradually added therein while stirring to react at a temperature of 25° C. and a pH of 9 for 15 minutes. When the reaction liquid was subjected to gas chromatographic analysis using TCD detector, compounds where methoxy groups of TMOS were substituted by n-propoxy groups, respectively were detected. TMOS was not detected. When a number of substituted 1-propanols (an averaged number of n-propoxy groups per 1 molecule of the n-propoxy group-containing compound) was measured in the same manner as that in Example 2-1, it was 2.9. After that, 9.94 g (0.04 mol) of 3-methacryloxypropyl trimethoxysilane was added into the reaction liquid, followed by addition of 7.65 g of water thereinto. Further, 3.65 g of a methanol solution of 25% by weight of tetramethylammonium hydroxide (containing 0.09 mol of methanol and 10 mmol of tetramethylammonium hydroxide) was added while stirring to react at a temperature of 65° C. and a pH of 9 for 2 hours. After that, 7.7 g of an aqueous solution of 10% by weight of nitric acid was added to neutralize them. Next, this neutralized liquid was added into a mixed liquid of 70 g of diisopropylether and 65 g of water, thereby conducting extraction. The diisopropylether layer was washed with water to remove salts and excessive acids therefrom, and then 2.3 mg of the above-mentioned polymerization inhibitor was added thereto. Organic solvents were distilledly removed from the resultant diisopropylether solution under reduced pressure to obtain an organosilicon compound (C2-8) which was white and solid (See, Table 10). The obtained solid was not dissolved in an organic solvent (such as tetrahydrofurane, methanol and methylisobutylketone) and was gelated.

Comparative Example 2-2

155 g of 2-propanol, 26.44 g (0.1 mol) of tetra-n-propoxysilane and 24.84 g (0.1 mol) of 3-methacryloxypropyl trimethoxysilane were charged into a reaction vessel provided with a stirrer and a thermometer, and then 12.81 g of an aqueous solution of 0.6% by weight of hydrochloric acid (containing 0.7 mol of water and 2 mmol of hydrochloric acid) was gradually added therein while stirring to react at a temperature of 25° C. and a pH of 5 for 24 hours. After that, 5.3 mg of the above-mentioned polymerization inhibitor was added to a reaction liquid. Subsequently, organic solvents were distilledly removed from the resultant solution under reduced pressure to obtain an organosilicon compound (C2-9) which was light yellow, transparent and liquid (and which was extremely high in viscosity and low in flowability) (See, Table 10). The isolation yield thereof was 26.54 g.

The organosilicon compound (C2-9) was subjected to $^1$H NMR analysis. It was confirmed that a methacryloyl group was present and that the organosilicon compound (C2-9) was a copolycondensate by stoichiometric reaction of the silicon compound (A2) and the silicon compound (B2).

The content of the alkoxy group (methoxy group, n-propoxy group and isopropoxy group bonded to a silicon atom) of the organosilicon compound (C2-9) calculated from $^1$H NMR chart, was an amount corresponding to 17% based on the total amount of the alkoxy group contained in the starting materials.

Mn of the resultant organosilicon compound (C2-9) was 990.

Comparative Example 2-3

160 g of 2-propanol, 26.44 g (0.1 mol) of tetra-n-propoxysilane and 23.43 g (0.1 mol) of 3-acryloxypropyl trimethoxysilane were charged into a reaction vessel provided with a stirrer and a thermometer, and then 12.81 g of an aqueous solution of 0.6% by weight of hydrochloric acid (containing 0.7 mol of water and 2 mmol of hydrochloric acid) was gradually added therein while stirring to react at a temperature of 25° C. and a pH of 5 for 24 hours. After that, 5.6 mg of the above-mentioned polymerization inhibitor was added to a reaction liquid. Subsequently, organic solvents were distilledly removed from the resultant solution under reduced pressure to obtain an organosilicon compound (C2-10) which was light yellow, transparent and liquid (and which was extremely high in viscosity and low in flowability) (See, Table 10). The isolation yield thereof was 28.02 g.

The organosilicon compound (C2-10) was subjected to $^1$H NMR analysis. It was confirmed that a methacryloyl group was present and that the organosilicon compound (C2-10) was a copolycondensate by stoichiometric reaction of the silicon compound (A2) and the silicon compound (B2).

The content of the alkoxy group (methoxy group, isopropoxy group and n-propoxy group bonded to a silicon atom) of the organosilicon compound (C2-10) calculated from $^1$H NMR chart, was an amount corresponding to 20% based on the total amount of the alkoxy group contained in the starting materials.

Mn of the resultant organosilicon compound (C2-10) was 800.

Comparative Example 2-4

22 g of 1-propanol and 15.20 g (0.1 mol) of TMOS were charged into a reaction vessel provided with a stirrer and a thermometer, and then 0.52 g of an aqueous solution of 35% by weight of hydrogen chloride (containing 0.02 mol of water and 5 mmol of hydrogen chloride) was gradually added therein while stirring to react at a temperature of 25° C. and a pH of 5 for 1 hour. When the reaction liquid was subjected to gas chromatographic analysis using TCD detector, compounds (including mono-substituted product to tetra-substituted product) where methoxy groups of TMOS were substituted by n-propoxy groups, respectively and an unreacted TMOS were detected. The ratio of the n-propoxy group-containing compounds among them was 99% by weight as a total. When a number of substituted 1-propanols (an averaged number of n-propoxy groups per 1 molecule of the n-propoxy group-containing compound) was measured, in the same manner as that in Example 2-1, it was 2.3. After that, 24.83 g (0.1 mol) of 3-methacryloxypropyl trimethoxysilane was added into the reaction liquid, followed by addition of 12.65 g of water thereinto. Subsequently, 3.3 g of an aqueous solution of 10% by weight of hydrogen chloride (containing 0.17 mol of water and 9 mmol of hydrogen chloride) was added to react while stirring at a temperature of 25° C. and a pH of 4 for 2 hours. Then, 4.38 g of an aqueous solution of 25% by weight of tetramethylammonium hydroxide (12 mmol) was added to neutralize them. Next, this neutralized liquid was added into a mixed liquid of 70 g of diisopropyl ether and 65 g of water, thereby conducting extraction. The diisopropyl ether layer was concentrated with an evaporator, and then methylisobutylketone (MIBK) was added to the resultant concentrate to dissolve. After that, the MIBK solution was washed with water to remove salts and excessive acids therefrom, and then 2.7 mg of the above-mentioned polymerization inhibitor was added thereto. Solvents were distilledly removed under reduced pressure to obtain an organosilicon compound (C2-11) which was light yellow, transparent and liquid (See, Table 10). The obtained liquid was insoluble in an organic solvent after one day at 25° C., and was gelated. It was thus impossible to conduct analysis of $^1$H NMR and GPC, and evaluation of physical properties (scratch resistance, adherence and curability) of a cured product.

Comparative Example 2-5

290 g of 2-propanol and 248.48 g (1 mol) of 3-methacryloxypropyl trimethoxysilane were charged into a reaction vessel provided with a stirrer and a thermometer, and then 57.69 g of an aqueous solution of 1.6% by weight of tetramethylammonium hydroxide (containing 3 mol of water and 10 mmol of tetramethylammonium hydroxide) was gradually added therein while stirring to react at a temperature of 25° C. and a pH of 9 for 1 hour. After that, 6.62 g of an aqueous solution of 10% by weight of nitric acid was added to neutralize them, and then 17.6 mg of the above-mentioned polymerization inhibitor was added thereto. Next, this liquid was subjected to distillation under reduced pressure to remove an organic solvent and water. After that the residue was dissolved in diisopropyl ether. The diisopropyl ether layer was washed with water to remove salts and excessive acids therefrom, and then 17.3 mg of the above-mentioned polymerization inhibitor was added thereto. Solvents were distilledly removed from the resultant diisopropyl ether solution under reduced pressure to obtain an organosilicon compound (C2-12) which was light yellow, transparent and liquid (and which was extremely high in viscosity and low in flowability) (See, Table 10). The isolation yield thereof was 173.86 g.

The organosilicon compound (C2-12) was subjected to $^1$H NMR analysis. It was confirmed that a methacryloyl group was present and that the organosilicon compound (C2-12) was a copolycondensate by stoichiometric reaction of the silicon compound (A2) and the silicon compound (B2).

The content of the alkoxy group (isopropoxy group bonded to a silicon atom) of the organosilicon compound (C2-12) calculated from $^1$H NMR chart, was an amount corresponding to 0.8% based on the total amount of the alkoxy group contained in the starting materials.

Mn of the resultant organosilicon compound (C2-12) was 2,700.

Comparative Example 2-6

78 g of 2-propanol and 70.27 g (300 mmol) of 3-acryloxypropyl trimethoxysilane were charged into a reaction vessel provided with a stirrer and a thermometer, and then 16.5 g of an aqueous solution of 1.7% by weight of tetramethylammonium hydroxide (containing 900 mmol of water and 3 mmol of tetramethylammonium hydroxide) was gradually added therein while stirring to react at a temperature of 25° C. and a pH of 9 for 1 hour. After that, 1.95 g of an aqueous solution of 10% by weight of nitric acid was added to the reaction liquid to neutralize them, and then 4.9 mg of the above-mentioned polymerization inhibitor was added thereto. Next, this liquid was subjected to distillation under reduced pressure to remove an organic solvent and water. After that the residue was dissolved in diisopropyl ether. The diisopropyl ether layer was washed with water to remove salts and excessive acids therefrom, and then 4.6 mg of the above-mentioned polymerization inhibitor was added thereto. Solvents were distilledly removed from the resultant diisopropyl ether solution under reduced pressure to obtain an organosilicon compound (C2-13) which was light yellow, transparent and liquid (and which was extremely high in viscosity and low in flowability) (See, Table 10). The isolation yield thereof was 48.61 g.

The organosilicon compound (C2-13) was subjected to $^1$H NMR analysis. It was confirmed that an acryloyl group was present and that the organosilicon compound (C2-13) was a copolycondensate by stoichiometric reaction of the silicon compound (A2) and the silicon compound (B2).

The content of the alkoxy group (isopropoxy group bonded to a silicon atom) of the organosilicon compound (C2-13) calculated from $^1$H NMR chart, was an amount corresponding to 1% based on the total amount of the alkoxy group, contained in the starting materials.

Mn and Mw of the resultant organosilicon compound (C2-13) were 3,000 and 4,000, respectively.

Comparative Example 2-7

26 g of methanol, 24.84 g (0.1 mol) of 3-methacryloxypropyl trimethoxysilane, and 19.02 g (0.125 mol) of TMOS were charged into a reaction vessel provided with a stirrer and a thermometer, and then 14.6 g of an aqueous solution of 1.4% by weight of tetramethylammonium hydroxide (containing 0.8 mol of water and 2.25 mmol of tetramethylammonium hydroxide) was gradually added therein and stirred at a temperature of 25° C. A white insoluble material was deposited, thereby causing gelation.

Comparative Example 2-8

26 g of methanol, 24.84 g (0.1 mol) of 3-methacryloxypropyl trimethoxysilane, and 19.02 g (0.125 mol) of TMOS were charged into a reaction vessel provided with a stirrer and a thermometer, and then 15.7 g of an aqueous solution of 10% by weight of tetramethylammonium hydroxide (containing 0.8 mol of water and 15.75 mmol of tetramethylammonium hydroxide) was gradually added therein and stirred at a temperature of 25° C. A white insoluble material was deposited, thereby causing gelation.

Comparative Example 2-9

80 g of 2-propanol and 12.18 g (0.08 mol) of TMOS were charged into a reaction vessel provided with a stirrer and a thermometer, and then 1.46 g of a methanol solution of 25% by weight of tetramethylammonium hydroxide (containing 0.03 mol of methanol and 4 mmol of tetramethylammonium hydroxide) was gradually added therein while stirring to react at a temperature of 25° C. and a pH of 9 for 24 hours. After that, 19.86 g (0.08 mol) of 3-methacryloxypropyl trimethoxysilane was added into the reaction liquid, followed by addition of 10.08 g of water thereinto. Further, 4.08 g of a methanol solution of 25% by weight of tetramethylammonium hydroxide (containing 0.1 mol of methanol and 11.2 mmol of tetramethylammonium hydroxide) was added while stirring to react at a temperature of 25° C. and a pH of 9. However, even by conduction of the reaction for several hours at this temperature and a heating reaction at 65° C., the gas chromatographic analysis of the reaction liquid showed a state where the substituted silane was left which was not reacted with the 3-methacryloxypropyl trimethoxysilane, thereby suggesting that hydrolysis copolycondensation was not progressed.

Comparative Example 2-10

22 g of ethanol and 15.23 g (0.1 mol) of TMOS were charged into a reaction vessel provided with a stirrer and a thermometer, and then 1.8 g of a methanol solution of 25% by weight of tetramethylammonium hydroxide (containing 0.04 mol of methanol and 5 mmol of tetramethylammonium hydroxide) was gradually added therein while stirring to react at a temperature of 25° C. and a pH of 9 for one hour. After that, 24.84 g (0.1 mol) of 3-methacryloxypropyl trimethoxysilane was added into the reaction liquid, followed by addition of 12.6 g of water thereinto. Further, 3.28 g of a methanol solution of 25% by weight of tetramethylammonium hydroxide (containing 0.08 mol of methanol and 9 mmol of tetramethylammonium hydroxide) was added while stirring to react at a temperature of 25° C. and a pH of 9 for 3 hours. Subsequently, when 10.1 g of an aqueous solution of 10% by weight of nitric acid was added to neutralize, a white gel was generated.

TABLE 9

|  |  | Example | | | | | |
|---|---|---|---|---|---|---|---|
|  |  | 2-1 | 2-2 | 2-3 | 2-4 | 2-5 | 2-6 |
| Q monomer | TMOS (mmol) | 240 | 100 | 300 | 70 | 31.25 | 240 |
| T monomer | 3-Methacryloxypropyl trimethoxysilane (mmol) | 240 |  | 200 | 40 | 25 | 240 |
|  | 3-Acryloxypropyl trimethoxysilane (mmol) |  | 100 |  |  |  |  |
| Solvent | 1-Propanol (NV %) | 20 | 20 | 13 | 10 | 30 | 30 |
| *1 | <It is used in alcohol exchange reaction> | 2.5 | 2.5 | 1.35 | 1.35 | 2.5 | 2.5 |
| Catalyst | 25% TMAH methanol solution (mol %) |  |  |  |  |  |  |
|  | <It is used in condensation reaction after alcohol exchange reaction> 25% TMAH methanol solution (mol %) | 4.5 | 4.5 | 8.65 | 8.65 | 8.65 | 4.5 |
| Organosilicon compound (C2) |  | C2-1 | C2-2 | C2-3 | C2-4 | C2-5 | C2-6 |
| Number-average molecular weight (Mn) |  | 9,600 | 11,000 | 3,300 | >400000 | 12,000 | 10,000 |
| Synthetic evaluation (gelation) |  | ○ | ○ | ○ | ○ | ○ | ○ |
| Yield (%) |  | 96 | 96 | 98 | 99 | 98 | 95 |
| Content of remained alkoxy group (%) |  | 4.1 | 6 | 1.3 | 0.9 | 3.9 | 0.7 |
| Stability evaluation |  | ○ | ○ | ○ | ○ | ○ | ○ |
| Organic solvent capable of dissolving |  | MeOH EtOH 1-PrOH 2-PrOH THF AcOEt PGM PGMEA MIBK DIPE | MeOH EtOH 1-PrOH 2-PrOH THF AcOEt PGM PGMEA MIBK DIPE | MeOH EtOH 1-PrOH 2-PrOH THF AcOEt PGM PGMEA MIBK DIPE | MeOH EtOH 1-PrOH 2-PrOH THF AcOEt PGM PGMEA MIBK DIPE | MeOH EtOH 1-PrOH 2-PrOH THF AcOEt PGM PGMEA MIBK DIPE | MeOH EtOH 1-PrOH 2-PrOH THF AcOEt PGM PGMEA MIBK DIPE |

*1 It is a ratio (mol %) based on total mol number of Q monomer and T monomer.

TABLE 10

|  |  | Comparative example | | | | | |
|---|---|---|---|---|---|---|---|
|  |  | 2-1 | 2-2 | 2-3 | 2-4 | 2-5 | 2-6 |
| Q monomer | TMOS (mmol) | 80 |  |  | 100 |  |  |
|  | TPOS (mmol) |  | 100 | 100 |  |  |  |
| T monomer | 3-Methacryloxypropyl trimethoxysilane (mmol) | 40 | 100 |  | 100 | 1000 |  |
|  | 3-Acryloxypropyl trimethoxysilane (mmol) |  |  | 100 |  |  | 300 |
| Solvent | 2-Propanol (NV %) |  | 10 | 10 |  | 30 | 30 |
|  | 1-Propanol (NV %) | 10 |  |  | 30 |  |  |
| *1 | HCl (mol %) |  | 1 | 1 | 7 |  |  |

TABLE 10-continued

| | Comparative example | | | | | |
|---|---|---|---|---|---|---|
| | 2-1 | 2-2 | 2-3 | 2-4 | 2-5 | 2-6 |
| Catalyst 25% TMAH aqueous solution (mol %) <It is used in alcohol exchange reaction> | | | | | 1 | 1 |
| 25% TMAH methanol solution (mol %) <It is used in condensation reaction after alcohol exchange reaction> | 1.35 | | | | | |
| 25% TMAH methanol solution (mol %) | 8.65 | | | | | |
| Organosilicon compound (C2) | C2-8 | C2-9 | C2-10 | C2-11 | C2-12 | C2-13 |
| Number-average molecular weight (Mn) | — | 990 | 800 | — | 2,700 | 3,000 |
| Synthetic evaluation (gelation) | X | ○ | ○ | ○ | ○ | ○ |
| Yield (%) | — | 120 | 125 | 102 | 97 | 98 |
| Content of remained alkoxy group (%) | — | 17 | 20 | — | 0.8 | 1.0 |
| Stability evaluation | — | X | X | X | ○ | ○ |

*1 It is a ratio (mol %) based on total mol number of Q monomer and T monomer.

The resultant organosilicon compounds were evaluated for the following items.

(1) Synthesis Evaluation

For the organosilicon compound, evaluation was conducted based on whether or not the organosilicon compound was allowed to be produced in its production process, without forming a gel. The judgement in the synthesis evaluation was indicated as "○" where the compound was not gelated in its production process, and as "X" where the compound was gelated. The evaluation results are shown in Tables 9 and 10.

Further, the term "NV %" denoting a blending amount of a solvent in Tables 9 and 10 is indicated by a percentage (%) to be obtained by dividing: a yield (weight) when the starting monomers to be reacted were fully hydrolyzed; by a charged total weight. The phrase "when the monomers were fully hydrolyzed" implies that: $SiO_2$ was obtained from a silicon compound (Q monomer) having four siloxane-bond forming groups; and $SiO_{1.5}$ was obtained from a silicon compound (T monomer) having three hydrolyzable groups; both by hydrolysis.

(2) Characterization

Concerning the organosilicon compound (C2) allowed to be produced without gelation, the yield (%) of the organosilicon compound, and the content (%) of the residual alkoxy groups, were measured and calculated by the following procedure.

The yield (%) was calculated by the following equation:

{(isolation yield)/(theoretical yield, assuming that all alkoxysilanes as Q monomers are hydrolyzed into $SiO_2$, and all alkoxysilanes as T monomers are hydrolyzed into $SiO_{1.5}$}×100

The content (%) of the residual alkoxy groups was calculated from a chart of $^1H$ NMR (nuclear magnetic resonance spectrum).

It is noted that those organosilicon compounds (C2) were not evaluated and were indicated by "–", where a gel was formed during the production process of each compound.

(3) Stability Evaluation

Stability evaluation was conducted for the organosilicon compounds. The organosilicon compound (C2-1) obtained in Example 2-1 and the organosilicon compound (C2-9) obtained in Comparative Example 2-2 were separately dissolved in PGMEA in the same amounts, respectively, and these solutions were stored within a drier at a temperature of 60° C., and observed over time. Although the organosilicon compound (C2-9) obtained in Comparative Example 2-2 was gelated after 10 hours, the organosilicon compound (C2-1) obtained in Example 2-1 was not gelated even after a lapse of 3 days. In turn, at a temperature of 25° C., although the organosilicon compound (C2-1) obtained in Example 2-1 was not gelated even after a lapse of 2 months, the organosilicon compound (C2-9) obtained in Comparative Example 2-2 was gelated after a lapse of only one day.

The organosilicon compound (C2-9) obtained in Comparative Example 2-2 included an unreacted alkoxy group of 17%. On the other hand, the organosilicon compound (C2-1) obtained in Example 2-1 included such group of only about 4%. From this fact, it is supposed that unreacted and residual alkoxy group obstructs a stability of the organosilicon compound.

Thus, the stability of the organosilicon compound was evaluated by content (%) of the residual alkoxy group.

Since a stability of an organosilicon compound is obstructed when a content (%) of the residual alkoxy group thereof is high, the judgment as to whether the applicable organosilicon compound had a stability, was indicated to be "○" when the content (%) of the residual alkoxy group was 8% or less, and to be "X" when larger than 8%

(4) Solubility in Organic Solvent.

The organosilicon compounds (C2-1) to (C2-6) obtained in Examples 2-1 to 2-6 were subjected to solubility check at a temperature of 25° C., in methanol (MeOH), ethanol (EtOH), 1-propanol (1-PrOH), 2-propanol (2-PrOH), tetrahydrofuran (THF), ethyl acetate (AcOEt), 1-methoxy-2-propanol (PGM), 2-methoxy-1-methylethyl acetate (PGMEA), methylisobutylketone (MIBK), and diisopropyl ether (DIPE), respectively. Each sample amount was 0.3 g relative to 3 ml of an applicable organic solvent. The results are set forth together in Table 9.

(5) Production and Evaluation of Cured Product 100 parts by weight of the organosilicon compound of Examples 2-1 to 2-6 and Comparative Examples 2-2 to 2-5 obtained without gelation in the production method for the organosilicon compound above and 3 parts by weight of 2-hydroxy-2-methyl-1-phenyl-propane-1-one as a radical polymerization initiator were dissolved in 100 parts by weight of PGMEA as a solvent to prepare radical curable compositions (V1) to (V10) as PGMEA solutions having concentrations of 50% by weight, respectively (See, Table 11). In the case of the organosilicon compound by Example 2-5, the compound was directly used as a composition in the state of the obtained MIBK solution, without using PGMEA.

The resultant curable compositions were evaluated for curability.

The composition (V1) to (V10) was each coated onto a polycarbonate plate using a bar coater, followed by heating at a temperature of about 50° C. for 5 minutes to volatilize a solvent, thereby forming a coating film having a thickness of about 10 μm. After that, the coating film was cured by ultraviolet irradiation under the following condition, in a manner to count the number of irradiations until the coating film lost a tackiness of its surface. The results are set forth together in Table 11.

[Condition of Ultraviolet Irradiation]
Lamp: 80 W/cm high-pressure mercury lamp
Lamp height: 10 cm
Conveyor speed: 10 m/min.

TABLE 11

| | | | Curable composition | | | |
|---|---|---|---|---|---|---|
| | | | Organosilicon compound (C2) | Radical polymerization initiator | Solvent (PGMEA) | |
| | | Type | Type | Parts by weight | Parts by weight | Parts by weight | Evaluation Curability |
| Example | 2-1 | V1 | (C2-1) | 100 | 3 | 100 | 1 |
| | 2-2 | V2 | (C2-2) | 100 | 3 | 100 | 1 |
| | 2-3 | V3 | (C2-3) | 100 | 3 | 100 | 1 |
| | 2-4 | V4 | (C2-4) | 100 | 3 | 100 | 1 |
| | 2-5 | V5 | (C2-5) | 100 | 3 | 100 | 1 |
| | 2-6 | V6 | (C2-6) | 100 | 3 | 100 | 1 |
| Comparative Example | 2-2 | V7 | (C2-9) | 100 | 3 | 100 | 10 |
| | 2-3 | V8 | (C2-10) | 100 | 3 | 100 | 2 |
| | 2-4 | V9 | (C2-11) | 100 | 3 | 100 | 5 |
| | 2-5 | V10 | (C2-12) | 100 | 3 | 100 | 2 |

Clearly from the results in Table 9, the organosilicon compounds were efficiently produced without generating gels in the condensation process in Examples 2-1 to 2-6, respectively, in each of which, Q monomers as a silicon compound were subjected to alcohol exchange reaction with 1-propanol, and thereafter hydrolysisally copolycondensed together with T monomers as a silicon compound, in a manner to blend the Q monomers as the silicon compound at a ratio of 0.3 to 1.8 mol relative to 1 mol of the T monomers as the silicon compound. In addition, the contents of residual alkoxy group of the organosilicon compound in Examples 2-1 to 2-6 were each 8% or less, thereby supposingly suggesting that the organosilicon compounds were each excellent in stability. Moreover, according to the results in Table 11, the curable compositions adopting the organosilicon compounds obtained in Examples 2-1 to 2-6, respectively, each had excellent curability.

On the other hand, clearly from the results in Table 10, in Comparative Example 2-1 in which 1.9 mol of Q monomer as an organosilicon compound was blended relative to 1 mol of T monomer, a gel was generated in the condensation process, thereby failing to produce a targeted organosilicon compound. Further, in Comparative Examples 2-2 and 2-3 each produced by using an acid catalyst, the contents of residual alkoxy group exhibited larger values (17% and 20%), respectively, thereby supposingly suggesting that the organosilicon compounds were inferior in stability. Moreover, in Comparative Examples 2-4 and 2-5, although gels were not generated in the condensation process and the organosilicon compounds were not problematic in stability, it is found from the result in Table 11 that the curable compositions adopting these compounds are inferior in curability.

INDUSTRIAL APPLICABILITY

The organosilicon compound obtained by the present invention has a high proportion of an inorganic part in the structure, and is excellent in stability and storage stability after the production thereof. The curable composition containing the organosilicon compound is also excellent in stability.

The curable composition of the present invention provides a cured product, which is high in surface hardness and excellent in scratch resistance. Additionally, this composition has a radical curability, and the cured product obtained from the composition is useful as a hardcoat, a protective film for various base materials, a resist coating, a modifier of various polymer materials, a reinforcing agent of plastic, a modifier of various coating materials, a starting material for a coating material, a material having low dielectric constant, a material for insulating film, and the like. Further, the curable composition is suitable as a paint for a woodwork.

What is claimed is:

1. A method for producing an organosilicon compound (C2), said method comprising:

(I) subjecting a silicon compound (A2) represented by formula (5) $SiX^2_4$ (5), wherein:

$X^2$ is a siloxane-bond forming group; and $X^2$s are the same or different from each other;

to alcohol exchange in 1-propanol to give a resultant composition, wherein said resultant composition contains at least two silicon compounds each having different numbers of n-propoxy groups, wherein an average number of said n-propoxy groups bonded to a silicon atom in said at least two silicon compounds is in the range of 1.2 to 3.8;

(II) adding a silicon compound (B2) represented by formula (6)

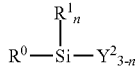
(6)

wherein:
R⁰ is an organic group having a methacryloyl group or an acryloyl group;
R⁰s are the same or different from each other;
R¹ is an organic group containing an alkyl group having 1 to 6 carbon atoms;
an aralkyl group having 7 to 10 carbon atoms, or an aryl group having 6 to 10 carbon atoms;
R¹s are the same or different from each other;
Y² is a hydrolyzable group;
Y²s are the same or different from each other; and
n is 0 or 1,
to the resultant composition obtained by said subjecting (I); and
(III) conducting a hydrolysis copolycondensation under an alkaline condition,
wherein said silicon compound (A2) and said silicon compound (B2) are present so as to be in a ratio of 0.3 to 1.8 mol of said silicon compound (A2) to 1 mol of said silicon compound (B2).

2. The method according to claim 1, wherein R⁰ in formula (6) is an organic group represented by formula (7)

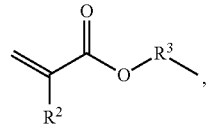
(7)

wherein:
R² is a hydrogen atom or a methyl group;
R²s are the same or different from each other;
R³ is an alkylene group having 1 to 6 carbon atoms; and
R⁵ are the same or different from each other.

3. The method according to claim 1, wherein tetraalkylammonium hydroxide is employed as an alkali agent for adjusting the alkaline condition.

4. The method according to claim 1, wherein an amount of an alkali agent employed for adjusting the alkaline condition is in a range from 0.1 to 20 mol based on 100 mol of a total mol number of said silicon compound (A2) and said silicon compound (B2).

* * * * *